(12) United States Patent
Popat

(10) Patent No.: US 11,041,752 B2
(45) Date of Patent: Jun. 22, 2021

(54) DAYLIGHT SENSOR FOR AUTOMATED WINDOW SHADING

(71) Applicant: Pradeep Pranjivan Popat, Arlington, VA (US)

(72) Inventor: Pradeep Pranjivan Popat, Arlington, VA (US)

( * ) Notice: Subject to any disclaimer, the term of this patent is extended or adjusted under 35 U.S.C. 154(b) by 96 days.

(21) Appl. No.: 16/268,483

(22) Filed: Feb. 5, 2019

(65) Prior Publication Data

US 2019/0257686 A1    Aug. 22, 2019

Related U.S. Application Data

(60) Provisional application No. 62/627,744, filed on Feb. 7, 2018.

(51) Int. Cl.
| | | |
|---|---|---|
| *G01J 1/02* | (2006.01) | |
| *G01J 1/42* | (2006.01) | |
| *G01J 1/04* | (2006.01) | |
| *G01J 1/16* | (2006.01) | |

(52) U.S. Cl.
CPC ........... *G01J 1/0266* (2013.01); *G01J 1/0488* (2013.01); *G01J 1/42* (2013.01); *G01J 1/4204* (2013.01); *G01J 1/4228* (2013.01); *G01J 2001/1657* (2013.01); *G01J 2001/1663* (2013.01); *G01J 2001/4266* (2013.01)

(58) Field of Classification Search
CPC ... A47H 5/02; A47H 2005/025; G01J 1/0271; G01J 1/0228; G01J 1/0488; G01J 2001/1663; G01J 2001/1657; G01J 1/0266; G01J 1/0474; G01J 1/626; G01J 1/44; G01J 1/10; G01J 1/06; G01J 1/4228; G01J 2001/428; G01J 1/42; G01J 1/7204; G01J 2001/4266; G01J 2003/003; E06B 9/68; E06B 9/322; E06B 2009/6827; E06B 2009/6809; Y02B 80/50; Y02A 30/257

See application file for complete search history.

(56) References Cited

U.S. PATENT DOCUMENTS

| | | | | |
|---|---|---|---|---|
| 4,779,980 A | * | 10/1988 | Hulstrom | ............... G01J 1/42 356/218 |
| 6,084,231 A | | 7/2000 | Popat | |

OTHER PUBLICATIONS

Website at www.intelliblinds.com, published circa 2014 by Pradeep Popat in Arlington, VA, USA. Particularly relevant is the page at http://www.intelliblinds.com/intelliluxdls.html, which describes an implementation of the sensor disclosed in U.S. Pat. No. 6,084,231.

* cited by examiner

*Primary Examiner* — Jennifer D Bennett

(57) ABSTRACT

A daylight sensor for automated window-shading applications that incorporates at least one (and optionally more than one) of three aspects: an optimized Field-of-View (FOV), angle-diversity sensing (via at least two sub-sensors with different FOVs, whose outputs are processed in a particular way to yield the overall sensor output), and multi-spectral sensing (via at least two sub-sensors with differing spectral responses and, optionally, different FOVs, whose outputs are processed in a particular way to yield the sensor output). These aspects improve the correlation between the sensor output and the subjectively-perceived daylight level (especially under glare-inducing conditions, such as in the presence of low-angle direct sunlight), thereby enabling more effective automatic control of daylight admitted into a room.

10 Claims, 26 Drawing Sheets

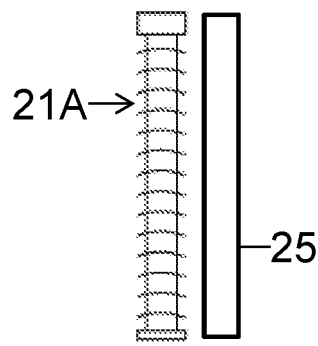
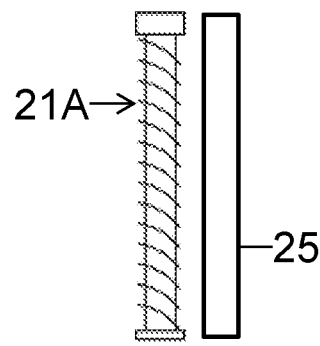
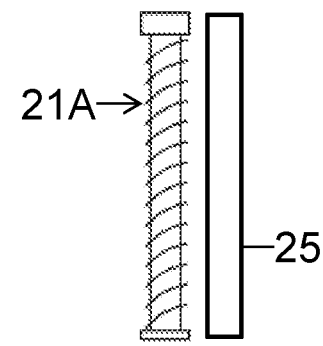
FIGURE 3A  FIGURE 3B  FIGURE 3C
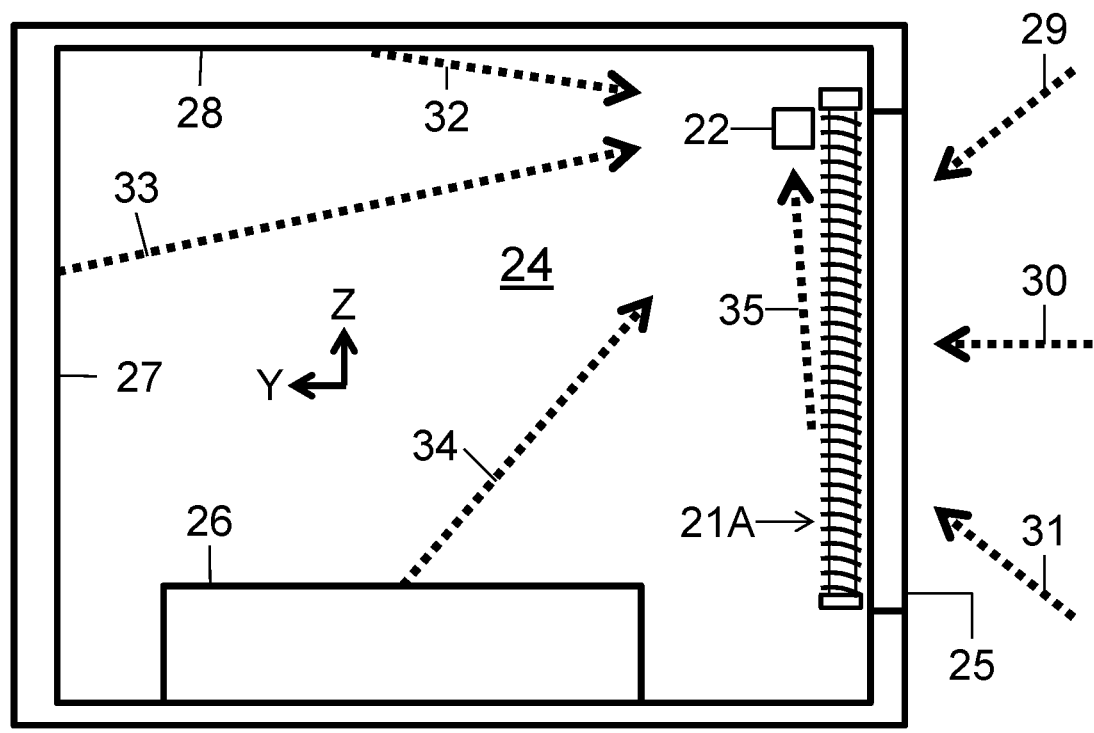
FIGURE 4

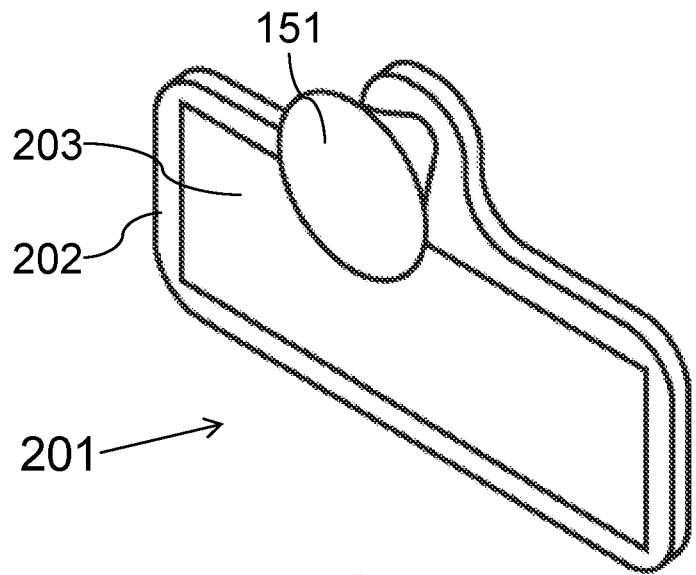
FIGURE 40
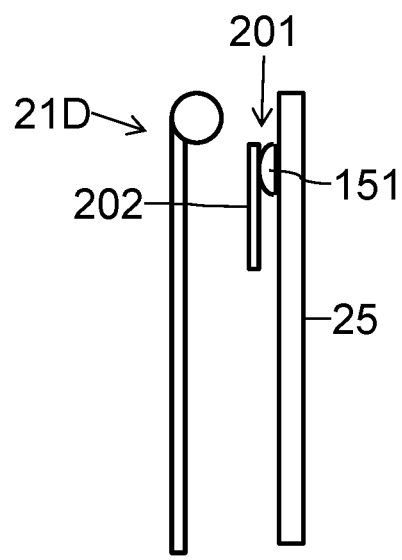 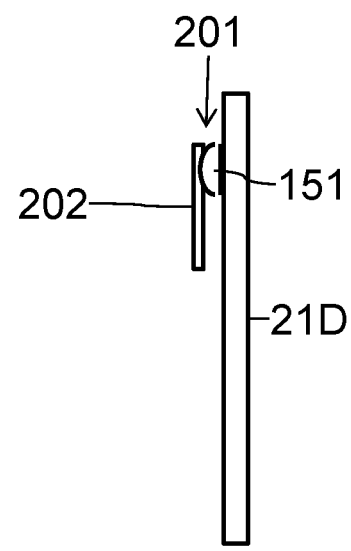
FIGURE 41A          FIGURE 41B

DAYLIGHT SENSOR FOR AUTOMATED WINDOW SHADING

CROSS-REFERENCE TO RELATED APPLICATIONS

This application claims the benefit of Provisional Patent Application Ser. No. 62/627,744, filed 2018 Feb. 7 by the present inventor.

This invention includes aspects of the invention disclosed in U.S. Pat. No. 6,084,231, along with additional improvements and innovations.

BACKGROUND

This invention is in the field of daylight sensors for automated window-shading systems. Such systems are especially advantageous in daylight-harvesting applications because they can maximize the average level of glare-free daylight, and hence the energy savings achievable through daylight harvesting.

Daylight Harvesting and the Need for Dynamic Daylight Control

Daylight harvesting (also known as daylighting) is an energy saving technique that exploits natural illumination to reduce the need for artificial illumination. Daylight-harvesting lighting controls that automatically dim lamps to take advantage of available daylight have been available for decades. Unfortunately, such controls often fail to yield the expected savings, and only a small fraction of the applicable floor area is currently equipped with such controls.

A major reason is that the available daylight in the bulk of the applicable floor area is admitted though eye-level windows (sometimes referred to as "view windows"), and such windows must be shaded to avoid occasional glare. Shading is typically accomplished with manually adjustable window coverings such as blinds and shades. However, while easy to operate, such devices are typically adjusted to block glare under worst-case conditions and then left alone for days or even weeks. As a result, windows are over-shaded most of the time, drastically reducing the daylight that can be harvested.

As is known in the art, the solution to this problem is to automate the shading function in the same way that daylight-harvesting lighting controls automate the lighting function. When compared to manually adjustable shading, an automated shading system capable of self-adjusting to maximize glare-free daylight under changing conditions can double or even triple the energy savings achievable through daylight harvesting. Such systems are referred to herein as Dynamic Daylight Control (DDC) systems. Unfortunately, most such systems are far too expensive and/or too complex to be cost-effective in commercial daylight harvesting applications.

System of U.S. Pat. No. 6,084,231

An exception to the complexity and high cost of prior-art DDC technology is the system disclosed in U.S. Pat. No. 6,084,231 to Popat (2000). This is a closed-loop DDC system incorporating a daylight sensor having a spectral response (sometimes referred to as spectral responsivity) that overlaps the daylight spectrum but is substantially insensitive to the spectra produced by high-efficiency (e.g. fluorescent or LED) lamps. In addition to the sensor, the system includes a window-shading device and a control apparatus. The control apparatus adjusts the window shading device to maintain an approximately constant level of daylight as sensed by the sensor.

The daylight sensor of U.S. Pat. No. 6,084,231 offers at least three major advantages:

Because it is insensitive to artificial illumination, it enables closed-loop operation without need for special means to coordinate the shading adjustments with the operation of a daylight-harvesting lighting control. This reduces cost (by eliminating the need for a wired or wireless connection to the lighting control) and eliminates interoperability issues (by allowing its parent DDC system to work with any lighting control, regardless of design).

The sensor's relative insensitivity to artificial illumination also eliminates the need to orient or shield it to block illumination from the lighting system. That, in turn, enables the sensor to be co-located with the shading device, reducing system size, complexity, and cost.

The sensor's relative insensitivity to artificial illumination also enables it to be located and oriented so that it is better able to sense incipient glare-inducing conditions, increasing the effectiveness of the system of U.S. Pat. No. 6,084,231 in controlling glare.

However, while the system disclosed in U.S. Pat. No. 6,084,231 out-performs DDC systems of greater cost and complexity, extensive testing has revealed two areas in which its performance could be improved:

The system can sometimes over-close or over-open the shading when there is little risk of daylight glare, implying that the correlation between the sensor output and the daylight level as perceived by room occupants can become degraded under low-glare conditions.

The system can occasionally admit glare-inducing sunlight when the sun is near the horizon.

OBJECTS AND ADVANTAGES

It is therefore an object of the invention disclosed herein to provide a daylight sensor for DDC applications which has all of the advantages of the sensor disclosed in U.S. Pat. No. 6,084,231, while also providing two additional advantages:

Improved correlation between the output of the sensor and the daylight level as perceived by the room occupants.

Improved ability to sense incipient glare due to sunlight when the sun is near the horizon.

Further objects and advantages will become apparent from a consideration of the drawings and accompanying description.

SUMMARY OF THE INVENTION

The subject invention is a daylight sensor for automated window-shading applications that incorporates at least one (and optionally more than one) of three innovations:

An optimized Field Of View (FOV) to improve the correlation between the sensor output and the perceived daylight level.

Angle-Diversity sensing (via at least two sub-sensors with different FOVs, whose outputs are processed in a particular way to yield the overall sensor output) to further improve the correlation between the sensor output and the perceived daylight level.

Multi-spectral sensing (via at least two sub-sensors with differing spectral responses and, optionally, different FOVs, whose outputs are processed in a particular way to yield the sensor output) to further improve the correlation between the sensor output and the perceived daylight level, particularly in the presence of glare due to low-angle sunlight.

DESCRIPTION OF DRAWINGS

FIGS. 3A-3C depict side views of a horizontal venetian blind in three settings, in order to illustrate the convention regarding slat tilt angles used herein.

FIG. 4 shows a side view of a room in which a closed-loop DDC system that incorporates a horizontal venetian blind is installed, along with key daylight components inside and outside the room.

FIG. 40 is a perspective view of Multi-Spectral sensor module 201 (alternative embodiment 4).

FIG. 41A is a diagram showing the installed location and orientation of Multi-Spectral sensor module 201 (alternative embodiment 4).

FIG. 41B is a diagram showing the installed location and orientation of Multi-Spectral sensor module 201 (alternative embodiment 4) when used with a Smart Window (alternative embodiment 4).

LIST OF REFERENCE NUMERALS

Figure 1:
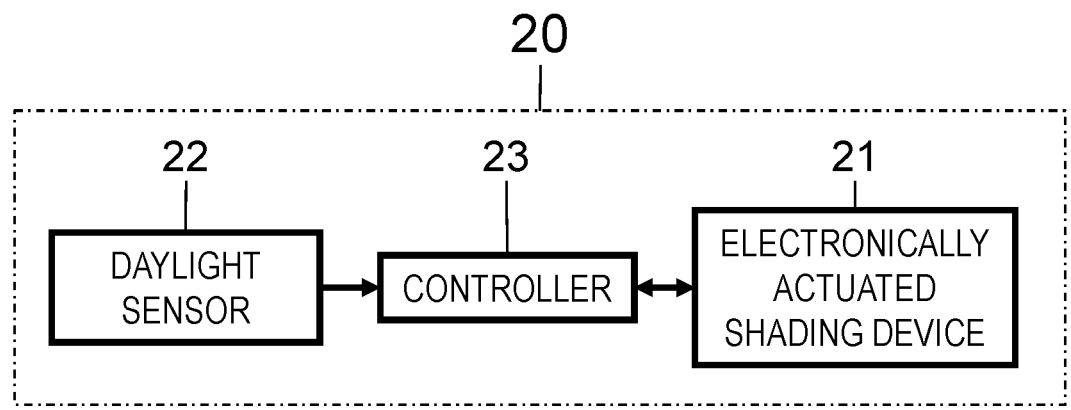
FIG. 1 is a block diagram of a Dynamic Daylight Control (DDC) system 20.

20 Dynamic Daylight Control (DDC) system
20A Dynamic Daylight Control (DDC) system
20B Dynamic Daylight Control (DDC) system
20C Integrated DDC-lighting system
21 Electronically-actuated shading device
21A Motorized horizontal blind
21B Motorized shade
21D Electronically-actuated shading device
21X Electronically-actuated shading device
21Y Electronically-actuated shading device
22 Daylight sensor
22A Daylight Sensor
22B Multi-Spectral Sensor
22C Integrated Daylight/WPI sensor
23 Controller
23A Microcontroller Unit (MCU)
23B Microcontroller Unit (MCU)
24 Room
25 Window
26 Desk
27 Far wall
28 Ceiling
29 Sky component
30 Horizontal component
31 Ground component
32 Ceiling component
33 Far-zone component
34 Near-zone component
34B Near-zone component
35 Slat component
40 Housing
41 Printed-Circuit Board (PCB)
42 Photosensor
42A Photosensitive surface
43 Top edge
44 Bottom edge
45 Left edge
46 Right edge
47 Mask
48 Photosensor
49 Photosensor
50 Housing
51 Floor sub-sensor
52 Ceiling sub-sensor
70 Multi-spectral sensor
71 FOV direction
81 Sub-sensor
82 Sub-sensor
91 Floor photodiode
91D Desk photodiode
91R Reference LED
92 Ceiling photodiode
92W Window Photodiode
101 Sunlight photodiode
101B Sunlight photodiode
102 Reference photodiode
102B Reference photodiode
110 Housing
111 Housing aperture
112 PCB
113 Bracket
114 Bracket aperture
115 Magnet
116 Cover
117 Window
121 Pause step
122 Sampling step
123 Calculation step
124 Calculation step
125 Decision step
126 Decision step
127 Decision step
128 Decision step
129 Action step
130 Action step
131 Sampling step
132 Calculation step
133 Decision step
134 Decision step
135 Decision step
136 Action step
151 Suction cup
152 Housing
153 Cable
154 Base
155 Aperture
161 Pause step
162 Decision step
163 Sampling step
164 Calculation step
165 Decision step
166 Decision step
167 Action step
168 Decision step
169 Action step
171 Lighting system
172 WPI photodiode
173 Housing
174 PCB
175 Baffle
175A Baffle side
175B Baffle tab
177A Upper FOV edge
177B Lower FOV edge
177C Upper FOV edge
176 Cover
180 Integrated system
181 Controller
182 Lighting system
182X Lighting system
182Y Lighting system
183 WPI sensor
183X WPI sensor
183Y WPI sensor
184 Network
190 Augmented system
190X Augmented system
190Y Augmented system
191 DDC module
191X DDC module
191Y DDC module 200 Augmented system
201 Multi-spectral sensor module
202 Housing
203 Photo-Voltaic panel
221 Pause step
222 Sampling step
223 Calculation step
224 Calculation step
225 Decision step
226 Decision step
227 Decision step
228 Decision step
229 Action step
230 Action step
231 Sampling step
232 Calculation step
233 Decision step
234 Decision step
235 Decision step
236 Action step List of Special Terms The following table lists special terms (including acronyms) used in this disclosure which have particular significance in describing the subject daylight sensor or which have meanings that may differ from those in general usage, and provides the meaning for each special term in the context of this disclosure:

| TERM | MEANING |
| --- | --- |
| Angle-Diversity. sensing | The use of at least two sub-sensors with differing Fields-Of-View (FOVs) to obtain a daylight signal $d_{AD}$ or, when used in conjunction with Multi-Spectral sensing as defined herein, a Low-Angle Sunlight signal LAS or a glare signal g. When used to obtain signal $d_{AD}$, Angle-Diversity sensing uses a first sub-sensor which has an FOV that tends to make it more sensitive to a sky component of daylight than to a ground component of daylight, and a second sub-sensor which has an FOV that tends to make it more sensitive to the ground component than to the sky component, and includes processing of the outputs of the sub-sensors such that signal $d_{AD}$ tends to increase with increasing output of the first sub-sensor and tends to decrease with increasing output of the second sub-sensor, and such that signal $d_{AD}$ is influenced more by the output of the first sub-sensor than by the output of the second sub-sensor.<br>In one form of Angle-Diversity sensing, the sub-sensors do not sense the sky or ground components of daylight directly, but rather sense them via reflection from room surfaces. For example, with reference to FIG. 4, such a form of Angle-Diversity sensing includes a first sub-sensor which has an FOV that tends to make it more sensitive to near-zone component 34 (and therefore, via reflection, to sky component 29) than to ceiling component 32 (and therefore, by reflection, to ground component 31), and a second sub-sensor which has an FOV that tends to make it more sensitive to ceiling component 32 (and therefore, via reflection, to ground component 31) than to near-zone component 34 (and therefore, via reflection, to sky component 29).<br>A sensor which implements Angle-Diversity sensing is an Angle-Diversity sensor. |
| Angle-Diversity and Multi-Spectral sensing (also referred to herein as Angle-Diversity with Multi-Spectral sensing) | The use of at least two sub-sensors with differing Fields-Of-View (FOVs) and differing spectral responses to obtain a Low-Angle Sunlight signal LAS or a glare signal g.<br>One form of Angle-Diversity with Multi-Spectral sensing uses a first sub-sensor which has an FOV that tends to make it more sensitive to a sky component of daylight than to a ground component of daylight and has a spectral response to sunlight which makes it relatively insensitive to atmospheric attenuation of that sunlight, and a second sub-sensor which has an FOV that tends to make it more sensitive to the ground component than to the sky component and has a spectral response to sunlight which tends to make it relatively sensitive to atmospheric attenuation of that sunlight, and includes processing of the outputs of the sub-sensors to obtain an LAS signal that tends to increase with increasing output of the first sub-sensor and tends to decrease with increasing output of the second sub-sensor, or to obtain a glare signal g that that tends to increase with increasing output of the first sub-sensor and tends to decrease with increasing output of the second sub-sensor and is influenced more by the output of the first sub-sensor than that of the second sub-sensor.<br>In one form of Angle-Diversity with Multi-Spectral sensing, the sub-sensors do not sense the sky or ground components of daylight directly, but rather sense them via reflection from room surfaces. For example, with reference to FIG. 4, such a form of Angle-Diversity with Multi-Spectral sensing includes a first sub-sensor which has an FOV that tends to make it more sensitive to near-zone component 34 (and therefore, via reflection, to sky component 29) than to ceiling component 32 (and therefore, by reflection, to ground component 31), and a second sub-sensor which has an FOV that tends to make it more sensitive to ceiling component 32 (and therefore, via reflection, to ground component 31) than to near-zone component 34 (and therefore, via reflection, to sky component 29). |

-continued

Figure 2A:
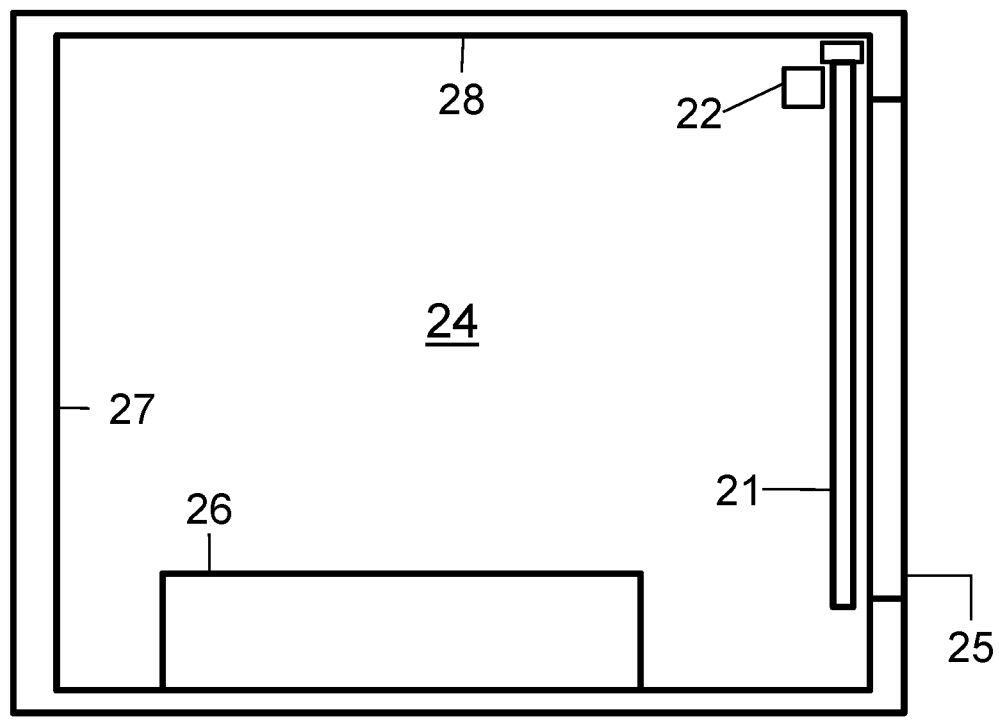
FIG. 2A shows a side view of a room in which a DDC system is installed.
Figure 2B:
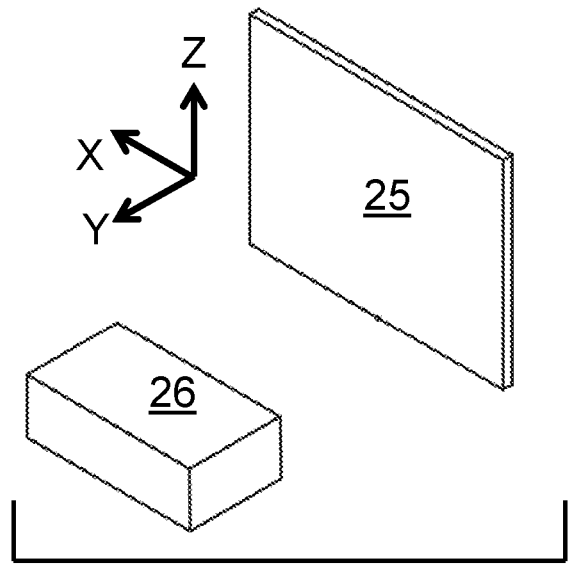
FIG. 2B shows the room coordinate system used in this disclosure.
Figure 2C:
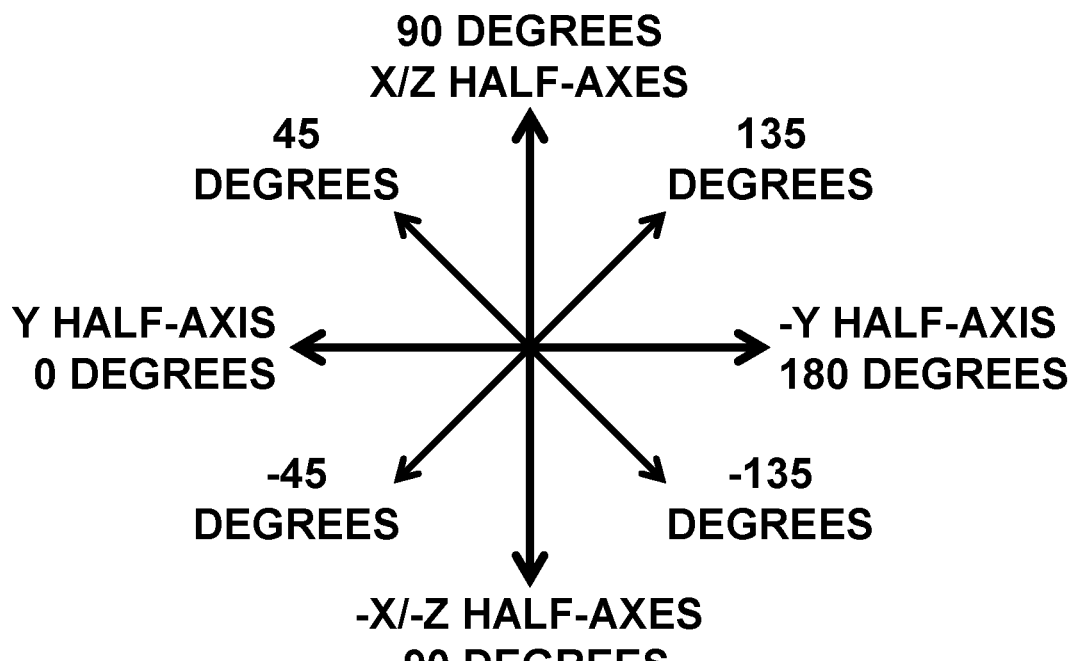
FIG. 2C shows the angle convention for the coordinate system used in this disclosure.

| TERM | MEANING |
| --- | --- |
| Azimuth and Elevation | Angles in the X-Y and Y-Z planes, respectively, as depicted in the coordinate system of FIG. 2B, and according to the angle convention shown in FIG. 2C. This disclosure uses the following convention for the direction of rays in the coordinate system:<br>Rays representing light rays are assumed to be in the direction in which the light travels. For example, the elevation angle of a light ray traveling from the top of window 25 downward and inward toward desk 26 in FIG. 2B is in the (Y, −Z) quadrant of FIG. 2C, and therefore has an elevation angle between −90 degrees and 0 degrees.<br>Rays representing the line of sight of a sensor are assumed to originate from the sensor. For example, the elevation angle of the line of sight of a sensor located on desk 26 and aimed outward and upward toward window 25 in FIG. 2B is in the (−Y, Z) quadrant of FIG. 2C, and is therefore between 90 and 180 degrees. Similarly, the azimuth angle of the line of sight of a sensor mounted at the center of window 25 and facing the right side of desk 26 in FIG. 2B is in the (X, Y) quadrant of FIG. 2C, and is therefore between 0 and 90 degrees. |
| Ceiling Component | A reflected component of daylight admitted by a window that originates from a point on a ceiling, e.g. ceiling component 32 of FIG. 4. |
| Ceiling Sub-Sensor | A sub-sensor in an Angle-Diversity sensor which is more sensitive to a component of daylight reflected from a ceiling than to a component of daylight reflected from a floor, work-plane, or other plane below the ceiling. For example, in the context of FIG. 4, a ceiling sensor is more sensitive to ceiling component 32 than to near-zone component 34. This will also result in the ceiling sub-sensor being more sensitive to ground component 31 (via reflection to ceiling component 32) than to sky component 29 (via reflection to near-zone component 34). |
| Closed-Loop Control | A control protocol which uses negative feedback to minimize the error between the desired value of a controlled variable (i.e. the setpoint) and the sensed value of the controlled variable. |
| Continuous Control | A control protocol in which a device is actuated over a continuous range of settings. In this disclosure, "continuous" refers to the range of possible actuator settings, and not to time. For example, according to this definition, a DDC system in which a motorized blind is actuated over a continuous range of tilt settings—but which is actuated only periodically (versus continuously) in time—is considered to be a continuous control system. |
| Daylight | Natural illumination due to light from the sun, including direct, diffuse, and reflected components. Daylight is distinct from sunlight, which refers to the direct component of daylight (i.e. light from the solar disc). |
| Daylight Harvesting | The process of (or the capability for) dimming and/or switching a lamp to maintain a desired total level of illumination, thereby "harvesting" available daylight to save energy. A daylight-harvesting lighting system is a lighting system capable of daylight harvesting. |
| DDC (Dynamic Daylight Control) | The process of (or the capability for) controlling the daylight admitted by a window in response to changing conditions. A DDC system is a system capable of DDC. |
| Deadband | The maximum magnitude of the error signal in a closed-loop control system (i.e. the difference between the setpoint and the actual value of the controlled variable) that does not cause a control action. |
| Discontinuous Control | A control protocol in which a device is actuated between two or more discrete settings. In this disclosure, "discontinuous" refers to the range of possible actuator settings, and not to time. For example, according to this definition, a DDC system in which a motorized shade is toggled between opened and closed settings—but which is controlled continuously in time—is considered to be a discontinuous control system. |
| $d_{AD}$ | See definition of "signal, $d_{AD}$". |
| $d_{WPI}$ | See definition of "signal, $d_{WPI}$". |
| EC, or Electro-Chromic | A type of smart-window technology in which the tint (and, hence, opacity) of a glazing or panel is altered via an electrochemical reaction. |
| Far-Zone Component | A reflected component of daylight admitted by a window that originates from a point below a ceiling, said point located at a distance from the window along the Y-axis that is greater than about 1.5 times the difference in heights (i.e. Z-coordinates) of the point and the top of the window. An example of a far-zone component is far-zone component 33 of FIG. 4. |
| Floor Sub-Sensor | A sub-sensor in an Angle-Diversity sensor which is more sensitive to a component of daylight reflected from a floor, work-plane, or other plane below a ceiling than to a component of daylight reflected from the ceiling.<br>For example, in the context of FIG. 4, a floor sub-sensor is more sensitive to near-zone component 34 than to ceiling component 32 of FIG. 4. This will also result in the floor sub-sensor being more sensitive to sky component 29 (via reflection to near-zone component 34) than to ground component 31 (via reflection to ceiling component 32). |
| FOM (Figure-Of-Merit) | This disclosure references three FOMs, all of which are intended to quantify the performance of Multi-Spectral sensors: the LAS Gain, the Shading Sensitivity, and the ratio of the LAS Gain to the magnitude of the Shading Sensitivity. The latter is intended to quantify the overall performance of a Multi-Spectral sensor. |

-continued

| TERM | MEANING |
|---|---|
| FOV (Field-Of-View) | A sensor's Field-Of-View (FOV) is a cone-shaped volume (which may be pyramidal), such that the sensor's responsivity in the direction of any point within the volume is greater than or equal to a specified fraction of the sensor's peak angular responsivity. For example, a −3 dB FOV of a sensor is a volume such that the sensor's responsivity in the direction of any point within the volume is greater than or equal to −3 decibels relative to the sensor's peak angular responsivity (i.e. greater than or equal to one-half of its maximum angular responsivity). If no fraction is specified, then the FOV defines a volume such that the sensor has significant responsivity in the direction of any point within the volume.<br>An FOV may be characterized using the following terms:<br>The direction of the FOV (also referred to as the FOV direction) of a sensor is a ray extending outward from a sensor along the axis of the FOV. The FOV direction may be specified by stating that the FOV points in a particular direction, e.g. "an FOV which points downward" has a downward FOV direction. Note that the FOV direction is not necessarily the direction of the sensor's peak angular responsivity.<br>The edges of an FOV are the boundaries of its cross-sections in the azimuth and elevation planes. The upper edge is the edge in the elevation plane whose angle is closest to that of the positive-Z half-axis (and therefore furthest from that of the negative-Z half-axis), while the lower edge is the edge in the elevation plane whose angle is closest to that of the negative-Z half-axis (and therefore furthest from that of the positive-Z half-axis). For example, for an FOV that is bounded by −45 degrees and 45 degrees in elevation, the upper edge has an angle of 45 degrees, while for an FOV bounded by 135 degrees and 180 degrees in elevation, the upper edge has an angle of 135 degrees. Similarly, the right edge and left edge of an FOV are the right-most and left-most edges of the FOV in the azimuth plane from the sensor's perspective (i.e. looking outward from the sensor).<br>The width of an FOV is the angle between its edges in a specified plane. If no plane is specified, then the width is substantially the same in both the azimuth and elevation planes.<br>The direction and edges of an FOV may be explicitly specified in terms of angles in the coordinate system of FIG. 2B, or may be implicitly characterized through reference to other entities (including daylight components).<br>This disclosure includes descriptions of sensors that include a photosensor whose FOV is constrained by a device such as a cover, panel, baffle, or housing. When referring to the intrinsic (unconstrained) FOV of such a photosensor (i.e. the FOV of the photosensor if it were unconstrained by the FOV-constraining device), the term unconstrained FOV is used. If the adjective "unconstrained" is omitted, then the FOV refers to the FOV of the photosensor as constrained by the FOV-constraining device. Alternatively, the term constrained FOV may also be used.<br>Refer to the section herein entitled "FOV-Related Terminology" for examples of the use of these terms. |
| Glare signal | See definition of "signal, g". |
| g | See definition of "signal, g". |
| Ground Component | A reflected component of daylight that originates from a point on the ground outside a window, e.g. ground component 31 of FIG. 4. Also referred to herein as ground-reflected daylight. |
| Ground-reflected daylight | A reflected component of daylight that originates from a point on the ground outside a window, e.g. ground component 31 of FIG. 4. |
| High-Angle Sunlight | Sunlight from a relatively high elevation angle (i.e. when the solar altitude is relatively high, e.g. at solar noon) |
| Horizontal Component | A component of daylight incident roughly horizontally on the outside surface of a window, e.g. from a setting or rising sun or from reflections from nearby buildings, and potentially passing into a room, e.g. horizontal component 30 of FIG. 4. |
| LAS | See definition of "signal, LAS". |
| LAS Gain (of Multi-Spectral Sensor) | A figure of merit for a Multi-Spectral sensor, equal to the ratio of the LAS signal obtainable from the sensor when the sun is at the horizon (i.e. when the sunlight is traversing the longest possible air-mass) to the LAS signal obtainable from the sensor when the sun is at solar noon (i.e. when the sunlight is traversing the shortest possible air-mass). |
| LC (Liquid-Crystal) Smart Window Technology | A technology for implementing Smart Windows. Traditional LC glazings or panels are capable of toggling virtually instantaneously from a transparent state to translucent state, and vice-versa, in response to an electrical signal. Emerging LC technology is capable of continuously adjustable opacity in response to an electrical signal. |
| Low-Angle Sunlight | Sunlight from a relatively low elevation angle (i.e. when the solar altitude is relatively low, e.g. shortly before sunset). |
| Multi-Spectral sensing | The use of at least two sub-sensors with differing spectral responses to obtain a Low-Angle Sunlight signal LAS or a glare signal g, a first sub-sensor of which has a spectral response such that its output in response to sunlight is relatively insensitive to atmospheric attenuation of that sunlight and a second sub-sensor of which has a spectral response such that its output in response to sunlight is relatively sensitive to atmospheric attenuation of that sunlight, and such that the |

| TERM | MEANING |
|---|---|
| | LAS signal tends to increase with increasing output of the first sub-sensor and tends to decrease with increasing output of the second sub-sensor, and such that the glare signal g tends to increase with increasing output of the first sub-sensor and tends to decrease with increasing output of the second sub-sensor and is influenced more by the output of the first sub-sensor than by the output of the second sub-sensor. A sensor which implements Multi-Spectral sensing is a Multi-Spectral sensor. |
| Near-Zone Component | A component of daylight admitted by a window that is reflected from a point below a ceiling, said point located at a distance from the window along the Y-axis that is equal to or less than about 1.5 times the difference in heights (i.e. Z-coordinates) of the point and the top of the window. An example of a near-zone component is near-zone component 34 of FIG. 4. |
| Negative-Tilt Setting | A slat-tilt setting of a horizontal venetian blind that tends to admit the sky component of the incident daylight but tends to block the ground component of the incident daylight, e.g. as shown in FIG. 3C. |
| NIR (Near Infra-Red) | The portion of the electromagnetic spectrum spanning wavelengths from about 700 nm to about 1,200 nm. When used as an adjective for a photosensor (e.g. "NIR photodiode"), the term indicates that the photosensor has a spectral response that is substantially limited to the NIR portion of the spectrum. |
| NUV (Near Ultra-Violet) | The portion of the electromagnetic spectrum spanning wavelengths from about 300 nm to about 400 nm. The NUV band encompasses but is only slightly wider than the Ultraviolet A (UVA) band, which spans from about 315 nm to 400 nm. When used as an adjective for a photosensor (e.g. "NUV photodiode"), the term indicates that the photosensor has a spectral response that is substantially limited to the NUV portion of the spectrum. |
| Opacity | The setting of a Smart Window that represents its ability to block daylight, where 0% opacity represents maximum daylight transmittance and 100% opacity represents minimum daylight transmittance. |
| Open-Loop Control | A control protocol which does not use negative feedback. |
| Output | A signal produced by or obtained from a device. When used herein in reference to a photodiode (or an LED operated as a photodiode), the phrases "output of" and "output signal of" are intended to be synonymous with the phrase "photocurrent in". |
| Photosensor | A photosensitive component, e.g. a photodiode, an LED operated as a photodiode, a phototransistor, a photo-resistor, etc., which can be used to obtain an output signal in response to daylight. While the prefix "photo" is sometimes used to refer to a device that is responsive only to visible wavelengths, this disclosure uses the term "photosensor" to refer to devices that are sensitive to near-infrared and near-ultraviolet, as well as visible, wavelengths. As used herein, the term "photosensor" has a distinct meaning from "sensor"; the former is used to refer to an individual photosensitive component, while the latter is used to refer to a device that includes at least one photosensor, but may also include an optical component (e.g. a baffle or lens), signal-processing means, or an additional photosensor Thus, per the above definitions, all photosensors are herein considered to be sensors, but not every sensor is considered to be a photosensor (although every sensor includes at least one photosensor). |
| Positive-Tilt Setting | The slat-tilt setting of a horizontal venetian blind that tends to block the sky component of the incident daylight but tends to admit the ground component of the incident daylight, e.g. as shown in FIG. 3B. The setting in which a horizontal blind is fully tilted in the positive-tilt direction is referred to herein as the fully-closed or maximum positive tilt setting. |
| Reference Sub-Sensor | A sub-sensor in a Multi-Spectral sensor which produces an output in response to sunlight that is relatively sensitive to atmospheric attenuation of that sunlight. |
| Sensor | A device that includes at least one photosensor and optionally one or more of the following: an optical component (e.g. a baffle or lens), signal-processing means, or an additional photosensor, and which can be used to obtain an output signal in response to daylight. As used herein, the term "sensor" has a distinct meaning from "photosensor"; the latter is used to refer to an individual photosensitive component. Thus, per the above definitions, all photosensors are considered herein to be sensors, but not every sensor is considered to be a photosensor (although every sensor includes at least one photosensor). |
| Setpoint | The value of a controlled variable which a control system attempts to maintain. In the case of a DDC system, the variable is one that represents a characteristic of daylight admitted by a window. |
| Shading Sensitivity (of Multi-Spectral sensor) | A figure of merit for a Multi-Spectral sensor used to sense daylight admitted by a shading device, consisting of a signed quantity whose magnitude is the ratio of the maximum to minimum values of the LAS signal obtained from the sensor over a specified adjustment range of the shading device, and whose sign is positive if the LAS signal varies in the same direction as the level of admitted daylight (i.e. if it increases as the shading is opened and decreases as the shading is closed), and negative if the LAS signal varies in a direction opposite to the level of admitted daylight (i.e. if it increases as the shading is closed and decreases as the shading is opened). |

-continued

| TERM | MEANING |
| --- | --- |
| Signal, $d_{AD}$ | A daylight signal representing the level of daylight admitted by a window into a room and obtained using Angle-Diversity sensing. |
| Signal, $d_{WPI}$ | A daylight signal representing the daylight level inside a room obtained as a function of the output of a WPI (Work-Plane Illuminance) sensor and the artificial lighting level (e.g. as obtained from the known dimming level of a lamp). |
| Signal, g | A glare signal which is correlated with the risk of daylight glare in general (e.g. due to high-angle sunlight, excessively bright diffuse daylight, or low-angle sunlight), obtained as a function of the output of a Multi-Spectral sensor and optionally a daylight signal. In one implementation, a glare signal g is obtained as a function of an LAS signal and a daylight signal, the latter of which can be a $d_{AD}$ signal obtained via Angle-Diversity sensing. In another implementation, a glare signal g is obtained as a function of the outputs of the sub-sensors of a Multi-Spectral sensor. |
| Signal, LAS (Low-Angle Sunlight) | A signal which is correlated with the risk of glare due to low-angle sunlight and which is obtained via Multi-Spectral sensing, i.e. as a function of the outputs of a plurality of sub-sensors with differing spectral responses.<br>If the LAS signal is obtained from the outputs of sub-sensors that face generally inward into a day-lit area, it is referred to herein as an $LAS_{in}$ signal. Conversely, if it obtained from the outputs of sub-sensors that face outward from a day-lit space toward incoming daylight, it is referred to herein as an $LAS_{out}$ signal. An LAS signal obtained as a function of $LAS_{in}$ and $LAS_{out}$ signals is referred to herein as an $LAS_{net}$ signal.<br>Optionally, an LAS signal can be adjusted as a function of the setting of a shading device (e.g. the slat-tilt angle of a horizontal blind) to reduce the shading sensitivity, such an adjusted LAS signal is referred to herein $LAS_2$ and the un-adjusted signal as $LAS_1$. |
| Sky Component | A component of daylight that originates from the sky, e.g. sky component 29 of FIG. 4. Also referred to herein as skylight. |
| Skylight | A component of daylight that originates from the sky, e.g. sky component 29 of FIG. 4. Also referred to herein as a sky component of daylight. |
| Slat Component | A reflected component of daylight admitted by a window that originates from a slat of a venetian blind. |
| Slat-Tilt Angle | The tilt angle of the slats of a horizontal venetian blind per the coordinate system and angle convention of FIGS. 2B and 2C, with the additional convention that the slat-tilt angle refers to the angle of a ray in the same general direction (i.e. inward or outward) as daylight admitted by the blind. This convention is further illustrated in FIGS. 3A-3C |
| Slat-Tilt Operating Range | The range of slat-tilt angles over which a venetian blind is adjusted for DDC. Because daylight admitted by a venetian blind does not vary monotonically with slat tilt, it can be advantageous to restrict the slat-tilt operating range for closed-loop DDC to less than the blind's mechanical slat-tilt operating range, e.g. to only positive tilt angles (per the tilt-angle sign convention of FIGS. 3A-3B). |
| Smart Window | A window that includes a smart glazing (or a conventional glazing with an add-on smart panel), where "smart" refers to the ability to vary or switch transmittance, opacity, or translucence without moving parts. Commercially available and developmental smart windows include those based on Electro-Chromic (EC), Liquid Crystal (LC), and Suspended Particle Device technologies.<br>LC windows fall into two categories. Traditional LC windows (also referred to switchable privacy glass) cannot modulate the admitted daylight flux, but rather toggle between translucent and transparent states. Such windows are referred to herein as bi-state LC windows. On the other hand, emerging LC smart window technology is capable of continuously varying transmittance. |
| SPD (Spectral Power Distribution) | The concentration, as a function of wavelength, of a photometric quantity such as irradiance. |
| Sub-sensor | A photosensor in a sensor that includes at least two photosensors. |
| Sunlight | The direct component of daylight, i.e. light rays from the solar disc. |
| Sunlight Sub-Sensor | A sub-sensor in a Multi-Spectral sensor which produces an output in response to sunlight that is relatively insensitive to atmospheric attenuation of that sunlight. |
| Tilt-Curve Mismatch | A mismatch between two curves (a first curve of daylight-sensor output versus the slat-tilt angle of a horizontal blind, and a second curve of window luminance versus slat-tilt angle), said mismatch consisting of a difference in the shapes of the curves or the tilt angles for maximum curve amplitude. |
| Visible (wavelengths) | The portion of the electromagnetic spectrum spanning wavelengths from about 400 nm to about 700 nm. When used as an adjective for a photosensor (e.g. "Visible photodiode"), the term indicates that the photosensor has a spectral response that is substantially limited to the visible portion of the spectrum. |
| WPI (Work-Plane Illuminance) | The horizontal illuminance on a work surface, e.g. a desk. A sensor intended to sense the WPI is referred to as a WPI sensor. |
| Zero-Tilt Setting | The slat-tilt setting of a venetian blind in which the short axes (i.e. the chords) of its slats are perpendicular to the plane of the host window. For a horizontal blind mounted on a standard window, the zero-tilt setting is one in which the slats are horizontal, i.e. parallel to the floor. |

DETAILED DESCRIPTION OF THE INVENTION

In order to facilitate a full understanding of the subject invention and its implementation, the following description includes four sections:

Intended Application describes a Dynamic Daylight Control (DDC) system of the type intended as a primary application for the subject daylight sensor, and discusses problems with such systems (and causes thereof) that are overcome through use of the subject daylight sensor.

Innovations describes the innovative aspects of the subject daylight sensor, discusses how they are advantageous in the intended application, and provides general implementation information so that practitioners in the art can adapt the innovations to yield various advantageous embodiments.

Preferred Embodiment describes what is believed at the time of this disclosure to be the best mode of the subject invention, along with advantageous variations thereof.

Alternative Embodiments describes alternative modes that may be particularly advantageous in certain applications.

Intended Application

FIG. 1: BLOCK DIAGRAM OF DYNAMIC DAYLIGHT CONTROL (DDC) SYSTEM

An important application for the subject daylight sensor is Dynamic Daylight Control (DDC), as is provided by the system disclosed in U.S. Pat. No. 6,084,231. FIG. 1 shows a block diagram of a DDC system, system 20. It includes an electronically-actuated shading device 21, a daylight sensor 22, and a controller 23. Other elements, such as a user interface and power source, will also be present in practical embodiments of system 20; such elements are implied in FIG. 1 but omitted for the sake of clarity.

Shading device 21 is a conventional device which can modulate the radiant flux through a window in response to an electronic actuating signal. Such devices include motorized window coverings (e.g. shades, curtains, and blinds) as well as some types of Smart Window. Sensor 22 is a device which produces a signal dependent on the irradiance of daylight incident upon it. Controller 23 is a conventional control device which registers the sensing signal of sensor 22 and which generates actuating signals for shading device 21.

FIG. 2A: TYPICAL CLOSED-LOOP DDC SYSTEM INSTALLATION

Depending on the location and orientation of sensor 22, a system such as system 20 can be used for either open-loop or closed-loop DDC. For closed-loop control (as provided by the system disclosed in U.S. Pat. No. 6,084,231), the sensor is located and oriented to sense the admitted daylight, either directly or by reflection. FIG. 2A depicts a side view (cross-section) of a room 24 in which system 20 is installed to provide closed-loop control. Shading device 21 is mounted on a host window 25 opposite a far wall 27. Sensor 22 is located near the top of shading device 21 near a ceiling 28 and is oriented so that it can sense daylight which first passes through window 25 and shading device 21, and is then reflected back toward sensor 22 from surfaces within room 24 (e.g. a desk 26, far wall 27, and ceiling 28). Controller 23 (as previously shown in FIG. 1) is also present but omitted from FIG. 2A for the sake of clarity.

Daylight-Harvesting Lighting System (not Shown)

Most installations of system 20 will also be accompanied by a daylight-harvesting lighting system (not shown in FIG. 2A) intended to maintain a roughly constant Work-Plane Illuminance (WPI), i.e. a roughly constant horizontal illuminance on a work surface, e.g. the top of desk 26. Such a system automatically dims the artificial lighting in the presence of admitted daylight from window 25, thereby "harvesting" the daylight to save energy. Such a daylight-harvesting lighting system can share components with system 20 (e.g. both may use the same controller 23 shown in FIG. 1), or can be completely separate systems.

Typical DDC Operation

Referring again to FIGS. 1 and 2, controller 23 (not shown in FIG. 2A) executes conventional steps, typically encoded in software or firmware (i.e. as program steps), to adjust shading device 21 to regulate the output of sensor 22 according to predetermined criteria. Typically, controller 23 adjusts shading device 21 to maintain the output of sensor 22 at a user-specified setpoint within a predetermined deadband. Because sensor 22 senses a portion of the daylight admitted by shading device 21 (e.g. as reflected from surfaces within room 24, e.g. desk 26, wall 27, or ceiling 28), the system thereby performs closed-loop control of the admitted daylight. DDC typically results in a greater average level of natural illumination when compared to manually-operated shading, and hence greater energy savings when used with a daylight-harvesting lighting system.

FIGS. 2B and 2C: Coordinate System

This disclosure makes reference to directions and angles in order to better describe the intended application and implementation of the subject daylight sensor. FIGS. 2B and 2C show the coordinate system and angle convention used for the directions and angles specified in this disclosure.

As shown in FIG. 2B, the axes of the coordinate system have the following orientations with respect to window 25:

The X-axis is parallel to the width of window 25, with the positive direction away from the observer's perspective (e.g. in FIG. 2A, the positive X direction, although not labeled, is inward into the plane of the drawing).

The Z-axis is parallel to the height of window 25, with the positive direction upward. When used to describe locations or directions, terms such as "bottom", "top", "upper", "lower", "higher", "upward", or "downward" used in this disclosure refer to the Z-axis, The Y-axis is perpendicular to the surface of window 25, with the positive direction toward desk 26 (i.e. into the room in which window 25 is located).

The X-Y plane is considered the azimuth plane, while the Y-Z plane is considered the elevation plane. Thus, angles in the X-Y plane are considered azimuth angles, while angles in the Y-Z plane are considered elevation angles.

FIG. 2C shows the angle convention used herein for both the azimuth (X-Y) and elevation (Y-Z) planes of the coordinate system. As with any Cartesian coordinate system, the angle of a ray in this system depends on its direction (e.g. the +Y half-axis points in the 0-degree direction in both azimuth and elevation, while the −Y half-axis points in the 180-degree direction in both azimuth and elevation). This disclosure uses the following convention for the direction of rays in the coordinate system:

Rays representing light rays are assumed to be in the direction in which the light travels. For example, the elevation angle of a light ray traveling from the top of window 25 downward and inward toward desk 26 in FIG. 2B is in the (Y, −Z) quadrant of FIG. 2C, and is therefore between −90 degrees and 0 degrees.

Rays representing a line of sight of a sensor are assumed to originate from the sensor. For example, the elevation angle of the line of sight of a sensor located on desk 26 and aimed outward and upward toward window 25 in FIG. 2B is in the (−Y, Z) quadrant of FIG. 2C, and is therefore between 90 and 180 degrees. Similarly, the azimuth angle of the line of sight of a sensor mounted at the center of window 25 and facing the right side of desk 26 in FIG. 2B is in the (X, Y) quadrant of FIG. 2C, and is therefore between 0 and 90 degrees.

When used in the context of elevation angles, terms such as "top", "upward", "upper", or "higher" used in this disclosure refer to angular proximity to the positive-Z half-axis (and, equivalently, angular distance from the negative-Z half-axis). Conversely, terms such as "bottom", "downward" or "lower" refer to angular proximity to the negative-Z half-axis (and, equivalently, angular distance from the positive-Z half-axis). For example, referring to FIG. 2C, an elevation angle of 135 degrees is "higher" than an angle of 180 degrees because it has greater angular proximity to the positive-Z half-axis. Similarly, an angular region in the elevation plane bounded by 20 degrees and 60 degrees has an upper edge at 60 degrees and a lower edge at 20 degrees.

Desired Relationship Between Output of Sensor 22 and Admitted Daylight

Unlike daylight-harvesting lighting systems, which are almost always intended to attempt to maintain a constant WPI, there is as yet no consensus in the art on the optimum control objectives for DDC. Most DDC systems attempt to maintain a roughly constant daylight component of the WPI. However, this leads to unsatisfying results from the perspective of the building occupants, because subjective perceptions of the admitted daylight level are relatively poorly correlated with WPI.

Based on feedback from users during development of the subject invention, a better control objective for system 20 is to admit as much daylight as possible up to a user-specified glare threshold. In order to accomplish this, the output of sensor 22 should be well-correlated with subjective perceptions of the admitted daylight level, and must be particularly sensitive to conditions that tend to cause glare. While the sensor disclosed in U.S. Pat. No. 6,084,231 meets these requirements to a greater degree than other sensors, further improvements are possible and can be advantageously achieved via the innovations disclosed herein.

Use of Horizontal Venetian Blind as Shading Device 21

Horizontal venetian blinds are perhaps the most widely used type of interior window covering in office buildings because they are inexpensive, easy to adjust, and offer excellent daylight control. However, they also present challenges in the context of DDC. Because the innovations disclosed herein can mitigate those challenges (in addition to offering benefits when used with other types of shading device), the following paragraphs provide additional information on horizontal blinds and the challenges in using them for DDC.

Unlike other types of shading device, a horizontal venetian blind offers two degrees of adjustment freedom:
  its slats can be lifted/lowered, and
  its slats can be tilted about their long axes.
Of these, the slat-tilt function is the most useful for DDC, for at least two reasons:
The slat-tilt function is less expensive to motorize than the slat-lift function. In fact, motorized-tilt horizontal venetian blinds are the least expensive type of electronically-adjustable shading device currently available.

The slat-tilt function gives venetian blinds a capability not shared by any other mainstream shading device: the capability to selectively pass/block light as a function of its angle of incidence. That, in turn, enables a venetian blind to block sunlight while still admitting useful diffuse daylight—a significant advantage for DDC.

However, the slat-tilt function also presents a challenge: tilting the slats changes the spatial distribution of the admitted daylight, which can confuse conventional daylight sensors.

For these reasons, motorized-tilt horizontal venetian blinds are arguably the most cost-effective shading device available for closed-loop DDC applications, but also the most difficult to use effectively.

FIGS. 3A-3C: Convention Regarding Horizontal Blind Slat-Tilt Angles

The slat-tilt angle of a horizontal blind is a term whose general meaning is recognized in the art, but differences in detailed definitions of the term result in a 180-degree ambiguity in the assigned angle for a given slat orientation. This disclosure uses the coordinate system and angle convention of FIGS. 2B and 2C to define slat-tilt angles, and further uses the convention that the slat tilt angle refers to the angle of a ray in the same general direction as daylight admitted by the blind. This convention is further illustrated in FIGS. 3A-3C:

FIG. 3A depicts a motorized horizontal venetian blind 21A mounted on window 25 with its slats oriented so that they are horizontal, i.e. along the Y-axis of FIG. 2C. In this orientation, admitted daylight travels in the direction of the +Y half-axis rather than in the direction of the −Y half-axis, so the slat tilt-angle is considered to be zero rather than 180 degrees. This setting is also referred to herein as the zero-tilt setting. A zero-tilt setting admits plenty of daylight and provides the best outward view through the blind, so most building occupants prefer a near-zero tilt when there is no risk of glare.

FIG. 3B depicts blind 21A with its slats tilted to allow a view of the ground while blocking a view of the sky. In this orientation, admitted daylight travels in the direction of the (+Y, +Z) quadrant of FIG. 2C. Thus, slat tilt angles which tend to block a sky view but allow a ground view are considered to be positive tilt angles, and such a setting is referred to herein as a positive-tilt setting. A positive-tilt setting can block sunlight while admitting substantial amounts of diffuse daylight. The maximum positive-tilt setting is also referred to herein as the fully closed setting.

FIG. 3C depicts blind 21A with its slats tilted to allow a view of the sky while blocking a view of the ground. In this orientation, admitted daylight travels in the direction of the (+Y,−Z) quadrant of FIG. 2C. Thus, slat tilt angles which tend to block a ground view but allow a sky view are considered to be negative tilt angles, and such a setting is referred to herein as a negative-tilt setting. A negative-tilt setting can admit even more daylight than a zero-tilt setting, but can also obscure the view and give rise to excessive glare when the sky is bright.

FIG. 4: Typical DDC Installation Incorporating Horizontal Blind

FIG. 4 depicts a typical installation of a DDC system such as that previously shown in FIGS. 1 and 2A (along with the Y and Z axes of the coordinate system of FIG. 2B), but in which the shading device is motorized horizontal blind 21A.

As is known in the art, the irradiance at a given point within a room due to daylight admitted by a venetian blind is a complex function of a large number of variables, including installation-dependent variables (e.g. the room layout and reflectance of the interior surfaces) and time-dependent variables (e.g. sun/sky conditions), as well as the slat-tilt angle of the venetian blind. However, extensive testing of a system such as system 20 has revealed that the key to optimizing the performance of sensor 22 is to recognize that the incident irradiance can be effectively resolved into a finite number of key discrete components. FIG. 4 depicts these discrete daylight components in addition to the elements of system 20 described previously.

Daylight Components Incident on Window 25

As shown in FIG. 4, there are three components of daylight incident on the window 25:

a sky component 29, e.g. from the sun, clouds, or clear blue sky;

a horizontal component 30, e.g. daylight reflected toward window 25 from nearby buildings or directly incident from a rising or setting sun; and a ground component 31, e.g. from ground-reflected sunlight or ground-reflected daylight from bright clouds.

The relative magnitudes of components 29-31 vary with changing sun/sky conditions in the following way:

In clear blue skies with no sunlight incident on window 25, ground component 31 will typically be much larger than sky component 29 or horizontal component 30.

Sky component 29 will dominate components 29-31 when the sky is cloudy or high-angle sunlight (e.g. from noontime sun) is incident on window 25.

Horizontal component 30 will typically dominate components 29-31 when low-angle sunlight is incident on window 25 (e.g. from a rising or setting sun), or when sunlight is reflected from the facades of nearby buildings.

Daylight Components Admitted into Room 24

The tilt setting of blind 21A determines how much of these components are admitted into room 24:

Admission of sky component 29 is maximized—and admission of ground component 31 is minimized—when blind 21A has a negative-tilt setting.

Admission of horizontal component 30 is maximized when blind 21A has a zero-tilt setting.

Admission of ground component 31 is maximized—and admission of sky component 29 is minimized—when blind 21A has a positive-tilt setting.

Daylight Components Reaching Sensor 22

After being admitted by blind 21A, the three daylight components 29-31 can be reflected toward sensor 22 in the form of four significant interior components shown in FIG. 4:

a ceiling component 32,
a far-zone component 33,
a near-zone component 34, and
a slat component 35.

In addition, ground component 31 may also directly reach sensor 22.

There may also be other components (e.g. from side walls which are not shown in FIG. 4), but components 32-35 described above have the most significant influence on the irradiance at sensor 22 and also on the daylight level as subjectively perceived by room occupants.

Because these components originate mostly from diffuse (vice specular) reflections, each component's point of origin as depicted in FIG. 4 is purely notional, and is intended to represent the centroid of a region whose radiance, from the perspective of sensor 22, can have a significant impact on the performance of sensor 22.

The actual locations of these regions and the centroids thereof will of course vary with factors such as the shape and dimensions of room 24, the dimensions and location of window 25, the reflectance of surfaces within room 24, and the location of sensor 22. However, the following generalizations can be made regarding the effective points of origin of these components:

Near-zone component 34 can be considered to originate from a point below ceiling 28 and which is located at a distance from window 25 along the +Y-axis that is equal to or less than about 1.5 times the difference between the heights (i.e. Z-axis coordinates) of the point and the top of window 25. In a typical room with sensor 22 located at the top of window 25 as in FIG. 4, the line of sight from sensor 22 to the point of origin of near-zone component 34 will have an elevation angle of between about −30 degrees and about −90 degrees in the coordinate system of FIGS. 2B and 2C.

Far-zone component 33 can be considered to originate from a point below ceiling 28 and which is located at a distance from window 25 along the +Y-axis that is greater than about 1.5 times the difference between the heights (i.e. Z-axis coordinates) of the point and the top of window 25. Depending on the room dimensions, the point of origin of far-zone component 33 may be wall 27 or other vertical surface, or a floor or other horizontal surface. In a typical room with sensor 22 located at the top of window 25 as in FIG. 4, the line of sight from sensor 22 to the point of origin of far-zone component 33 will have an elevation angle of between about 0 degrees and about −30 degrees per the coordinate system and angle convention of FIGS. 2B and 2C.

Ceiling component 32 originates from a point on ceiling 28. In a typical room with sensor 22 located at the top of window 25 as in FIG. 4, the line of sight from sensor 22 to the point of origin of ceiling component 32 will have an elevation angle of between 0 degrees and about 90 degrees per the coordinate system and angle convention of FIGS. 2B and 2C.

Slat component 35 originates from a slat of blind 21A. In a typical room with sensor 22 located at the top of window 25 as in FIG. 4, slat component 35 can be considered to originate from a point located at an elevation angle of less than or equal to about −90 degrees per the coordinate system and angle convention of FIGS. 2B and 2C.

Relationship Between Components 29-31 and 32-35

The relationships between the daylight components incident on window 25 (i.e. components 29-31) and the reflected components at the location of sensor 22 (i.e. components 32-35) are complex and depend on numerous variables. However, the most significant aspects of these relationships can be summarized as follows:

For the purposes of this discussion, the interior surfaces of room 24 can be considered to be substantially Lambertian reflectors, i.e. they reflect incident radiation with an intensity that is proportional to the cosine of the angle between the surface normal and the incident radiation.

As a result, far-zone component 33 is strongly influenced by horizontal component 30 but weakly influenced by components 29 and 31. This is because horizontal component 30 is coupled to far-zone component 33 via a single reflection from wall 27, and because component 30 strikes wall 27 at an angle that is close to the surface normal. On the other hand, components 29 and 31 are coupled to component 33 via two reflections (i.e. first from desk 25 and ceiling 28, respectively, and then from wall 27), each of which attenuates the radiation. Further, after the first reflection, the components strike wall 27 at a much more oblique angle than component 30.

In the same way, ceiling component 32 is strongly influenced by ground component 31 but weakly influenced by components 29 and 30.

Similarly, near-zone component 34 is strongly influenced by sky component 29 and weakly influenced by components 30 and 31.

Slat component 35 has both a specular sub-component (due to specular reflection from the slat surfaces) and a diffuse component (due to Lambertian reflection from and between the slat surfaces). The specular component is strongly influenced by sky component 29, while the Lambertian component is influenced by all of components 29-31.

Relationship between Daylight Level Perceived by Room Occupants and Daylight Irradiance on Sensor 22

Referring again to FIG. 4, the daylight level perceived by occupants of room 24 is most strongly influenced by sky component 29 and horizontal component 30. This is because these components strongly influence the apparent luminance of surfaces with the occupants' field-of-view, and also because (depending on the tilt setting of blind 21A) they can directly reach the occupants' eyes (of particular significance when components 29 and 30 include sunlight).

On the other hand, the irradiance at a sensor mounted at the top of a window like sensor 22 is most strongly influenced by ground component 31, ceiling component 32, and slat component 35. This is because ground component 31, if admitted by blind 21A, can sometimes directly reach sensor 22, and because ceiling component 32 and slat component 35 travel only a short distance before reaching sensor 22.

As a result of these factors, the relationship between the daylight level perceived by room occupants and the daylight irradiance on sensor 22 will depend on the relative strengths of components 29-31 as well as on the tilt setting of blind 21A. The following paragraphs provide a discussion of these effects.

Window Luminance as Proxy for Perceived Daylight Level

The relationship between the daylight level perceived by building occupants and established photometric quantities is not well-understood in the art. However, window luminance, which can be readily measured, is reasonably well-correlated with the perceived daylight level over a substantial range of sun and sky conditions. Accordingly, window luminance is used as a proxy for the perceived daylight level in the following discussion.

Window luminance (particularly when viewed through a venetian blind) varies as a function of the orientation and position of the luminance-measuring equipment relative to the window. With reference to the coordinate system of FIG. 2B, luminance data referenced in this disclosure were obtained with luminance measuring equipment oriented and positioned as follows:
  facing window 25;
  positioned along the X-axis at the middle of the window;
  positioned along the Y-axis about two window-heights inward from the window; and
  positioned along the Z-axis at about eye level for an occupant seated at a desk.

Figure 5:
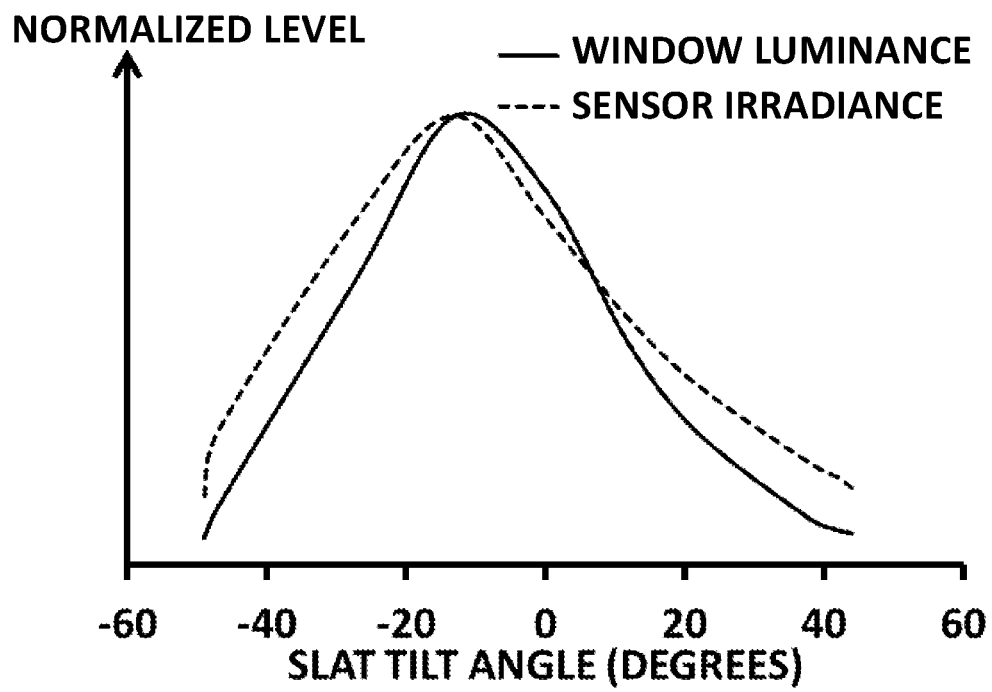
FIG. 5 shows plots of measured window luminance and sensor irradiance versus slat-tilt angle under conditions in which the total irradiance on the window is dominated by a sky component of daylight, but when no sunlight is present.

FIG. 5: Window Luminance and Sensor Irradiance Vs. Slat-Tilt Angle when Window Irradiance is Dominated by Sky Component 29 without Sunlight When the irradiance on window 25 is dominated by sky component 29 but does not include sunlight (e.g. in bright cloudy skies), near-zone component 34 is so much stronger than the other interior components 32, 33, and 35 that it dominates the irradiance at sensor 22. Thus, under these conditions, both the perceived daylight level and the irradiance on sensor 22 are determined mostly by sky component 29. The result is that both the perceived daylight level and the irradiance on sensor 22 vary in the same way with changes in the tilt setting of blind 21A. In other words, changes in the tilt setting that tend to increase (or decrease) the perceived daylight level will also tend to increase (or decrease) the irradiance on sensor 22.

This is evident in FIG. 5, which shows typical plots of the luminance of blind 21A and the irradiance at sensor 22 as a function of the slat tilt angle of blind 21A under a bright, cloudy sky without sunlight (with both curves normalized to the same peak amplitude). Note the similarity between the shapes of the two curves.

Figure 6:
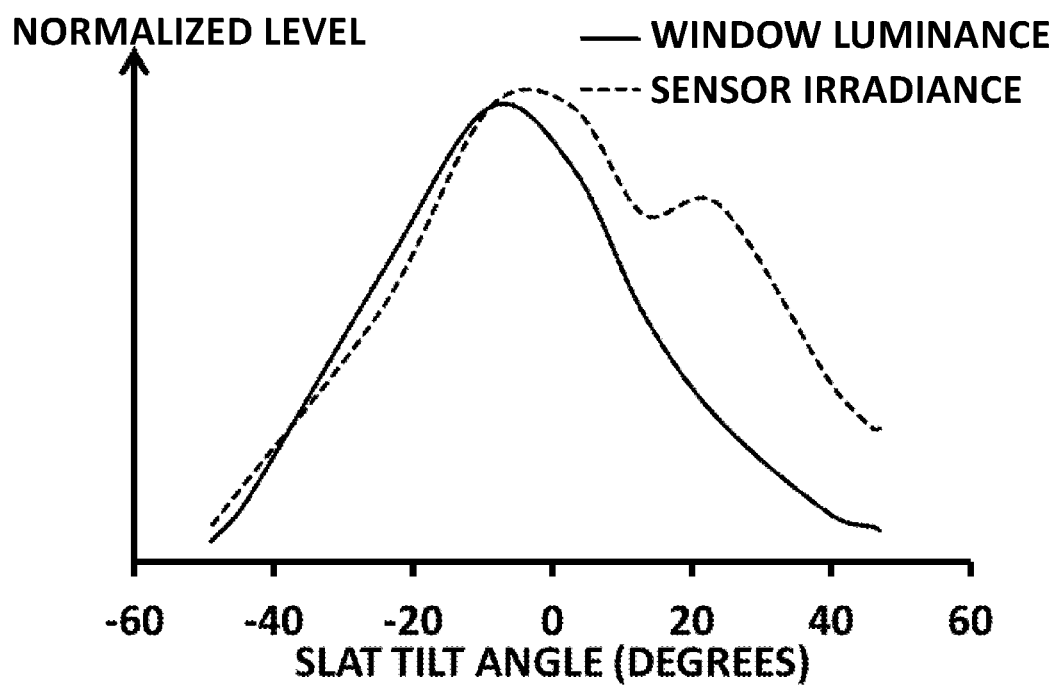
FIG. 6 shows plots of measured window luminance and sensor irradiance versus slat-tilt angle under conditions in which the total irradiance on the window is dominated by a sky component of daylight that includes sunlight.

FIG. 6: Window Luminance and Sensor Irradiance Vs. Slat-Tilt Angle when Window Irradiance is Dominated by Sky Component 29 with High-Angle Sunlight When the irradiance on window 25 is dominated by sky component 29 but includes sunlight from a high elevation angle (i.e. when the solar altitude is relatively high), near-zone component 35 will still typically dominate the other interior components 32, 33, and 35 except when the slats of blind 21A have a slightly positive tilt setting. At such settings, high-angle sunlight will strike the surface of the slats at an angle close to the surface normal, sharply increasing slat component 35 and thereby causing a spike in the irradiance at sensor 22. On the other hand, slat component 35 has only a minor effect on the subjectively perceived daylight level. Under such conditions, the perceived daylight level and the irradiance on sensor 22 will not necessarily vary in the same way with changes in the tilt setting of blind 21A.

This is evident in FIG. 6, which shows typical plots of the normalized window luminance (as viewed through blind 21A) and the normalized irradiance at sensor 22 as a function of the slat tilt angle of blind 21A under a bright, partly cloudy sky with high-angle sunlight incident on window 25. The effects of slat component 35 are evident in the bumps in the irradiance curve at positive tilt angles.

Figure 7:
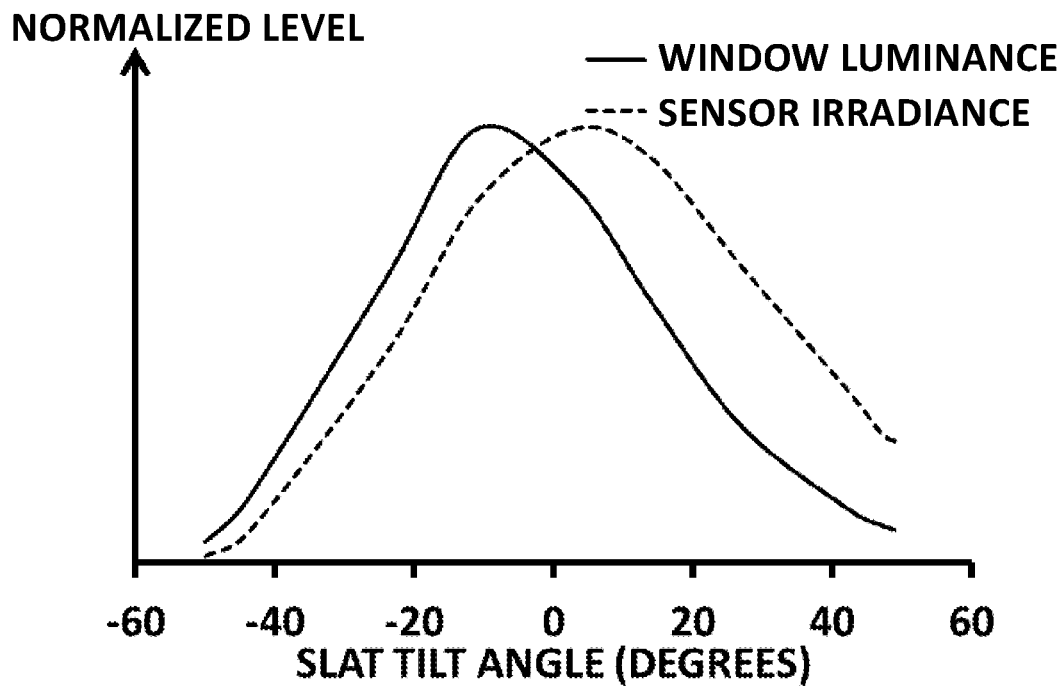
FIG. 7 shows plots of measured window luminance and sensor irradiance versus slat-tilt angle under conditions in which the total irradiance on the window is dominated by a ground component of daylight.

FIG. 7: Window Luminance and Sensor Irradiance Vs. Slat-Tilt Angle when Window Irradiance is Dominated by Ground Component 31

When the irradiance on window 25 is dominated by ground component 31 (e.g. in clear blue skies without sunlight incident on window 25), then interior components 32-35 will be dominated by ceiling component 32. Ground component 31 may also directly add significantly to the irradiance at sensor 22. However, because ground component 31 and ceiling component 32 have only a weak influence on the perceived daylight level (which is determined mostly by sky component 29 and horizontal component 30), the perceived daylight level and the irradiance on sensor 22 will not necessarily vary in the same way with changes in the tilt setting of blind 21A.

This is evident in FIG. 7, which shows typical plots of the normalized window luminance (as viewed through blind 21A) and the normalized irradiance at sensor 22 as a function of the slat tilt angle of blind 21A under a clear, blue sky without sunlight incident on window 25. The impact of ground component 31 (via ceiling component 32) on the sensor irradiance at positive tilt angles is clearly evident, causing the irradiance curve to be broader and shifted in the positive tilt direction with respect to the luminance curve. The effect is referred to herein as "tilt-curve mismatch".

Implications of Curves of FIGS. 6 and 7

Window luminance is known to be reasonably well-correlated with subjective perceptions of the brightness of daylight within a windowed space. Thus, the inconsistencies between the luminance-versus-tilt and irradiance-versus-tilt curves of FIGS. 6 and 7 show that the output of sensor 22 will not always vary in the same way with the tilt setting of blind 21A as the perceived daylight level.

These inconsistencies between the luminance-versus-tilt and irradiance-versus-tilt curves are much more significant for positive slat-tilt angles than for negative slat-tilt angles. Thus, these inconsistencies will have a relatively minor impact on the DDC operation of system 20 if the tilt setting of blind 21A is limited to just negative tilt settings. Unfortunately, negative-tilt settings are much less effective than positive-tilt settings at controlling sunlight, which is a primary source of daylight glare.

If the DDC protocol implemented by system 20 does, in fact, allow positive-tilt settings, then the inconsistencies between the luminance-versus-tilt and irradiance-versus-tilt curves shown in FIGS. 6 and 7 can degrade the effectiveness of system 20 in regulating the perceived daylight level. Specifically, they can cause system 20 to adjust blind 21A to either excessively positive or excessively negative tilt settings.

For example, assume that blind 21A is at the zero-tilt setting and that the output of sensor 22 rises enough to require a reduction in the daylight level. The system will then begin increasing the slat tilt angle of blind 21A from its initial value of zero degrees. However, if the sky is clear and there is no sunlight incident on window 25, then as shown in FIG. 7, the output of sensor 22 will actually increase until the slat tilt reaches about 10 degrees before finally beginning to decrease. In fact, controller 23 must increase the slat tilt to nearly 20 degrees before the sensor output begins to drop below the original value at zero degrees. Meanwhile, the perceived daylight level will have been decreasing monotonically with the increasing slat tilt.

The result, from the perspective of the room occupants, will be an apparent over-closing of blind 21A and a reduction in the energy savings achievable through daylight harvesting.

Window Irradiance Dominated by Horizontal Component 30

When the irradiance on window 25 is dominated by horizontal component 30 (e.g. when low-angle sunlight is incident on window 25 due to a rising or setting sun), far-zone component 33 will be much stronger than the other interior components 32, 34, and 35. The result is that both the perceived daylight level and the irradiance on sensor 22 will vary in the same way with changes in the tilt setting of blind 21A. In other words, changes in the tilt setting that tend to increase (or decrease) the perceived daylight level will also tend to increase (or decrease) the output of sensor 22.

However, while low-angle sunlight can cause severe glare, the resulting irradiance on window 25 can be relatively low due to the long atmospheric path length traversed by the sunlight. Further, referring again to FIG. 4, wall 27 is relatively far from sensor 22, further reducing the irradiance of far-zone component 33 at sensor 22.

Thus, there can be a substantial discrepancy between the perceived daylight level and the irradiance at sensor 20, degrading system 20's ability to control glare.

Implications for Shading Devices Other than Venetian Blinds

Issues similar to those described above can occur with shading devices other than venetian blinds.

Specifically, the fact that ground component 31 often has a larger effect than sky component 29 on the irradiance on sensor 22—while the sky component 29 often has a larger effect than ground component 31 on the perceived daylight level—can degrade the ability of system 20 to regulate the perceived daylight level regardless of the type of shading device.

For example, referring again to FIG. 4, assume that a motorized roller shade is used instead of blind 21A. Further assume that the sky is cloudy and that it slowly changes to a clear blue sky. As this happens, sky component 29 decreases while ground component 31 increases. Thus, the irradiance at sensor 22 will increase while the perceived daylight level actually decreases, potentially causing the system to over-close the shade.

Also referring to FIG. 4, when the irradiance on window 25 is dominated by ground component 31, changes in the setting of a roller shade used instead of blind 21A can cause a much larger change in the irradiance at sensor 22 than in the perceived daylight level. For example, assume that the shade begins to lower from the fully raised position. As it descends, it blocks ground component 31 from striking the portion of ceiling 28 closest to sensor 22, causing a large drop in irradiance on the sensor while causing only a negligible reduction in the perceived daylight level.

Another issue common to all types of shading device is the discrepancy between the perceived daylight level and the irradiance at sensor 20 when the window irradiance is dominated by horizontal component 30, e.g. due to low-angle sunlight. The problem of reliably sensing low-angle sunlight is a long-standing problem in the art of DDC, independent of the type of shading device.

Innovations

The following paragraphs describe innovative improvements to sensor 22 to mitigate the issues described above.

Optimized Sensor Field-of-View (Fov)

The performance of system 20 can be improved significantly by optimizing the Field-Of-View (FOV) of sensor 22. The disclosed FOV optimization is advantageous for any sensor intended to sense daylight admitted by a window, and is particularly advantageous for a daylight sensor located near a window or when the window is shaded by a horizontal venetian blind.

FOV-Related Terminology

A sensor's Field-Of-View (FOV) is a cone-shaped volume (which may be pyramidal), such that the sensor's responsivity in the direction of any point within the volume is greater than or equal to a specified fraction of the sensor's peak angular responsivity. For example, a −3 dB FOV of a sensor is a volume such that the sensor's responsivity in the direction of any point within the volume is greater than or equal to −3 decibels relative to the sensor's peak angular responsivity (i.e. greater than or equal to one-half of its maximum angular responsivity). If no fraction is specified, then the FOV defines a volume such that the sensor has significant responsivity in the direction of any point within the volume.

An FOV may be characterized using the following terms:
The direction of the FOV (also referred to as the FOV direction) of a sensor is a ray extending outward from a sensor along the axis of the FOV. The FOV direction may be specified by stating that the FOV points in a particular direction, e.g. "an FOV which points downward" has a downward FOV direction. Note that the FOV direction is not necessarily the direction of the sensor's peak angular responsivity.

The edges of an FOV are the boundaries of its cross-sections in the azimuth and elevation planes. The upper edge is the edge in the elevation plane whose angle is closest to that of the positive-Z half-axis (and therefore furthest from that of the negative-Z half-axis), while the lower edge is the edge in the elevation plane whose angle is closest to that of the negative-Z half-axis (and therefore furthest from that of the positive-Z half-axis). For example, for an FOV that is bounded by −45 degrees and 45 degrees in elevation, the upper edge has an angle of 45 degrees, while for an FOV bounded by 135 degrees and 180 degrees in elevation, the upper edge has an angle of 135 degrees. Similarly, the right edge and left edge of an FOV are the right-most and left-most edges of the FOV in the azimuth plane from the sensor's perspective (i.e. looking outward from the sensor).

The width of an FOV is the angle between its edges in a specified plane. If no plane is specified, then the width is substantially the same in both the azimuth and elevation planes.

The direction and edges of an FOV may be explicitly specified in terms of angles in the coordinate system of FIG. 2B, or may be implicitly characterized through reference to other entities (including daylight components).

Referring again to FIGS. 2B, 2C, and 4, the following are examples of the different ways in which an FOV may be characterized herein:

An FOV may be characterized in terms of the angles of its edges in a specified plane of the coordinate system of FIG. 2B. The plane may be explicitly specified, e.g. "the Y-Z plane", or implicitly specified via the terms "elevation" (which refers to the Y-Z plane of the coordinate system of FIG. 2B) or "azimuth" (which refers to the X-Y plane). For example, "a −3 dB elevation FOV bounded by −30 degrees and 10 degrees" refers to a −3 dB FOV with a cross-section in the Y-Z plane that extends from −30 degrees to 10 degrees in the coordinate system of FIG. 2B and using the angle convention shown in FIG. 2C.

The FOV may be characterized via reference to other entities, e.g. daylight components 29-35 of FIG. 4. For example, still referring to FIG. 4, "an FOV of sensor 22 that tends to make it more sensitive to near-zone component 34 than to ceiling component 32" specifies an FOV of sensor 22 such that its responsivity in the direction of the point of origin of near-zone component 34 is greater than its responsivity in the direction of the point of origin of ceiling component 32. Per the angle convention of FIG. 2C, rays defining the bounds of the FOV point away from the sensor. Therefore, given the location of sensor 22 shown in FIG. 4 (i.e. at the top of window 25), and per the coordinate system and angle conventions of FIGS. 2B and 2C, an elevation FOV bounded by −90 degrees and −45 degrees would be consistent with the above FOV specification, but an elevation FOV bounded by 0 degrees and 45 degrees would not.

Alternatively, the FOV of a sensor may be characterized via reference to other entities but without explicitly or implicitly specifying the location of the sensor. In this case, the bounding angles of the FOV in a given plane will depend on the sensor's location in that plane with respect to the referenced entities. For example, still referring to FIG. 4, a sensor FOV may be characterized as "an FOV of a sensor that tends to make it more sensitive to near-zone component 34 than to ceiling component 32". If the sensor is located at the top of wall 27, then per the coordinate system and angle convention of FIGS. 2B and 2C, an elevation FOV bounded by −135 degrees and −90 degrees would be consistent with the above FOV specification, but an elevation FOV bounded by 135 degrees and 180 degrees would not.

The FOV may also be characterized in terms of whether it does or does not include a specific entity or overlap a specific angular region. For example, still referring to FIG. 4, "a −20 dB FOV of sensor 22 that excludes ceiling component 32" characterizes an FOV of sensor 22 such that the responsivity in the direction of the point of origin of ceiling component 32 is less than −20 dB relative to the peak responsivity. Similarly, "a −3 dB FOV of sensor 22 that includes near-zone component 34" characterizes an FOV of sensor 22 such that the responsivity in the direction of the point of origin of near-zone component 34 is greater than or equal to −3 dB relative to the peak responsivity.

This disclosure includes descriptions of sensors that include a photosensor whose FOV is constrained by a device such as a cover, panel, baffle, or housing. When referring to the intrinsic (unconstrained) FOV of such a photosensor (i.e. the FOV of the photosensor if it were unconstrained by the FOV-constraining device), the term unconstrained FOV is used. If the adjective "unconstrained" is omitted, then the FOV refers to the FOV of the photosensor as constrained by the FOV-constraining device. Alternatively, the term constrained FOV may also be used.

Of course, these metrics and terms are incidental to the disclosed innovations and serve only to facilitate their description.

Overview of FOV Optimization

The FOV optimization disclosed herein involves a trade-off: the FOV must be broad enough to effectively sense daylight components which tend to cause glare, but also narrow enough to exclude daylight components which tend to degrade the correlation between the sensor output and the perceived daylight level. Thus, referring again to FIGS. 2B, 2C, and 4, the disclosed optimization of the FOV of sensor 22 represents a trade-off between two conflicting requirements:

The −3 dB FOV should be as broad as possible to enable sensing of glare anywhere in the room 24, and particularly due to low-angle sunlight. Thus, the −3 dB FOV should be broad enough to sense both near-zone component 34 and far-zone component 33.

However, the −20 dB FOV should be narrow enough to exclude certain components of the ambient illumination that tend to degrade the correlation between the sensor output and the perceived daylight level. Specifically, the −20 dB FOV should be narrow enough to exclude ground component 31, ceiling component 32, and slat component 35.

Meeting either of these requirements individually can be advantageous, but meeting both simultaneously provides the best performance.

Minimum Required FOV

If the FOV of sensor 22 is too narrow, it can be incapable of detecting glare-inducing conditions that are localized to particular portions of room 24.

Glare can be caused by both far-zone component 33 and near-zone component 34. However, the glare caused by near-zone component 34 (e.g. due to high-angle sunlight or bright clouds) is associated with high radiant flux through the window, while far-zone component 33 can cause glare even when the flux is low (e.g. due to low-angle sunlight). Further, when the flux in near-zone component 34 is very high, it can augment far-zone component 33 via reflections between room surfaces. For these reasons, and despite the fact that near-zone 34 can cover a broader angular range than far-zone component 33 from the perspective of sensor 22, an FOV broad enough to reliably sense glare from far-zone component 33 will evidently also reliably sense glare from near-zone component 34.

For the location of sensor 22 in FIG. 4 (i.e. at the top of window 25), it appears that the −3 dB FOV should have a lower edge no higher than −50 degrees and an upper edge no lower −10 degrees in elevation, and a right edge no less than 30 degrees and a left edge no greater than −30 degrees in azimuth, per the angle convention of FIG. 2C.

Maximum FOV

As noted previously, the FOV of sensor 22 should be narrow enough to exclude certain components of the ambient illumination that tend to degrade the relationship between the sensor output and the occupant-perceived daylight level. Specifically, it should be narrow enough to effectively block ground component 31, ceiling component 32, and slat component 35. Under low-glare conditions, these components can be two orders of magnitude greater than far-zone component 33 and near-zone component 34, so the −20 dB FOV, rather than the −3 dB FOV, is the appropriate metric to characterize the required maximum FOV.

Blocking of Ceiling Component 32

In order to effectively block ceiling component 32, the elevation angle of the upper edge of the FOV of sensor 22 must be limited to a value that depends on the vertical separation between sensor 22 and ceiling 28. If sensor 22 is mounted close to ceiling 28 (as will be the case in most installations), then the upper edge of the −20 dB FOV should have an elevation angle of no greater than about 0 degrees.

Blocking of Ground Component 31 and Slat Component 35

In most installations, ground component 31 will arrive from a lower elevation angle than slat component 35. Thus, if slat component 35 is blocked, then ground component 31 will also be blocked.

In order to effectively block slat component 35, the elevation angle of the lower edge of the FOV of sensor 22 must no less than a value that depends on the Y-axis distance between sensor 22 and blind 21A. If sensor 22 is mounted close to blind 21A in the Y-axis (as will be the case in most installations), then the lower edge of the −20 dB elevation FOV should be no less than about −90 degrees.

Azimuth FOV Considerations

The preceding discussion focused on the elevation FOV of sensor 22. However, the azimuth FOV of sensor 22 can also influence the relationship between the output of sensor 22 and the perceived daylight level, although to a lesser degree than the elevation FOV.

The azimuth FOV can become significant when a side wall is present near blind 21A, because a side wall can reflect both ground component 31 and slat component 35 toward sensor 22. This effect can be mitigated by constraining the −20 dB azimuth FOV to block daylight reflected from a proximal side wall. The required FOV constraint depends on the proximity between sensor 22 and the side wall: the closer the side wall, the more constrained the FOV should ideally be in that direction. If the side wall is more than about 2 meters from sensor 22, then no azimuth FOV constraint appears necessary. If the side wall is very close to (i.e. within a few cm of) sensor 22, then the edge of the azimuth FOV closest to the side wall should ideally be constrained to be parallel to the side wall.

FOV Optimization for use with Other Shading Devices

The FOV optimization described above is also advantageous when sensor 22 is used to sense the daylight admitted by shading devices other than horizontal blinds. The major difference is that, if the shading device is not a horizontal blind, then slat component 35 (as shown in FIG. 4) will not be present and need not be blocked.

In this case, the maximum elevation angle of the upper edge of the −20 dB FOV will still be limited by the need to block ceiling component 32. However, the minimum elevation angle of the lower edge of the −20 dB FOV will be driven by the need to block ground component 31 rather than slat component 35. This minimum required elevation angle will depend on factors such as the vertical separation between sensor 22 and the window sill, the height of the window above the ground, and the reflectance of the ground as a function of distance from the window.

In general, the minimum elevation angle to block ground component 31 will be lower than the minimum elevation angle to block slat component 35. However, the difference will typically be small (e.g. less than 20 degrees), and there is limited benefit to reducing the elevation angle of the lower edge of the FOV. Therefore, the same FOV constraints that work well with horizontal blinds will also work well with other shading devices.

Summary of Optimum FOV Requirements

As noted previously, the −3 dB FOV of sensor 22 should be as broad as possible to enable sensing of glare anywhere in room 24, and particularly due to low-angle sunlight. Thus, the −3 dB FOV should be broad enough in both azimuth and elevation to sense both near-zone component 34 and far-zone component 33. On the other hand, the −20 dB FOV should be narrow enough to exclude certain components of the ambient illumination that tend to degrade the correlation between the sensor output and the perceived daylight level; specifically, the −20 dB FOV should be narrow enough to exclude ground component 31, ceiling component 32, and slat component 35.

As noted previously, the angles of the FOV edges necessary to achieve this will depend on numerous installation-specific variables. The values given above are not definitive, but rather reflect typical values which have worked well in developmental testing of the subject invention, and can be summarized as follows.

The upper edge of the −20 dB FOV (driven by the need to block ceiling component 32) should have an elevation angle no greater than about 0 degrees, while the upper edge of the −3 dB FOV (driven by the need to sense far-zone component 34) should have an elevation angle of no less than about −10 degrees.

The lower edge of the −3 dB FOV (driven by the need to sense near-zone component 34) should have an elevation angle no greater than about −50 degrees, while the lower edge of the −20 dB FOV (driven by the need to block slat component 35 and ground component 31) should have an elevation angle no less than about −90 degrees.

The right and left edges of the −3 dB FOV (driven by the need to sense near-zone component 34) should have azimuth angles of no less than about 30 degrees and no greater than about −30 degrees, respectively. However, if there is a side wall in proximity to sensor 22, then the −20 dB azimuth FOV should be constrained in the direction of the side wall.

Implementation of Optimized FOV

The implementation of the optimized FOV described above is facilitated by the fact that the illumination components to be sensed are relatively strong, eliminating the need for optical gain.

However, the implementation is hampered by the fact that there can be little angular separation between the required −20 dB and −3 dB FOVs. For example, for typical installations of sensor 22, the upper edge of the −20 dB elevation FOV (driven by the need to block ceiling component 33) should be no greater than about 0 degrees, while the upper edge of the −3 dB elevation FOV (driven by the need to sense far-zone component 34) should be no less than about −10 degrees. The inherent directionality provided by the molded optics in off-the-shelf photosensors (such as photodiodes and LEDs) is generally insufficient to meet both of these requirements. For example, a photodiode in a plastic package with a molded lens having a specified −3 dB FOV width of 40 degrees will typically have a −20 dB FOV width of greater than 120 degrees.

Fortunately, the required FOV can still be achieved cost-effectively.

Figure 8:
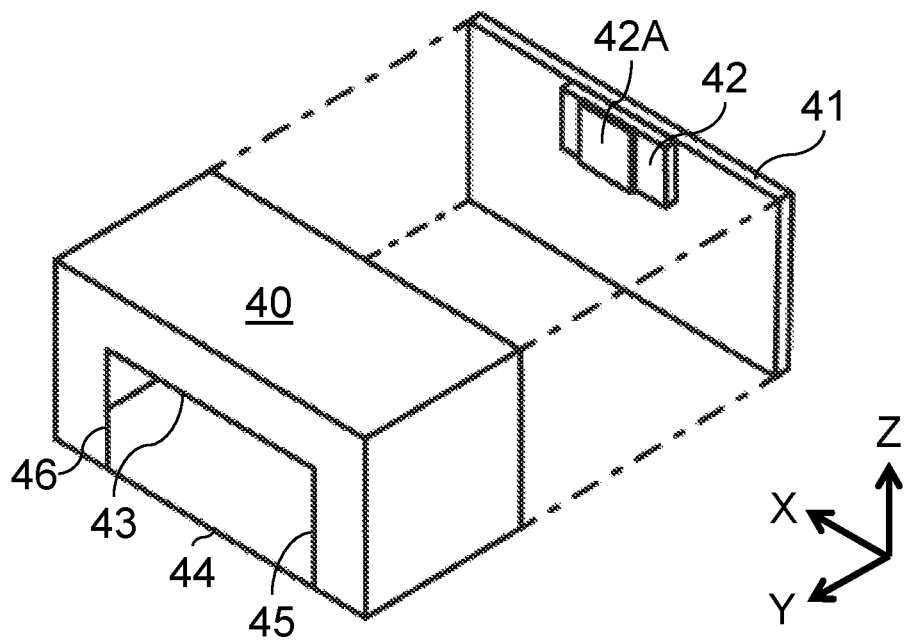
FIG. 8 shows an exploded perspective view of a daylight sensor with FOV optimization.
Figure 9:
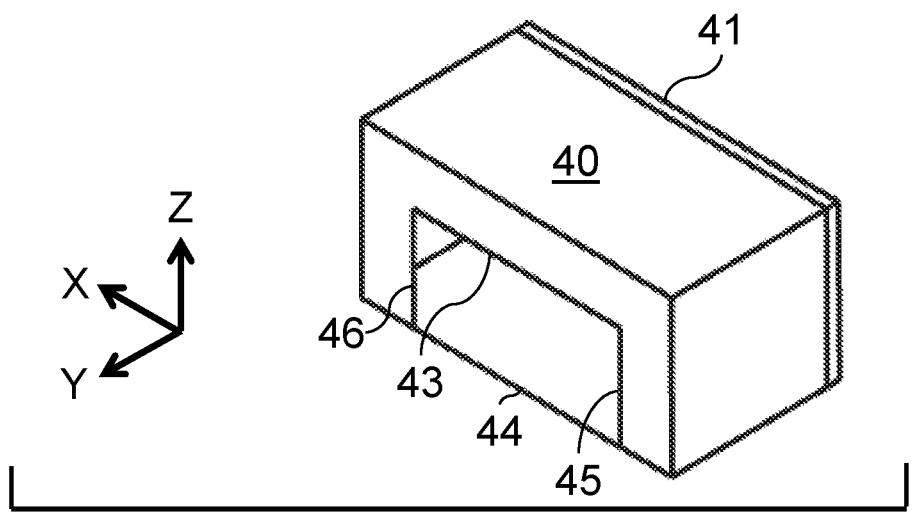
FIG. 9 shows a perspective view of a daylight sensor with FOV optimization.

FIGS. 8 and 9: Fov Constrained by Aperture in Opaque Housing or Panel

An advantageous way to achieve the optimized FOV is to place a photosensor having the required −3 dB FOV within an opaque housing or behind an opaque panel having an aperture located and shaped to provide the desired −20 dB FOV. The FOV of the photosensor without the housing or panel is referred to herein as the unconstrained FOV, while the FOV of the photosensor in the housing or behind the panel is referred to as the constrained FOV. When referring to the FOV of a sensor assembly (or other assembled device) that includes a photosensor behind a cover, panel, baffle, or housing, the term "constrained" is implied if not explicitly stated.

FIG. 8 shows an exploded view of such an embodiment of sensor 22, while FIG. 9 shows an assembled view of the same embodiment, along with a coordinate reference frame to indicate the installed orientation relative to the room coordinate system of FIG. 2B.

A housing 40 is mounted on a Printed-Circuit Board (PCB) 41. Not visible in FIG. 9 but shown in FIG. 8, a photosensor 42 having a photosensitive surface 42A is also mounted on PCB 41. Housing 40 has a rectangular aperture formed by a top edge 43, a bottom edge 44, a left edge 45, and a right edge 46. In a typical DDC system, the embodiment of sensor 22 shown in FIGS. 8 and 9 would be installed as shown in FIG. 4, with the photosensitive surface 42A facing wall 27.

Photosensor 42 can be, e.g., an off-the-shelf surface-mounted photodiode (or LED used as a photodiode) without directive optics; such devices typically have an unconstrained −3 dB FOV width of about 120 degrees. Housing 40 can be, e.g., an injection-molded plastic or coated stamped-metal assembly that is substantially opaque to (and has low reflectance at) the wavelengths to be sensed by photosensor 42.

Housing 40 and the aperture formed by edges 43-46 together determine the constrained FOV of photosensor 42. The upper edge of the constrained FOV is determined by the location of top edge 43 with respect to the bottom of photosensitive surface 42A, while the lower edge of the constrained FOV is determined by the location of bottom edge 44 with respect to the top of photosensitive surface 42A. Similarly, the locations of left edge 45 and right edge 46 relative to the right and left sides of photosensitive surface 42A determine the left and right edges of the constrained FOV, respectively. As shown in FIG. 8, the aperture formed by edges 43-46 is displaced downward relative to photosensitive surface 42A, so that the constrained FOV direction is downward in elevation, i.e. in the (Y, −Z) quadrant of FIG. 2C, as called for in the FOV requirements specified above.

Alternative Housing Size and Shape As will be evident to practitioners in the art, the size and shape of housing 40 is incidental to the operation of the subject daylight sensor and can be determined according to conventional practice, e.g. in order to accommodate other components besides photosensor 42.

Aperture with or without Transparent Window

The aperture formed by edges 43-46 can be left open, or can optionally be covered by a window that is substantially transparent to the wavelengths to be sensed by photosensor 42. If a window is used, then its thickness and refractive index should be considered ill determining the constrained FOV.

Alternative Aperture Shape

The FOV-constraining aperture need not have a rectangular shape as shown in FIGS. 8 and 9, but can have any arbitrary shape (such as a trapezoid or oval) that yields a constrained FOV that meets the requirements discussed above.

For example, if a trapezoidal aperture is used with a top edge that is narrower than the bottom edge, the constrained azimuth FOV will be narrower at the upper edge of the FOV than at the lower edge of the FOV. Referring again to FIG. 4, this can help to block reflections of ground component 31 and slat component 35 from a side wall near blind 21A.

Responsivity Reduction Due to Mismatch between Unconstrained and Constrained FOVs In FIG. 9, photosensor 42 is oriented to have an unconstrained FOV direction of zero degrees (i.e. horizontal) in elevation. However, the constrained FOV direction is downward in elevation. The angular displacement between the directions of the unconstrained and constrained FOVs reduces the responsivity of the overall sensor configuration. However, this reduction in responsivity is typically not an issue, for two reasons:

- Due to the relatively broad unconstrained FOV of the photosensor, its relative responsivity in the constrained FOV direction is still substantial.
- The illumination that the sensor is intended to sense in the direction of the constrained FOV (i.e. near-zone component 34) is much stronger than the illumination the sensor is intended to sense in the direction of the unconstrained FOV (i.e. far-zone component 34).

However, the reduction in responsivity could be significant if a photosensor with a narrow unconstrained FOV (e.g. a photodiode incorporating a molded lens) is used. This could reduce the effectiveness of the overall sensor configuration in sensing desired components of daylight, e.g. near-zone component 34 shown in FIG. 4. Such a reduction in responsivity can be mitigated in one or more of two ways:

The photosensor can be oriented so that its direction of its peak responsivity is aligned with the constrained FOV direction. For example, photosensor 42 could be a through-hole-mounted photodiode with its leads bent so that it points downward in the same direction as the constrained FOV. However, this would reduce the responsivity of photosensor 42 to far-zone component 33 of FIG. 4.

A Fresnel lens or other optical device can be used to steer the direction of the peak responsivity of the photosensor so that it is aligned with the constrained FOV Use of Light Guide/Light Pipe In the configuration shown in FIGS. 8 and 9, the size of the aperture to achieve a given constrained FOV increases with increasing separation between the planes of the aperture and the photosensor. This can result in an unacceptably large window when packaging constraints force the photosensor to be located deep within the housing. One solution is to use a light guide (also sometimes referred to as a light pipe) to couple the aperture to the photosensor. The use of light guides for other applications is well-known in other fields of art, and practitioners can use the information provided herein to adapt light guides for FOV optimization of a daylight sensor.

Reflectivity of Interior Surfaces of Housing

Achieving a 20 dB suppression of illumination components, as called for by the −20 dB FOV constraints described herein, requires either suppression or control of internal reflections within housing 42.

Internal reflections can be suppressed via use of a matte black coating on the inner surfaces of housing 42, or housing 42 can be fabricated from a matte black plastic material (good results have been obtained in developmental testing with thermoformed black polystyrene).

Selectable FOV

As stated above, the effects of reflections from a proximal side wall can be mitigated by constraining the azimuth FOV in the direction of the side wall. In most installations of system 20, there will be only one side wall within a meter or two of sensor 22, so the azimuth FOV need be constrained on only that side.

Figure 10:
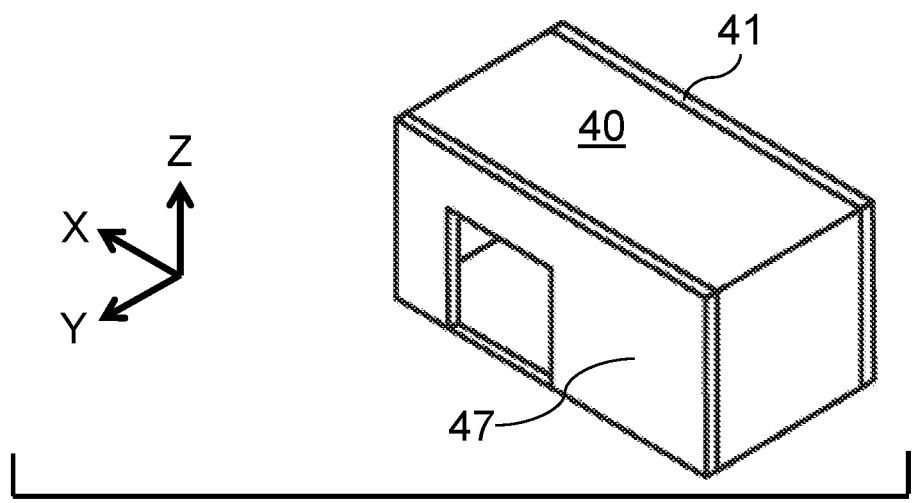
FIG. 10 shows a perspective view of a daylight sensor with an attachable mask to constrain the azimuth FOV.

FIG. 10: Attachable Mask to Constrain Azimuth Fov

FIG. 10 shows how an attachable mask 47 can further constrain the azimuth FOV of the configuration previously shown in FIGS. 8 and 9. For reference, FIG. 10 also shows a coordinate reference frame to indicate the installed orientation relative to the room coordinate system of FIG. 2B.

Mask 47 could consist of an ink-jet-printed or laser-printed pattern on a transparent substrate with adhesive backing, so that it can be custom-shaped to provide the optimum FOV for a given installation. Alternatively, mask 47 could consist of an opaque sheet with self-adhesive backing from which various apertures have been cut-out; an assortment of such masks offering different constrained FOVs could be provided at the time of purchase.

Then, during installation, an appropriate mask could be printed (or selected from the provided assortment) and attached to housing 40 in order to provide an installation-specific FOV. For example, in FIG. 10, mask 47 constrains the azimuth FOV in the −X direction (shifting the FOV direction rightward in azimuth toward the +X direction), e.g. to mitigate the effects of reflections from a proximal side wall on the −X side of sensor 22.

Figure 11:
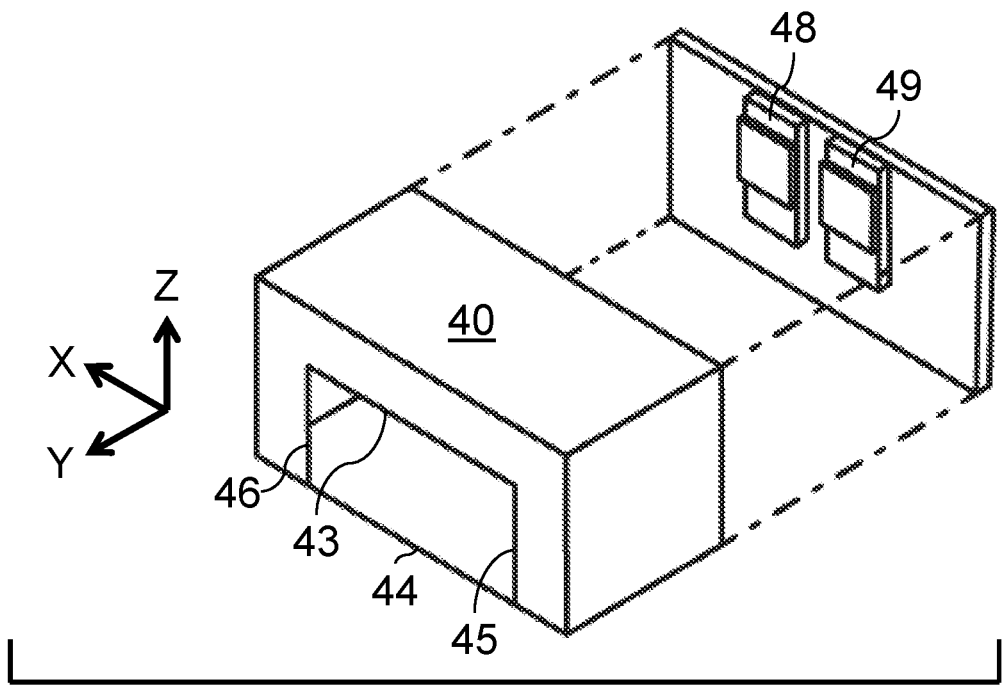
FIG. 11 shows an exploded perspective view of a daylight sensor with electrically selectable azimuth FOV.

FIG. 11: Electronically Selectable Azimuth Fov

Alternatively, the FOV can be made electronically selectable by using two or more physically displaced photosensors, one of which is selected at or after installation to provide the overall sensor output signal. Such a configuration is shown in FIG. 11, and is identical to the configurations shown in FIGS. 8 and 9 with the exception that photosensor 42 is replaced by a pair of laterally displaced photosensors 48 and 49. For reference, FIG. 11 also shows a coordinate reference frame to indicate the installed orientation relative to the room coordinate system of FIG. 2B. The azimuth FOV of photosensor 48 is constrained in the −X direction while that of photosensor 49 is constrained in the +X direction. Thus, during installation, the output of photosensor 48 or 49, or the sum of the outputs of both sensors, can be electronically selected to serve as the overall sensor output when there is a proximal side wall in the +X direction, a proximal side wall in the −X direction, or no proximal side wall, respectively.

Selectable Elevation FOV

The previous discussion of selectable FOV addressed azimuth FOV selectability. However, the FOV can also be made similarly selectable in the elevation direction by varying the vertical displacement between the photosensor and the top and bottom edges of the aperture, or by using multiple vertically-displaced photosensors. This can prove advantageous to optimize the FOV for various sizes and shapes of room.

Use of Multiple Photosensors with Differing FOVs

Another way to achieve the desired FOV as specified herein is to use multiple photosensors with different FOV directions or widths. The desired FOV can then be obtained by processing the outputs of the photosensors, e.g. by obtaining an overall sensor output as a weighted sum of the individual outputs.

Use of Imaging and Non-Imaging Optics

Another way to achieve the desired FOV as specified herein is to use one or more photosensors with imaging or non-imaging optics.

Use of Camera

Another way to achieve the desired FOV as specified herein is to use a digital image sensor (i.e. camera) with a suitably wide-angle (e.g. fisheye) lens. The desired FOV can then be obtained by applying a weighting function to the pixel values to derive an overall sensor signal.

Impact of Optimized Sensor FOV

Optimizing the FOV of sensor 22 as described in the preceding paragraphs can mitigate some of the previously described deleterious effects evident in FIGS. 6 and 7. Specifically, optimizing the FOV can substantially eliminate the effects of slat component 35 evident as the broadening and bump in the sensor irradiance curve of FIG. 6, and can minimize the effects of ground component 31 and ceiling component 32 evident as the tilt-curve mismatch of FIG. 7.

Angle-Diversity Sensing

As previously described, ground component 31 (via ceiling component 32) and slat component 35 can negatively affect the operation of system 20 via the tilt-curve mismatch effect evident in FIG. 7. This effect can be minimized, but not eliminated, by optimizing the field of view of in the manner disclosed above, e.g. as implemented in photosensor 49 of FIG. 9.

These effects can be mitigated to a greater degree by implementing sensor 22 as a configuration of a plurality of sub-sensors, each having a different FOV, whose outputs are processed in an innovative way to yield the overall sensor output. This is referred to herein as Angle-Diversity sensing.

Dual Sub-Sensors

For example, the deleterious effects of ground component 31 can be minimized more effectively via a configuration using two photosensors, the first of which has an FOV that tends to make it more sensitive to sky component 29 than to ground component 31, and the second of which has an FOV that tends to make it more sensitive to ground component 31 than to sky component 29.

This configuration is advantageous for any sensor intended to sense the daylight perceived by occupants of a room, regardless of the type of shading device through which the daylight is admitted and regardless of the location and orientation of the sensor. However, it is particularly advantageous when shading device 21 is a horizontal venetian blind and when the sensor is located and oriented as is sensor 22 of FIG. 4.

Figure 12:
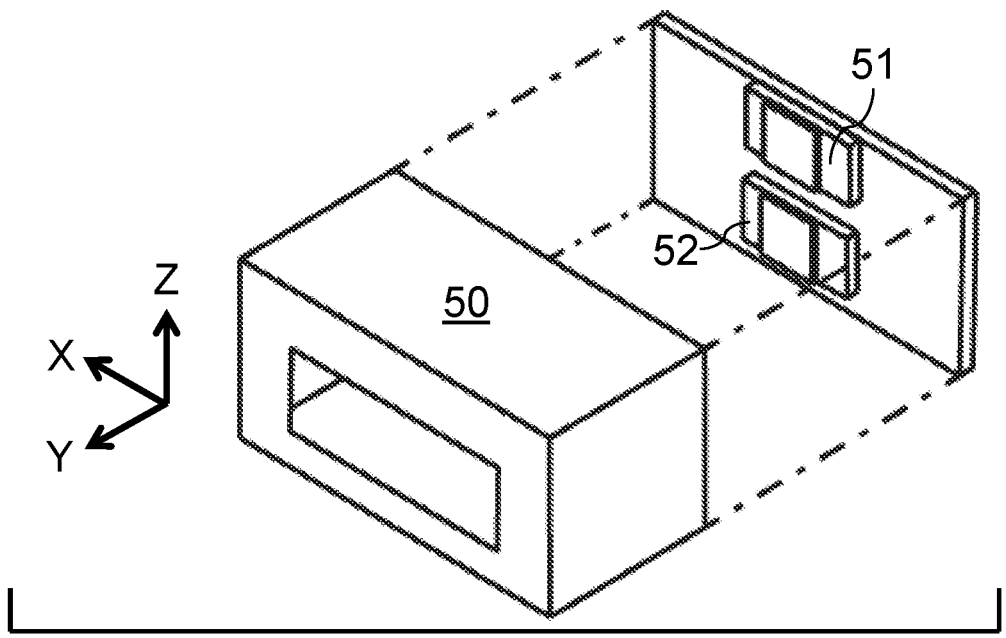
FIG. 12 shows an exploded perspective view of a daylight sensor capable of Angle-Diversity sensing.

FIG. 12: Physical Configuration

FIG. 12 shows an exploded perspective front-side view of an embodiment of sensor 22 using such a configuration, along with a coordinate reference frame to indicate the installed orientation relative to the room coordinate system of FIG. 2B. This embodiment is identical to the configuration shown in FIGS. 8 and 9, except that two photosensors—a floor sub-sensor 51 and a ceiling sub-sensor 52—are used instead of one, and housing 50 has a different aperture configuration than housing 40. Floor sub-sensor 51 is positioned above ceiling sub-sensor 52 within housing 50, and the aperture of housing 50 is sized and positioned to constrain the FOV of floor sub-sensor 51 in the positive-Z direction and the FOV of ceiling sub-sensor 52 in the negative-Z direction. Thus, the constrained FOV of floor sub-sensor 51 points downward in elevation, while that of ceiling sub-sensor 52 points upward in elevation.

In a typical embodiment of this configuration, floor sub-sensor 51 has a constrained −20 dB FOV in elevation that extends from zero degrees (i.e. horizontal) to −70 degrees, while ceiling sub-sensor 52 has a constrained −20 dB FOV that extends from zero degrees to +70 degrees.

One of the advantages of Angle-Diversity sensing is that, because it mitigates the deleterious effects of ground component 31, it also reduces the need to constrain the azimuth FOV when there is a proximal side wall, as previously described herein. Accordingly, the sensor shown in FIG. 12 appears to work well when sub-sensors 51 and 52 have a constrained azimuth FOV that extends from −45 degrees to +45 degrees, even in the presence of a proximal side wall.

FIGS. 4 and 12: Response of Sub-Sensors to Daylight Components

Because the constrained FOV of floor sub-sensor 51 points downward while that of ceiling sub-sensor 52 points upward, floor sub-sensor 51 is more sensitive to near-zone component 34 than to ceiling component 32, while ceiling sub-sensor 52 is more sensitive to ceiling component 32 than to near-zone component 34.

However, as previously stated in reference to FIG. 4, near-zone component 34 is strongly influenced by sky component 29 but weakly influenced by ground component 31, while ceiling component 32 is strongly influenced by ground component 31 but weakly influenced by sky component 29.

Therefore, floor sub-sensor 51 is more sensitive to sky component 29 than to ground component 31, while ceiling sub-sensor 52 is more sensitive to ground component 31 than to sky component 29.

Electronic Configuration

In addition to the components shown in FIG. 12, this embodiment of sensor 22 also includes conventional means of registering the outputs of sub-sensors 51 and 52 and generating an overall sensor output signal as a function of the sub-sensor outputs. Such means include, for example, the following:

Sub-sensors 51 and 52 can be photodiodes (or LEDs operated as photodiodes) whose photocurrents are amplified by op-amp-based trans-impedance amplifiers, each of which feeds an Analog-to-Digital Converter (ADC) input of a microcontroller, which in turn performs software steps to sample the outputs of the amplifiers and generate the output signal.

Sub-sensors 51 and 52 can be photodiodes (or LEDs operated as photodiodes) whose photocurrents are sensed by applying a reverse bias to the intrinsic photodiode capacitances and then measuring the time required for the photocurrents to discharge the capacitances. These functions can be performed by a microcontroller, which can then also process the inferred photocurrents to generate the output signal. Among other references, the photocurrent-sensing portion of this technique is described by Paul Dietz, William Yerazunis, Darren Leigh, "Very Low-Cost Sensing and Communication Using Bidirectional LEDs", Technical Report TR2003-35, published by Mitsubishi Electric Research Laboratories (2003).

The microcontroller mentioned above need not be a separate microcontroller dedicated to sensor 22, but can (and typically will) be a microcontroller that also performs other functions, e.g. those performed by controller 23 of FIG. 1.

Processing of Sub-Sensor Outputs to Yield Overall Sensor Output

The deleterious effects of ground component 31 (via ceiling component 32) discussed in connection with FIG. 7 can be mitigated if the overall output of the embodiment of sensor 22 shown in FIG. 12 is derived from the outputs of the sub-sensors in a manner that meets three criteria:

The overall output should tend to increase with increasing output of the sub-sensor which is more sensitive to sky component 29 than to ground component 31 (in this case, floor sub-sensor 51).

The overall output should tend to decrease with increasing output of the sub-sensor which is more sensitive to ground component 31 than to sky component 29 (in this case ceiling sub-sensor 52).

The output of the former sub-sensor should have a greater influence than the output of the latter sub-sensor on the overall output.

For example, developmental testing to date shows that excellent performance can be achieved by deriving the output of sensor 22 as follows:

$d_{AD} = (f^A)/c$, where $d_{AD}$ is the output of sensor 22 using Angle-Diversity sensing, f is the output of the sub-sensor which is more sensitive to sky component 29 than to ground component 31 (i.e. floor sub-sensor 51 in the case of the embodiment shown in FIG. 12), c is the output of the sub-sensor which is more sensitive to ground component 31 than to sky component 29 (i.e. ceiling sub-sensor 52 in the case of the embodiment shown in FIG. 12), and A is an empirically-derived parameter (a value of 2 has yielded good results in testing to date).

Figure 13:
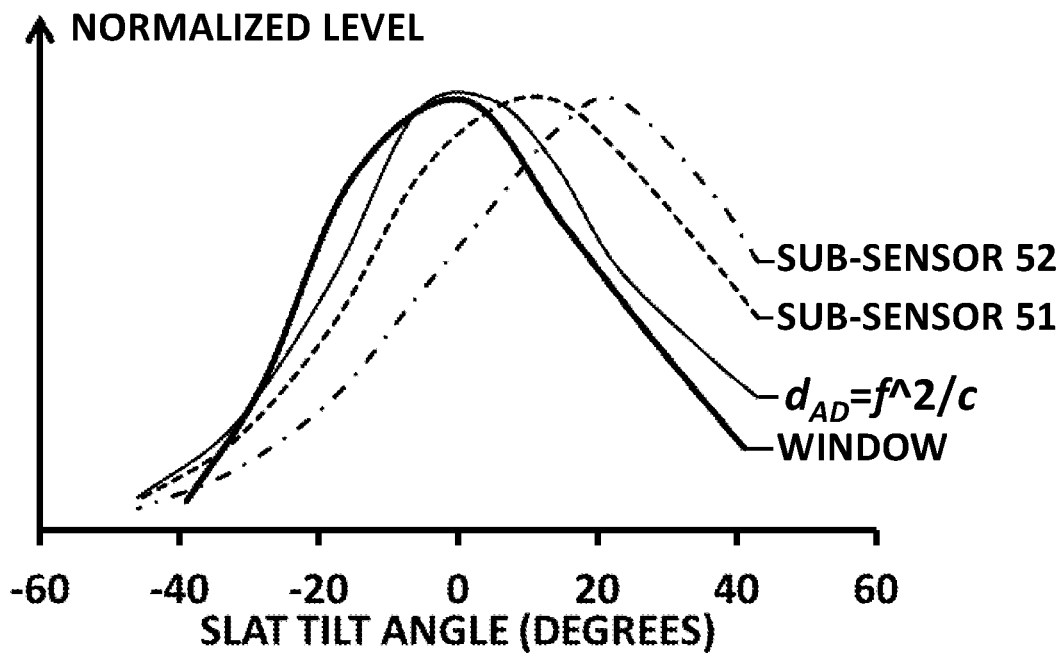
FIG. 13 shows plots of measured window luminance and sensor outputs versus slat-tilt angle for an Angle-Diversity sensor under blue-sky conditions without sunlight.

FIG. 13: Window Luminance and Sensor Outputs Vs. Slat-Tilt Angle for Angle-Diversity Sensor Under Blue-Sky Conditions without Sunlight FIG. 13 shows a plot, similar to that of FIG. 7, of several quantities as a function of the slat tilt setting of blind 21A, but using the dual-sub-sensors configuration described above. The plotted data were collected under conditions similar to those of FIG. 7, i.e. under clear blue skies with the irradiance on window 25 dominated by ground component 31. The following quantities are plotted in FIG. 13:

"Window" is the normalized luminance of window 25 measured at eye level about two window-heights inward from the window. As noted previously, this is a good proxy for the subjectively perceived daylight level.

"Sub-sensor 51" is the normalized output f of the upper (floor) sensor shown in FIG. 12. It is essentially equivalent to what the output of sensor 22 would be with just the FOV optimization described previously.

"Sub-sensor 52" is the normalized output c of the lower (ceiling) sensor shown in FIG. 12.

"$d_{AD}=f^2/c$" is the normalized output of sensor 22 as described above with parameter A=2.

Note that the "$d_{AD}=f/c$" curve is much more closely matched to the "window luminance" curve than is the "sub-sensor 51" curve. This illustrates the effectiveness of the dual-sub-sensor Angle-Diversity approach in mitigating the deleterious effects of ground component 31 (via ceiling component 32) under clear-blue-sky conditions.

Alternative Embodiments

Many alternative embodiments of the Angle-Diversity approach are possible.

Alternative Processing to Obtain Overall Sensor Output

While the processing function described above, i.e. $d_{AD}=(f \cdot A)/c$, works well, other functions are also workable as long as the three criteria specified above are met. For example, the daylight signal can be calculated as a weighted sum, e.g.:

$$d_{AD}=A*f-c, \text{ where}$$

$d_{AD}$ is the output of sensor 22 using Angle-Diversity sensing, f is the output of the sub-sensor which is more sensitive to sky component 29 than to ground component 31 (i.e. floor sub-sensor 51 in the case of the embodiment shown in FIG. 12), c is the output of the sub-sensor which is more sensitive to ground component 31 than to sky component 29 (i.e. ceiling sub-sensor 52 in the case of the embodiment shown in FIG. 12), and A is an empirically-derived parameter.

This difference function is more amenable than the previously described ratio function to implementation via purely analog electronics, potentially eliminating the need for a microcontroller. However, a microcontroller will most likely be needed for other purposes, so this advantage is moot.

Figure 14:
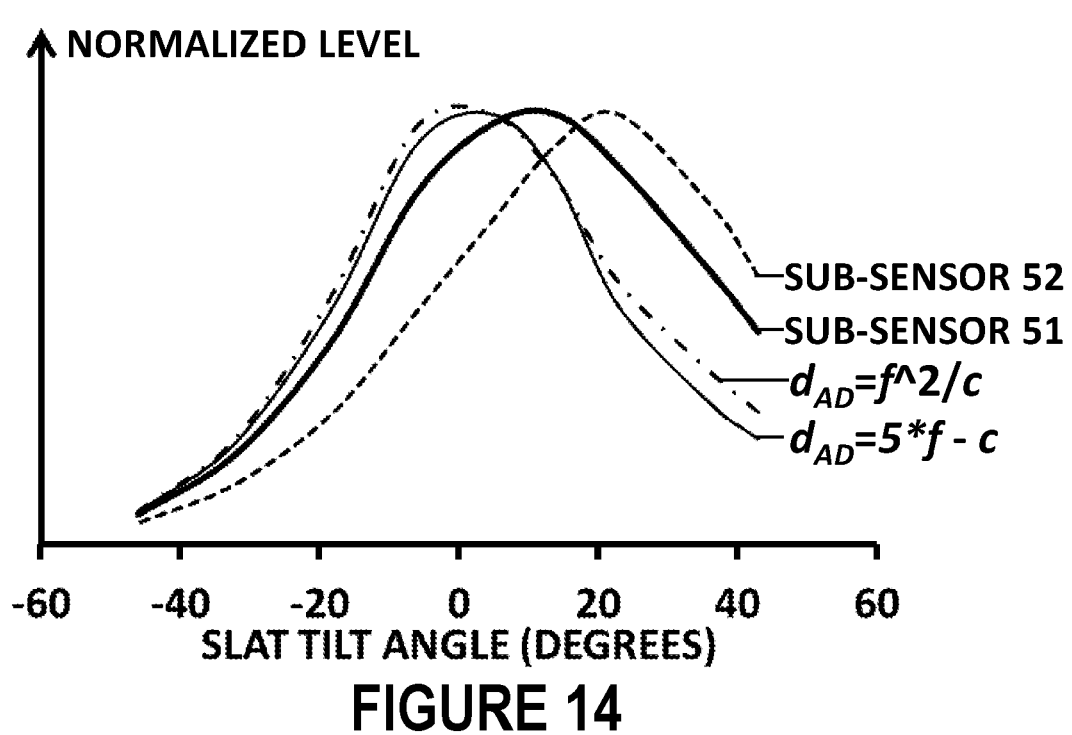
FIG. 14 shows plots of measured window luminance and sensor outputs versus slat-tilt angle for an Angle-Diversity sensor with alternative processing under the same conditions as FIG. 13.

FIG. 14: Window Luminance and Sensor Outputs vs. Slat-Tilt Angle for Angle-Diversity Sensing with Alternative Processing Under Conditions of FIG. 13

FIG. 14 shows curves, similar to those of FIG. 13 and under the same conditions, comparing two ways of calculating the daylight signal $d_{AD}$ described above and showing that they yield similar results.

Use with Shading Devices other than Horizontal Venetian Blinds

While the preceding discussion has focused on mitigation of the tilt-curve mismatch effect that occurs with horizontal venetian blinds, Angle-Diversity sensing can improve the correlation between sensor output and the subjectively perceived daylight level regardless of the type of shading device in use.

Optimal Function to Calculate $d_{AD}$

Of course, conventional techniques can be used to synthesize more complex (i.e. multi-parameter) functions to yield a better match between the luminance-versus-tilt and $d_{AD}$-versus-tilt curves. However, the single-parameter functions illustrated in FIG. 14 have yielded excellent results in developmental testing of the subject invention.

There are two considerations in further optimization of the $d_{AD}$ function:

A better match between the luminance and $d_{AD}$ tilt curves can be obtained if the slat-tilt range of the venetian blind is limited to either positive or negative tilt angles. For example, increasing the value of A can improve the match between the tilt curves for positive tilt angles while degrading it for negative tilt angles. This is potentially advantageous because many blind-based DDC systems limit the slat-tilt operating range to just positive tilt angles.

Further optimization to improve the match between the luminance and tilt curves for a given type of shading device (e.g. a horizontal blind) could reduce sensor performance (i.e. the correlation between sensor output and subjectively perceived daylight level) when used with other types of shading device. Not enough testing has been done to evaluate this possibility.

Alternative Sub-Sensor Fov, Orientation, and Location

As noted above, one of the required sub-sensors must have an output which is influenced more by sky component 29 than by ground component 31, while the other required sub-sensor must have an output that is influenced more by ground component 31 than by sky component 29. While these requirements can be met by integrating the sub-sensors into sensor 22 located as shown in FIG. 4 and with the orientation and FOVs specified above, they can also be met by sub-sensors with other orientations and locations—and the sub-sensors need not be co-located.

For example, referring to FIG. 4, the sub-sensor intended to be more sensitive to sky component 29 than to ground component 31 could be a window-facing sensor on desk 26, and the sub-sensor intended to be more sensitive to ground component 31 than to sky component 29 could be a downward-facing sensor located on ceiling 28.

Thus, while co-locating all of the required sensor functionality at the top of the host window (as enabled by the configuration shown in FIG. 12) is advantageous, it is incidental to the Angle-Diversity aspect of the invention.

Increased Number of Sub-Sensors

The effectiveness of the Angle-Diversity approach can be increased with additional sub-sensors having different locations or FOVs. For example, referring to FIG. 4, a third sub-sensor could be added which is more sensitive to slat component 35 than to sky component 29 or ground component 31. This third sub-sensor could be a generally downward-facing photodiode integrated within sensor 22, or it could be a remote sensor. The output $d_{AD}$ could then be obtained, e.g., as a weighted sum of the sub-sensor outputs.

Similarly, other sub-sensors could be added, further improving performance but with the penalty of increased cost and complexity.

Angle-Diversity Sensor Using Focal-Plane Array

Instead of using discrete photosensors, Angle-Diversity sensing as described herein could be implemented using a linear or two-dimensional array of photosensitive pixels, with the sub-sensors defined as individual pixels or groups of pixels. For example, an image sensor could be used with a wide-angle lens that provides the required constrained FOV, with the daylight signal obtained by processing individual pixel (or pixel-group) values according to the principles disclosed herein. This could be facilitated by first using conventional image-processing steps to identify the boundaries between the ceiling, walls, and floor in order to automatically define the most appropriate pixel-processing function to derive the daylight signal.

The image-sensor approach could also enable contrast-based glare-sensing. However, it would significantly increase cost and could be objected to by building occupants on the basis of privacy concerns.

Multi-Spectral Sensing

One of the most valuable benefits of DDC is its potential to automatically maximize glare-free daylight by keeping the shading as open as possible without risk of glare. This maximizes energy savings in daylight-harvesting applications while also enhancing occupant comfort, productivity, and morale. However, such a shading protocol ha been difficult to achieve in practice because it is difficult to reliably sense (or to even infer the presence of) daylight glare via conventional means.

However, testing has shown that the closed-loop DDC system disclosed in U.S. Pat. No. 6,084,231 is effective at maximizing glare-free daylight admitted by a window, except in one circumstance: when low-angle sunlight is incident on the window. This is because low-angle sunlight can shine directly into the eyes of building occupants, causing severe glare even with relatively low irradiance. This is exacerbated by the fact that low-angle sunlight can penetrate deeply into a room, so that the surfaces which reflect it will be relatively far from a window-mounted sensor such as sensor 22. Thus, the sensor output may not be sufficient to cause the system to block the low-angle sunlight, potentially resulting in glare.

Probability of Glare Due to Low-Angle Sunlight

The irradiance of low-angle sunlight can be several orders of magnitude lower than that of high-angle sunlight. However, the luminance of the solar disc, even at the horizon, can still be much greater than that of other objects in the field of view of the occupants of a room, and the resulting high contrast can cause glare.

However, for this glare to occur, the solar disc must be visible to at least one room occupant. The probability that the solar disc will be in at least one person's field of view is related to the depth with which the sunlight penetrates the room. The penetration depth (assuming the sunlight is not blocked by window shading) is related to the length of the atmospheric path traversed by the sunlight: as the sun descends toward the horizon, it traverses a longer atmospheric path, but because of its correspondingly lower elevation angle, is also capable of penetrating more deeply into a room.

Thus, the probability of glare due to low-angle sunlight that is admitted into a room is related to the atmospheric path length it has traversed. The atmospheric path length, in turn, can be inferred from features of the spectral power distribution of low-angle sunlight.

Spectral Power Distribution (SPD) of Low-Angle Sunlight

Sunlight is attenuated by both absorption and scattering as it traverses the atmosphere. Much of the attenuation is wavelength-dependent:

Molecular absorption due to gases in the atmosphere occurs at specific, relatively narrow absorption bands within the sunlight spectrum, with the absorbed light being converted to heat.

Rayleigh scattering due to gases in the atmosphere is inversely proportional to the fourth power of the wavelength. The scattering is omnidirectional and contributes to diffuse skylight.

Mie scattering due to larger aerosols (e.g. water droplets) is also wavelength-dependent, but to a much lesser degree than Rayleigh scattering. The scattering is mainly in the forward direction, and so contributes less to diffuse skylight than does Rayleigh scattering.

Because low-angle sunlight traverses a longer path through the atmosphere than higher-angle sunlight, it experiences greater absorption and scattering. Due to the wavelength dependence of atmospheric attenuation, the longer path length causes the Spectral Power Distribution (SPD) of low-angle sunlight to differ from that of high-angle sunlight or diffuse skylight:

Rayleigh scattering causes low-angle sunlight to have a greater proportion of its power at longer wavelengths (through scattering of the shorter wavelengths) than high-angle sunlight or diffuse skylight. Effectively, low-angle sunlight is "redder" than high-angle sunlight or diffuse daylight.

Low-angle sunlight (and the diffuse skylight that accompanies it) has deeper spectral minima at the molecular absorption bands than high-angle sunlight (and the diffuse skylight that accompanies high-angle sunlight).

These SPD differences can be used to infer the presence of low-angle sunlight in the total hemispherical insolation (i.e. the sum of the direct and diffuse components from the sky). Further, the extent of the SPD differences can be used to infer the path length traversed by the low-angle sunlight.

However, a complicating factor is that, in addition to sunlight and diffuse skylight, a window will generally also be irradiated with daylight reflected from the ground. Ground reflectance is also wavelength-dependent, typically increasing with wavelength (except in the case of snow cover, which causes the reflectance to decrease with wavelength). Thus, when there is no snow cover, reflection from the ground can "redden" daylight in the same way as Rayleigh scattering reddens low-angle sunlight.

Overview of Multi-Spectral Sensor

According to the subject invention, a signal that is correlated with the probability of glare from low-angle sunlight can be reliably and cost-effectively obtained by exploiting the aforementioned path-length-related SPD features. The subject invention exploits these SPD features using a configuration of at least two sub-sensors with differing spectral responses, such that the sub-sensor outputs due to sunlight are affected differently by atmospheric attenuation of that sunlight. The sub-sensor whose output is relatively insensitive to atmospheric attenuation is referred to herein as the sunlight sub-sensor, while the sub-sensor whose output is relatively sensitive to atmospheric attenuation is referred to as the reference sub-sensor. The sub-sensor outputs are processed to obtain a signal (referred to herein as the Low-Angle Sunlight, or LAS, signal) that is related to the probability of glare from low-angle sunlight. Alternatively, the sub-sensor outputs can be processed to obtain a glare signal related to the probability of daylight glare in general.

Absorption versus Scattering as Basis for Multi-Spectral Sensing

The subject Multi-Spectral sensor can be configured to exploit the SPD differences due to either absorption or scattering.

Absorption-Based Multi-Spectral Sensing

In a Multi-Spectral sensor aimed at exploiting atmospheric absorption, the reference sub-sensor should ideally have a spectral response that is limited to just one (or more) of the absorption bands, while the sunlight sub-sensor should ideally have a spectral response that excludes the absorption bands.

Similar requirements are imposed by conventional Multi-Spectral sun photometry, which is aimed at determining the amount of a particular absorbing molecule, e.g. ozone or water vapor, in the vertical atmospheric column above a terrestrial test site. This involves measuring the irradiance of sunlight at two different wavelengths, one which falls within the molecular absorption band of interest and one of which falls outside that absorption band. The measurements are made with the photometer pointed directly at the solar disc and with a field-of-view that is narrow enough to sense only sunlight. Under such conditions, the Beer-Lambert-Bouguer (BLB) Law is valid and can be used to infer the amount of the absorbing molecule traversed through a known air mass by the sunlight on the basis of the irradiance difference between the two wavelengths.

The same principle can be used to infer the relative air-mass (i.e. the relative atmospheric path length) assuming a constant amount of the absorbing molecule, rather than the amount of the absorbing molecule for the prevailing (known) air-mass (as in conventional sun photometry). The inferred relative air-mass can then be taken as the LAS signal output of the Multi-Spectral sensor.

However, exploiting the relatively narrow absorption bands requires a high degree of spectral selectivity. Conventional sun photometers typically achieve this using photodiodes with band-pass interference filters. Interference filters are expensive, fragile, and have short lifetimes, and the manufacturer-specified spectral response of interference filters applies only to collimated light at normal incidence. Therefore, a collimating device must be provided to prevent broadening and shift of the spectral response.

A potential alternative to interference filters is the use of LEDs as spectrally-selective sensors. The spectral responses of off-the-shelf LEDs are poorly matched to (and far broader than) the molecular absorption bands, and exhibit significant temperature sensitivity. However, LEDs have proven somewhat effective in sensing the relatively broad water vapor band at ~940 nm (see, e.g., F. M. Mims III, "An Inexpensive and stable LED Sun photometer for measuring the water vapor column over South Texas from 1990 to 2001", Geophysical Research Letters, Vol. 29, No. 13, 2002). Unfortunately, the attenuation due to water vapor depends on weather and season as well as on air-mass, which reduces the effectiveness of water-vapor absorption as a basis for sensing low-angle sunlight.

Scattering-Based Multi-Spectral Sensing

Scattering-based Multi-Spectral sensing requires less spectral selectivity than absorption-based Multi-Spectral sensing, because scattering is a broadband phenomenon. The primary requirements are that the spectral response of the reference sub-sensor must be displaced toward shorter wavelengths relative to spectral response of the sunlight sub-sensor, and that the response of the sunlight sub-sensor should ideally exclude any molecular absorption bands (or else be much broader than any included absorption band). These requirements can be met without need for the sharp spectral selectivity provided by an interference filter.

Preferred Basis for Multi-Spectral Sensing

As noted above, absorption-based Multi-Spectral sensing either requires an expensive interference filter, or if LEDs are used, can instead experience performance degradation due to the non-optimum spectral responses of LEDs. Implementation of scattering-based Multi-Spectral sensing is much more straightforward.

Further, scattering-based Multi-Spectral sensing appears to offer a significant performance advantage over absorption-based Multi-Spectral sensing: while the LAS signals obtained using absorption-based and scattering-based sub-sensors are both related to the atmospheric path length traversed by sunlight, there is a significant difference between the two signals. This difference is due to two factors:

Scattering-based Multi-Spectral sensing responds to a "reddening" of the ambient daylight, while absorption-based Multi-Spectral sensing responds to an increase in attenuation at the absorption wavelength.

Light that is scattered out of the sunlight beam contributes to diffuse daylight, while light that is absorbed from the sunlight beam does not. In other words, the diffuse daylight that accompanies low-angle sunlight does not experience as much "reddening" as the sunlight, but does experience the same (or perhaps greater) attenuation at the absorption wavelength.

This means that an LAS signal obtained using scattering-based Multi-Spectral sensing should depend more on the actual presence of sunlight (either from the solar disc or reelected from nearby buildings or other surfaces) than will an LAS signal obtained using absorption-based Multi-Spectral sensing. As a result, an LAS signal obtained using scattering-based Multi-Spectral sensing can be a better indicator of the probability of glare from low-angle sunlight than an LAS signal obtained using an absorption-based Multi-Spectral sensing. Developmental testing of the subject invention to date appears to confirm this.

For these reasons, while absorption-based Multi-Spectral sensing is believed to be viable, scattering-based Multi-Spectral sensing is preferred on both implementation and performance grounds.

Exploiting the Sub-Sensor Outputs for Multi-Spectral Sensing

The outputs of the reference and sunlight sub-sensors can be exploited in at least three ways for Multi-Spectral sensing:

As previously stated, the sunlight and reference sub-sensor outputs can be used to generate a Low-Angle Sunlight (LAS) signal that is correlated with the risk of daylight glare due to direct or reflected low-angle sunlight. Such a signal can then be used for discontinuous (sometimes referred to as "bang-bang") control, e.g. to fully close a shading device when the signal exceeds a threshold.

Alternatively, the LAS signal can be combined with the output of a daylight sensor to yield a glare signal that is correlated with the risk of daylight glare in general (e.g. due to high-angle sunlight and excessively bright diffuse daylight, as well as low-angle sunlight). The glare signal can then be used for either continuous or discontinuous closed-loop DDC.

The sunlight and reference sub-sensor outputs can be used without any other information (e.g. without the output of another daylight sensor) to derive the glare signal.

Deriving a Low-Angle Sunlight (Las) Signal

An LAS signal which is correlated with the risk of glare due to direct or reflected low-angle sunlight can be derived by processing the outputs of the sub-sensors in a manner that meets two criteria:

The output (LAS) signal should tend to increase with increasing output of the sunlight sub-sensor.

The output signal should tend to decrease with increasing output of the reference sub-sensor.

Testing to date shows that good performance can be obtained by simply taking the ratio of the sub-sensor outputs:

$LAS=(s/r)$, where

LAS is the overall output signal which is correlated with the risk of glare due to direct or reflected low-angle sunlight, s is the output of the sunlight sub-sensor, and r is the output of the reference sub-sensor.

Figure 15:
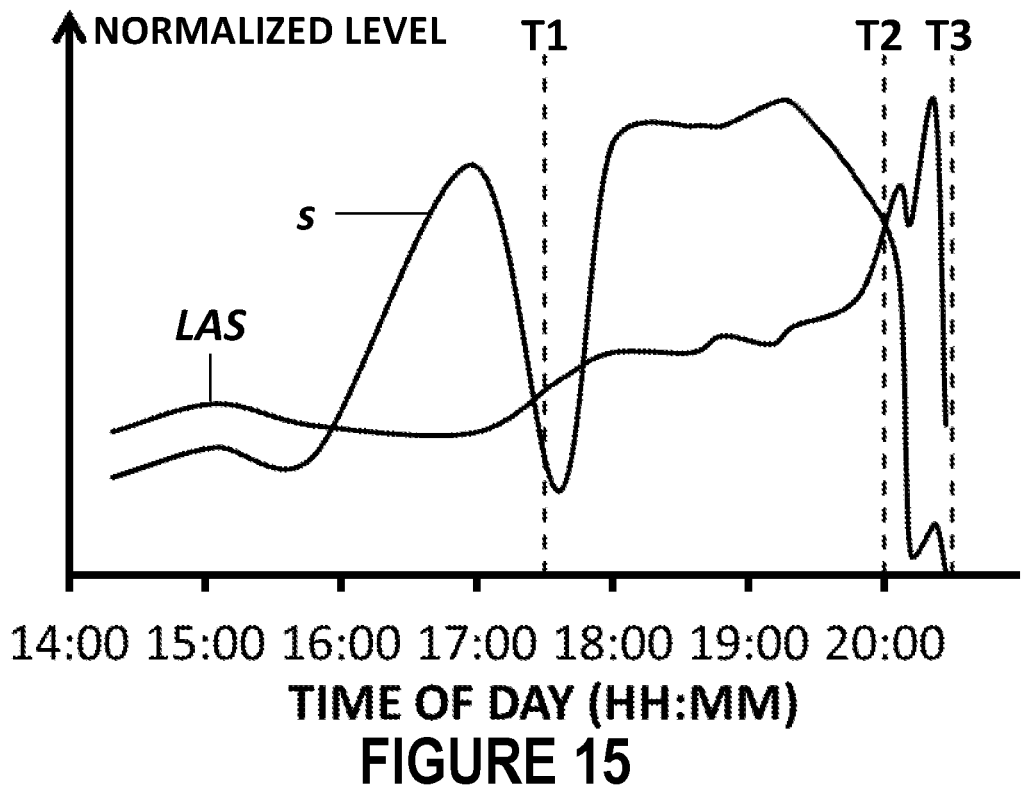
FIG. 15 shows plots of Sunlight (s) and Low-Angle Sunlight (LAS) signals versus time.
Figure 16:
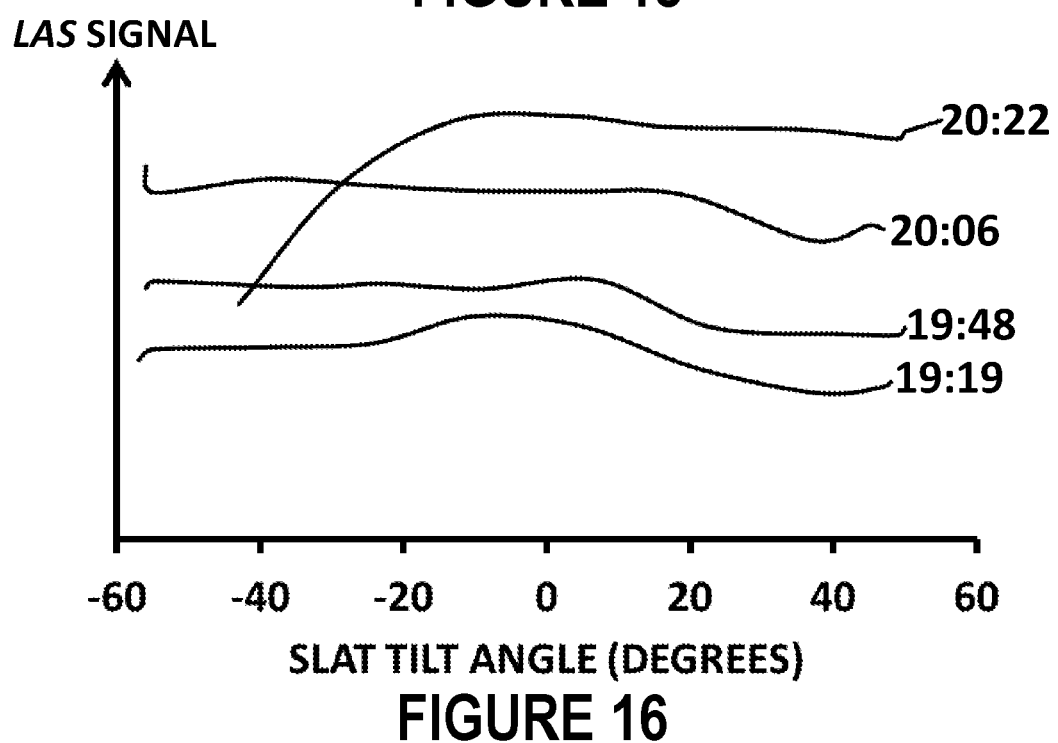
FIG. 16 shows plots of the LAS signal versus slat-tilt angle with time as a parameter.
Figure 17:
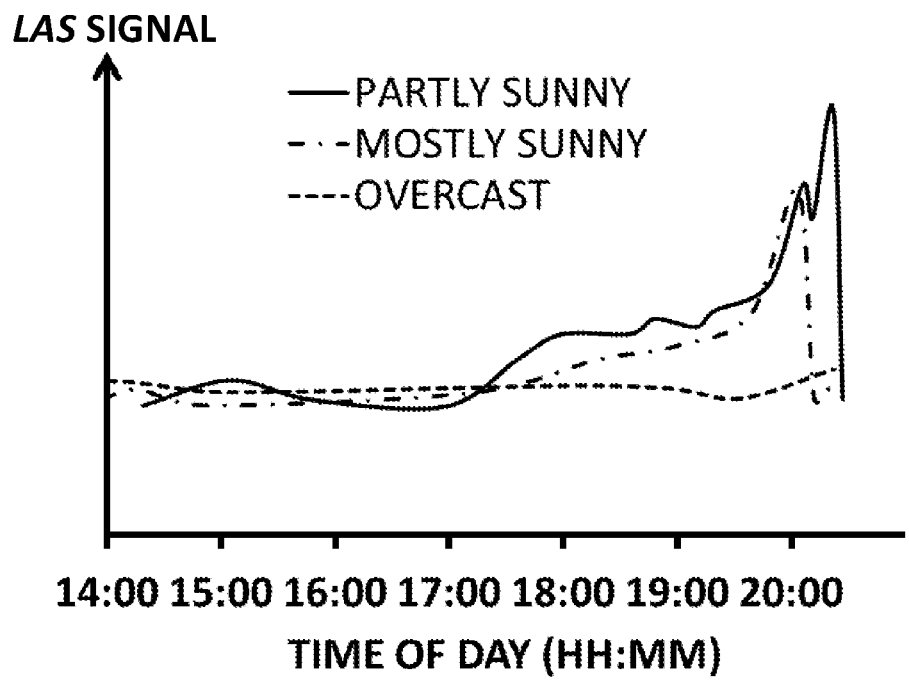
FIG. 17 shows plots of the LAS signal versus time with sky conditions as a parameter.

FIGS. 15-17: Significance of LAS Signal

FIGS. 15 and 16 show data collected from a test installation in order to illustrate the significance of an LAS signal derived as described above.

The test installation included a scattering-based Multi-Spectral sensor mounted at the top of a horizontal blind on a west-facing window in a room in Washington, D.C., USA. The reference and sunlight sub-sensors were oriented so that their aim-points were along the Y-axis shown in FIG. 2B, i.e. horizontally inward, to sense the daylight admitted by the blind via reflection from surfaces within the room. Both sub-sensors had a constrained −3 dB FOV width of about 120 degrees in both azimuth and elevation, and there was no artificial illumination in the test room.

The reference sub-sensor was an off-the-shelf ambient light sensor consisting of a photodiode having a spectral response matched to that of the human eye (Vishay Semiconductors part number TEMD6200FX01). The sunlight sub-sensor was an off-the-shelf NIR photodiode with visible-light-blocking encapsulation (OSRAM Opto Semiconductors part number SFH2400FA).

Conventional equipment was used to log the outputs of the sunlight and reference sub-sensors, the venetian blind tilt setting, and the time of day.

FIG. 15: Sunlight (s) and Low-Angle Sunlight (LAS) Signals versus Time

FIG. 15 depicts a plot of two quantities as a function of time on a mostly sunny afternoon/evening, with the test blind kept in the open (slats horizontal) position:

The curve labeled s is the normalized output level of the sunlight sub-sensor and is analogous to the output of a conventional window-mounted inward-facing daylight sensor such as that disclosed in U.S. Pat. No. 6,084,231.

The curve labeled LAS is the normalized level of an LAS signal derived as described above, i.e. as the ratio of the outputs of the sunlight and reference sub-sensors.

The term "normalized" in the above paragraphs refers to the fact that the curves have been scaled to yield the same peak amplitude.

Also shown in FIG. 15 are three time markers:

T1, at about 17:30, marks the time at which strong sunlight broke through a passing cloud, creating a patch of bright sunlight on the floor and sharply increasing the daylight level enough to cause severe glare.

T2, at about 20:00, marks the time at which the sun had dropped low enough to cause low-angle sunlight to penetrate deeply into the room.

T3, at about 20:30, marks the time at which the solar disc had descended behind a building blocking the horizon, fully blocking the low-angle sunlight.

The s curve drops sharply after T2, despite the fact that low-angle sunlight is penetrating the room and potentially causing severe glare. This illustrates the difficulty in achieving effective blocking of low-angle sunlight with DDC using a conventional daylight sensor.

In contrast, the LAS curve rises steadily over the course of the plot, spiking sharply at T2 when low-angle-sunlight begins to penetrate the room. It continues to rise sharply until the low-angle sunlight is fully blocked at T3, when there is no risk of glare. The drop in amplitude at T3 shows that while the LAS signal from the test configuration is sensitive to low-angle sunlight, it has relatively little sensitivity to the glare-free diffuse daylight that accompanies low-angle sunlight.

Thus, the LAS signal is an effective complement to the conventional daylight sensor (as represented in this example by the sunlight sub-sensor): it indicates glare inducing conditions that a conventional daylight sensor cannot sense, and vice-versa.

FIG. 16: LAS Signal Versus Slat-Tilt Angle with Time as Parameter

FIG. 16 shows plots of the LAS signal versus venetian-blind slat-tilt angle with clock time as a parameter, under the same conditions as the plots of FIG. 15. Note that the signal level is reasonably constant with tilt-setting for tilt angles greater than about −10 degrees, and increases steadily with clock time, i.e. as the sun gets lower on the horizon. The behavior of the curves at positive tilt angles is important because, as previously shown in FIG. 3B, positive tilt angles are more effective than negative tilt angles at blocking sunlight.

The relative invariance with venetian blind tilt setting is somewhat surprising because, as previously noted, the sub-sensors were mounted on the inward-facing side of the venetian blind, and is significant because it suggests that the sunlight sub-sensor could be used to obtain a daylight signal for conventional closed-loop DDC (as well as to obtain the LAS signal).

However, note that the LAS signal can exhibit greater variation with tilt setting if the sunlight and reference sub-sensors have different spectral responses, FOVs, or locations from those used to collect the data of FIG. 16. Also, the variation with tilt setting will be much greater under clear blue skies when there is no sunlight on the sub-sensors. The effects of this variation, and ways to mitigate it, are discussed elsewhere herein.

FIG. 17: LAS Signal Versus Time with Sky Condition as Parameter

FIG. 17 shows plots of the LAS signal versus clock time with sky condition as a parameter, for the same test-set-up used to collect the data for FIGS. 15 and 16. Three sky conditions (mostly sunny, partly sunny, and overcast) are shown. Under mostly sunny and partly sunny conditions, the signal rises as the solar elevation drops—but the signal remains at a low level under overcast conditions. This again illustrates that the LAS signal obtained from the as-tested Multi-Spectral sensor configuration appears to represent the actual presence of low-angle sunlight (either direct or reflected) on the sub-sensors, and not just the fact that the sun has dropped low enough to produce low-angle sunlight.

Using the LAS Signal for Discontinuous Control

The fact that the LAS signal is a reliable indicator of the presence of low-angle sunlight potentially makes it a viable basis for discontinuous (i.e. "bang-bang") control of a shading device (e.g. a blind). Preferably, this would be done in conjunction with continuous closed-loop DDC using a conventional daylight sensor, for example according to the following protocol:

If the LAS signal exceeds an LAS threshold, then the shading device is fully closed, and remains closed until the LAS signal drops below another threshold. This is feasible because, as shown in FIG. 17, the LAS signal level obtained from the test configuration is reasonably invariant with tilt setting (at least for positive tilt angles, which are preferred for blocking of low-angle sunlight). However, note again that this invariance with tilt setting may not be the case for other configurations of the Multi-Spectral sensor.

Otherwise, conventional closed-loop DDC is performed, in which the system adjusts the shading in an attempt to maintain a daylight setpoint.

Deriving a Glare Signal

Instead of deriving an LAS signal which can be used for discontinuous control, the output of a Multi-Spectral sensor can also be used to derive a glare signal that is correlated with the risk of daylight glare in general (e.g. due to high-angle sunlight and excessively bright diffuse daylight, as well as low-angle sunlight). The glare signal can then be used for continuous open-loop or closed-loop DDC.

Using the LAS Signal with a Daylight Signal to Derive a Glare Signal

The glare signal can be derived from the LAS signal and a daylight signal obtained from another source, e.g. an Angle-Diversity sensor as previously described (or a conventional daylight sensor). The glare signal is obtained by processing the LAS and daylight signals in a manner that meets three criteria:

The glare signal should tend to increase with increases in either the LAS signal or the daylight signal. This can be accomplished, for example, by obtaining the glare signal as a weighted sum of the LAS and daylight signals, or as a product of powers of the LAS and daylight signals.

The glare signal should vary with the setting of the shading device in the same way as the perceived daylight level (this is typically an issue only if the shading device is a venetian blind). For example, if the perceived daylight level decreases with increasing slat-tilt angle of a venetian blind, the glare signal level should also decrease with increasing slat-tilt angle. Ideally, the perceived daylight level and glare signal level would also vary at the same rate with changes in the slat-tilt angle, but this is not absolutely necessary for effective DDC.

Of course, the glare signal should be well-correlated with subjective perceptions of glare. In practical terms, this means, for example, that the glare signal level should be roughly the same for marginally acceptable daylight glare due to disparate sources, such as bright diffuse daylight, high-angle sunlight, or low-angle sunlight.

For example, the glare signal can be obtained as a weighted sum:

$$g = d + (A * LAS), \text{ where}$$

g is the glare signal, d is a daylight signal,

LAS is the low-angle sunlight signal as previously defined, and

A is an empirically-derived weighting parameter that determines the relative influence of the LAS signal.

As another example, the glare signal can be obtained as a product of powers:

$$g = d * (LAS \char`\^ A), \text{ where}$$

g is the glare signal, d is a daylight signal,

LAS is the low-angle sunlight signal as previously defined, and

A is an empirically-derived parameter that determines the relative influence of the LAS signal.

If the daylight signal d is obtained from a sensor that senses daylight within a room (such as sensor 22 of FIG. 2A), then the resulting glare signal g can be used for closed-loop DDC. Otherwise, the resulting glare signal can be used for open-loop control (i.e. by adjusting the shading as a predetermined function of g).

Using the Reference and Sunlight Sub-Sensors to Derive a Glare Signal

It is possible to use just the outputs of the reference and sunlight sub-sensors—without a daylight signal from another source—to derive a glare signal that is correlated with the risk of daylight glare. Such a signal can be used for closed-loop control (if the sub-sensors are located on the room-side of the shading device) as well as for open-loop control (if the sub-sensors are located on the window-side of the shading device).

The glare signal can be derived from the outputs of the sub-sensors in a manner that meets three criteria:

The glare signal should tend to increase with increasing output of the sunlight sub-sensor.

The glare signal should tend to decrease with increasing output of the reference sub-sensor.

The glare signal should be influenced more by the output of the sunlight sub-sensor than by the output of the reference sub-sensor.

The glare signal should vary with the setting of the shading device in the same way as the perceived daylight level (this is typically an issue only if the shading device is a venetian blind). For example, if the perceived daylight level decreases with increasing slat-tilt angle of a venetian blind, the glare signal level should also decrease with increasing slat-tilt angle. Ideally, the perceived daylight level and glare signal level would also vary at the same rate with changes in the slat-tilt angle, but this is neither feasible nor necessary for effective DDC.

Of course, the glare signal should be well-correlated with subjective perceptions of glare. In practical terms, this means, for example, that the glare signal level should be roughly the same for marginally acceptable glare from bright diffuse daylight, high-angle sunlight, or low-angle sunlight.

For example, the output can be derived in the following way:

$$g = (s^B)/r, \text{ where}$$

g is the glare signal,
s is the output of the sunlight sub-sensor,
r is the output of the reference sub-sensor, and
B is an empirically-derived parameter (good results have been obtained in developmental testing to date with values around 1.5-2.5).

Establishing the Parameter Value(s)

The two ways of calculating the glare signal g defined above make reference to parameters A and B, and other glare signal definitions will also have parameter dependencies. The values of these parameters for the best glare-sensing performance will depend on installation-specific variables as well as on the sensor design.

However, developmental testing of the subject sensor suggests that, after the parameter value(s) is established for a given installation, the same parameter value can yield good results across a wide range of installations. Thus, it appears that the parameters need not be adjusted for each installation.

The values of the parameters in the glare signals defined above determine the sensitivity to glare from low-angle sunlight relative to glare from other causes (e.g. high-angle sunlight and very bright diffuse daylight). Ideally, in practice, the parameter values would be determined by collecting perceptions of glare across a wide range of test subjects, test rooms, and test conditions, and then using conventional techniques to find the parameter value that minimizes an error function between the perceived glare and the glare signal.

Figure 18:
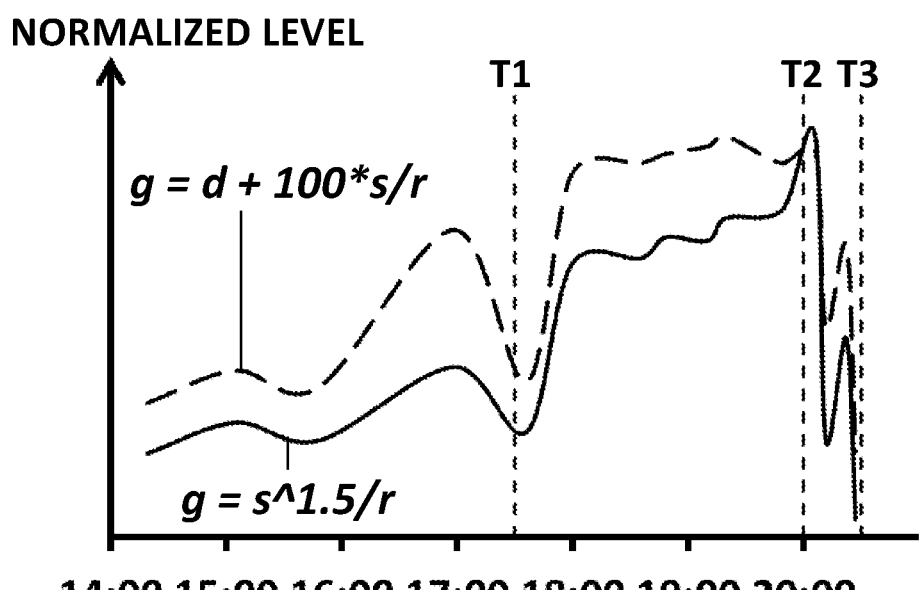
FIG. 18 shows plots of glare signals $g_1$ and $g_2$ versus time.

FIG. 18: Glare Signals versus Time

FIG. 18 shows plots of two of the glare signals described above versus clock time, for the same test-set-up used to collect the data for FIGS. 15 and 16:

The dashed-line curve represents the value of g=d+(100*LAS), where d is the output of an inward-facing daylight sensor and LAS=s/r, where s is the output of an inward-facing sunlight sub-sensor and r is the output of an inward-facing reference sub-sensor.

The solid-line curve represents the value of g=s^1.5/r, where s is the output of an inward-facing sunlight sub-sensor and r is the output of an inward-facing reference sub-sensor.

As previously noted, time marker T1 represents the onset of glare from high-angle sunlight, T2 represents the onset of glare from low-angle sunlight, and T3 represents the cessation of glare after the descending sun was blocked by nearby buildings. Note that both curves remain above their respective levels at T1 over the entire interval from T1 to T3. Thus, for either signal, if the level at T1 were used as the setpoint for closed-loop DDC, then the system would have effectively blocked glare from both high-angle and low-angle sunlight.

Figures-of-Merit (FOM) for Multi-Spectral Sensing

Two Figures-Of-Merit (FOMs) are useful in discussing the implementation of the subject Multi-Spectral sensor: LAS gain and shading sensitivity.

LAS Gain

A primary performance measure for Multi-Spectral sensing is the ratio of the LAS signal when the sun is at the horizon (i.e. so that the sunlight is traversing the longest possible air-mass) to the LAS signal when the sun is directly overhead (i.e. so that the sunlight is traversing the shortest possible air-mass). This is referred to herein as the LAS gain of the sensor. For example, the ratio of the maximum to minimum values of the LAS signal of FIG. 15 is about 3.3, but the sunlight was blocked at time T3 by a building on the horizon, so the LAS gain of the tested configuration is actually much greater than 3.3.

For a scattering-based Multi-Spectral sensor, theory suggests that the LAS gain is roughly proportional to the fourth power of the wavelength displacement between peaks of the spectral responses of the sub-sensors.

However, the LAS gain can be reduced under certain conditions due to the differences in SPD between skylight and ground-reflected daylight. Referring again to FIG. 4, this is because the fraction of the total irradiance on window 25 due to ground component 31 can vary significantly with sun/sky conditions, and that fraction will generally contain more power at longer wavelengths than the other components. This is particularly true under clear blue skies when no sunlight is incident on window 25. Thus, the LAS signal can be relatively high under such conditions, which reduces the gain as defined above. The magnitude of this effect depends on the location and FOV of the sub-sensors, as discussed subsequently.

Shading Sensitivity

If the daylight sensed by a Multi-Spectral sensor has passed through a shading device, then changes in the setting of that shading device can modulate the SPD of daylight incident on the sub-sensors, and can thereby modulate the signal obtained from the sub-sensors. There are two potential causes of such SPD modulation:

SPD modulation appears to occur to some extent with all moveable window coverings, but especially with horizontal venetian blinds. Referring again to FIG. 4, this is because sky component 29, horizontal component 30, and ground component 31 will generally have different SPDs. Thus, any shading changes that affect the proportion of these components in the daylight irradiating a Multi-Spectral sensor will also affect the SPD at the sensor, and hence an LAS or glare signal obtained from it. The effect appears to be most pronounced with horizontal blinds, but can also occur with roller shades and (to a lesser extent) vertical blinds and curtains.

SPD modulation can also be caused by a change in the spectral transmittance of the shading device. This is typically an issue only for Smart Windows based on ElectroChromic (EC) technology, which modulate admitted daylight by changing in tint.

Therefore, for a Multi-Spectral sensor that senses the daylight admitted by a shading device, another useful metric is the ratio of the maximum to minimum values of the LAS signal over the adjustment range of the shading device. This is referred to herein as the magnitude of the shading sensitivity of the sensor. For example, the ratio of the maximum to minimum values of the LAS signals of FIG. 16 for positive tilt angles represents a shading sensitivity magnitude of close to 1, which is the smallest possible value.

The shading sensitivity is a signed value: it is considered herein to be positive if the LAS signal varies in the same direction as the level of admitted daylight (i.e. if it increases as the shading is opened and decreases as the shading is closed), and negative if the LAS signal varies in a direction opposite to the level of admitted daylight. For example, the curves of FIG. 16 represent a slightly positive shading sensitivity for positive tilt angles, because the LAS signal decreases slightly as the tilt angle increases (i.e. as the shading is closed).

The sign of the shading sensitivity determines how the shading sensitivity will affect the operation of a DDC system:

If the shading sensitivity is positive, then shading adjustments that increase the daylight level will also increase the LAS signal. Thus, if the LAS signal is used to derive a glare signal that is used for closed-loop DDC, then a positive shading sensitivity will tend to amplify the effects of shading changes on the glare signal, causing the shading to under-close or under-open for a given increase or decrease, respectively, in the daylight level.

However, if the shading sensitivity is negative, then shading adjustments that increase the daylight level will decrease the LAS signal. Thus, if the LAS signal is used to derive a glare signal that is used for closed-loop DDC, then a negative shading sensitivity will tend to attenuate the effects of shading changes on the glare signal, causing the shading to over-close or over-open for a given increase or decrease, respectively, in the daylight level. For this reason, some negative shading sensitivity in the presence of low-angle sunlight can actually improve glare-blocking performance against low-angle sunlight.

Like the LAS gain, the shading sensitivity depends on the spectral responses of the sub-sensors, but in a more complex way than does the LAS gain. Further, the shading sensitivity also depends on the location and FOV of the sub-sensors with respect to the shading device, the spectral responses of the sub-sensors, the type of shading device, the weather, the solar elevation, and the spectral reflectance of the ground cover and room surfaces. These variables are discussed in more detail in a subsequent section.

Overall Figure of Merit (FOM)

The LAS gain is an appropriate FOM to characterize the overall performance of a Multi-Spectral sensor that does not sense daylight admitted by a shading device (e.g. a Multi-Spectral sensor used in an open-loop configuration).

However, for sensors that do sense daylight admitted by a shading device, a more useful overall FOM is the magnitude (i.e. absolute value) of the ratio of the LAS gain to the shading sensitivity. If this FOM is too low, then the effects of shading adjustments on the sensor output will swamp the effects of changes in the air-mass traversed by sunlight, rendering the sensor output useless for glare control. Based on developmental testing to date, it appears that a Multi-Spectral sensor must have a gain-to-sensitivity ratio magnitude of at least about 2 to provide significant benefit for glare-control purposes. The test configuration whose LAS gain and shading sensitivity are depicted in FIGS. 15 and 16 easily meets this criterion.

Implementation of Scattering-Based Multi-Spectral Sensor

As noted above, an important consideration in implementing the subject Multi-Spectral sensor is the need to achieve an adequate ratio of LAS gain to shading sensitivity. The shading sensitivity (and, hence, the ratio of LAS gain to shading sensitivity) depends on a large number of variables, many of which are interrelated. It is useful to group these variables into two categories:

Application-related variables that include the FOVs and intended location of the sub-sensors with respect to the shading device with which it will be used, as well as on the type of shading device.

Sensor implementation variables that include the type of sub-sensors, their spectral responses, and their FOVs.

The subsequent discussion treats these categories as independent and dependent variables, respectively, in implementing the subject sensor.

Location and Orientation of Multi-Spectral Sub-Sensors

As discussed in the following paragraphs, the sub-sensors of a Multi-Spectral sensor can be located and oriented in several ways, each offering advantages and disadvantages and imposing differing constraints on the sensor implementation.

Figure 19A:
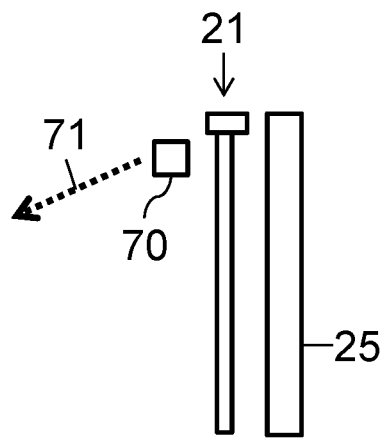
FIG. 19A is a diagram depicting an interior-mounted, inward-facing Multi-Spectral sensor 70 on the inward-facing side of a shading device.

FIG. 19A: Interior-Mounted, Inward-Facing Configuration

As shown in FIG. 19A, a Multi-Spectral sensor 70 consisting of a sunlight sub-sensor and a reference sub-sensor (not shown), having a general FOV direction 71, can be located on the inward-side of shading device 21 and oriented so that FOV direction 71 is generally inward (and optionally downward or upward).

The configuration of FIG. 19A offers the following advantages:

Because FOV direction 71 is generally inward, if the FOV of sensor 70 is sufficiently wide, it will "see" the entire area receiving daylight admitted by window 25 and shading device 21, which in turn will enable it to sense glare-inducing patches of sunlight or bright diffuse daylight virtually anywhere in the day-lit space. This makes the configuration of FIG. 19A well-suited for a Multi-Spectral sensor that is used to obtain a glare signal (versus just an LAS signal) for closed-loop DDC.

The occasional reduction in LAS gain due to ground-reflected daylight is relatively low in this configuration.

Because sensor 70 is located on the inward-facing side of shading device 21, it is relatively easy to install and need not be weatherized.

However, this configuration also has three disadvantages:

It exposes the sub-sensors to artificial illumination, precluding the use of sub-sensors that respond to visible wavelengths.

If shading device 21 is a horizontal blind, and depending on the implementation of sensor 70, this configuration can result in significant shading sensitivity.

Sensor 70 does not sense the daylight admitted by shading device 21 directly in this configuration, but rather senses the admitted daylight indirectly after reflection from the room surfaces. This reduces the daylight irradiance at the sub-sensors, which can be an issue for sub-sensors with relatively low responsivity.

Figure 19B:
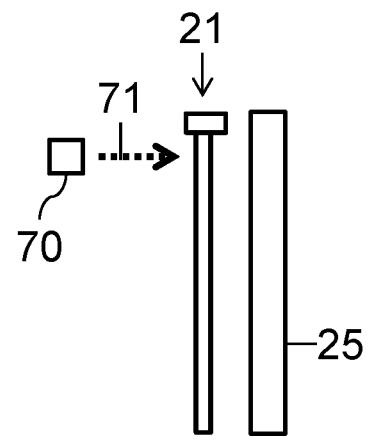
FIG. 19B is a diagram depicting an interior-mounted, outward-facing Multi-Spectral sensor 70 on the inward-facing side of a shading device.

FIG. 19B: Interior-Mounted, Outward-Facing Configuration

FIG. 19B shows Multi-Spectral sensor 70 located on the inward-side of shading device 21, but oriented so that FOV direction 71 is generally outward toward window 25.

The configuration of FIG. 19B offers the following advantages:

Because sensor 70 is located on the inward-facing side of shading device 21, it is relatively easy to install and need not be weatherized.

If sensor 70 is located close to shading device 21, it can be at least partially shielded from artificial illumination, potentially enabling the use of visible-wavelength sub-sensors, which in turn increases the achievable LAS gain.

Sensor 70 senses the daylight admitted by shading device 21 directly in this configuration (rather than by reflection as in configuration of FIG. 19A), facilitating the use of sub-sensors with relatively low responsivity.

However, this configuration also has two disadvantages:

If sensor 70 is located close to shading device 21 (so that it can be partially shielded from artificial illumination), and if shading device 21 is a moveable window covering, then this configuration results in a higher magnitude of shading sensitivity than the configuration of FIG. 19A. This is because sensor 70 has a more direct view of the sky and the ground, exacerbating the SPD modulation that occurs with operation of a moveable window covering.

If shading device 21 is a horizontal blind, then an additional phenomenon dominates the shading sensitivity in the presence of sunlight:

As the slats are tilted away from the horizontal (zero-tilt) setting to block the sunlight, Lambertian reflection between the slats causes them to glow. The brightness of this glow increases as the slats are tilted away from horizontal. Thus, while the total flux admitted by the blind is decreasing, the glow from the slats actually increases.

Because sensor 70 is located close to the blind, this glow represents a substantial fraction of the total irradiance on sensor 70. Further, because the glow is due to sunlight, it is "redder" than the diffuse daylight admitted by the blind.

Thus, the increase in the relatively red glow causes the LAS signal to increase as the slats are tilted away from horizontal. This results in positive shading sensitivity for negative tilt angles, and negative shading sensitivity for positive tilt angles.

However, while this latter effect can dominate the shading sensitivity, it is predictable and can be largely mitigated by adjusting the LAS signal as a function of the slat tilt angle. This is discussed further in connection with a preferred embodiment.

The magnitude of the shading sensitivity could be reduced by locating sensor 70 away from shading device 21 (e.g. by mounting it to a wall opposite window 25), but that would expose the sensor 70 to artificial illumination, eliminating one of the advantages of this configuration.

This configuration is more susceptible than the configuration of FIG. 19A to reduction in LAS gain caused by ground-reflected daylight.

Other Interior-Mounted Configurations

While not shown in the drawings, it is also possible to locate and mount a Multi-Spectral sensor on the inward-facing side of a shading device, but oriented so that its FOV points neither inward (as shown in FIG. 19A) nor outward (as shown in FIG. 19B).

For example, a Multi-Spectral sensor could be mounted on a side wall adjacent to a window wall, e.g. on a wall in the Y-Z plane of FIG. 2B, and oriented so that its FOV points perpendicularly to the path of admitted daylight (e.g. along the X axis of FIG. 2B).

As another example, a Multi-Spectral sensor could be mounted on a ceiling and oriented so that its FOV points generally downward.

Configurations in which a Multi-Spectral sensor is located on the inward-facing side of a shading device but oriented so that it cannot "see" the shading device share the advantages and disadvantages stated for that of FIG. 19A.

Figure 19C:
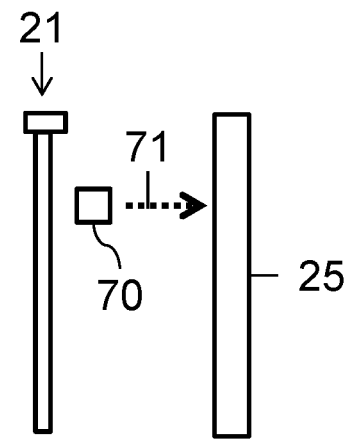
FIG. 19C is a diagram depicting an interior-mounted, outward-facing Multi-Spectral sensor 70 between a shading device and a window.

FIG. 19C: Outward-Facing Configuration Between Shading Device and Window

FIG. 19C shows Multi-Spectral sensor 70 located between shading device 21 and window 25, and oriented so that FOV direction 71 is generally outward toward window 25.

This configuration offers all of the advantages of that of FIG. 19B, except that it enables more effective shielding of sensor 70 from artificial illumination, increases the daylight irradiance on the sub-sensors (by eliminating any attenuation caused by shading device 21), and eliminates any SPD modulation effects caused by changes in the setting of shading device 21.

However, a disadvantage is that a separate physical assembly may be needed for sensor 70, potentially increasing cost and installation labor.

Also, while shading sensitivity is not an issue for this configuration, it is more susceptible than the configuration of FIG. 19A to reduction in LAS gain caused by ground-reflected daylight.

Figure 19D:
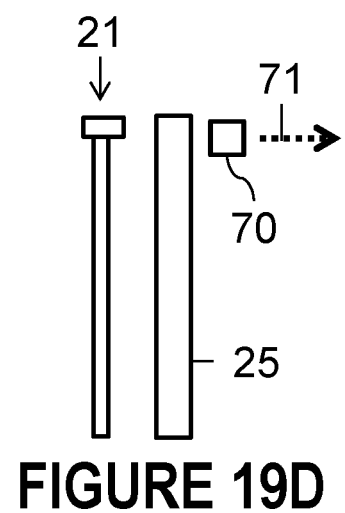
FIG. 19D is a diagram depicting an exterior-mounted, outward-facing Multi-Spectral sensor 70.

FIG. 19D: Exterior-Mounted, Outward-Facing Configuration

FIG. 19D shows Multi-Spectral sensor 70 located outside window 25 and oriented so that FOV direction 71 is generally outward. From the standpoints of Multi-Spectral sensing performance, this configuration is identical to that of FIG. 19C when window 25 has a substantially flat spectral transmissivity over the wavelengths sensed by sensor 70. However, it has the disadvantage of requiring weatherization and possible penetration of the window wall for signal or power wiring.

Type of Shading Device

If a Multi-Spectral sensor is not sensing daylight admitted by a shading device (e.g. as in the configurations of FIGS. 19C and 19D), then the type of shading device is not a consideration in the sensor implementation. However, it is an important consideration for the configurations of FIGS. 19A and 19B.

Shading devices can be grouped into three broad categories for purposes of this discussion:

Moveable window coverings, which can indirectly modulate the SPD of the daylight at the sensor by changing the proportion of admitted skylight to ground-reflected daylight.

EC Smart Windows, which directly modulate the SPD of the daylight at the sensor through changes in spectral transmittance.

SPD and LC Smart Windows, which do not modulate the SPD of the daylight at the sensor.

Sensor Implementation Considerations for Moveable Window Coverings

As noted above, moveable window coverings indirectly modulate the SPD of the daylight at the sensor by changing the proportion of admitted skylight or sunlight to ground-reflected daylight, which in turn can cause significant shading sensitivity. The magnitude and sign of this shading sensitivity are determined by the differences in the spectral responses and FOVs of the sub-sensors:

The spectral responses of the sub-sensors will affect the resulting shading sensitivity in two ways:

All other things being equal, the shading sensitivity should decrease with decreasing wavelength displacement between the spectral responses of the sub-sensors.

For a given wavelength displacement between the spectral responses of the sub-sensors (and, hence, a given LAS gain), the shading sensitivity should depend partly on the difference in the ground reflectivity over that wavelength displacement. For a typical mix of ground covers, the sharpest reflectivity changes with wavelength occur in the range from about 500 nm to about 800 nm. Therefore, it should be possible to minimize the shading sensitivity without reducing the LAS gain by keeping the spectral responses of both sub-sensors on the same side of the 500 nm to 800 nm range (i.e. shorter than 500 nm or longer than 800 nm). However, this has not yet been verified through testing.

The preceding discussion in reference to FIGS. 19A-19D addressed FOV direction 71 of sensor 70, but did not address the FOV itself nor potential differences between the FOVs of the sub-sensors comprising sensor 70. The shading sensitivity that occurs with moveable window coverings in the configurations of FIGS. 19A and 19B is determined partly by the elevation FOV of sensor 70 because it, in turn, determines the relative sensitivities of sensor 70 to skylight and ground-reflected daylight. Further, differences between the elevation FOVs of the sub-sensors comprising sensor 70 can give them different relative sensitivities to skylight and ground-reflected daylight, which can either exacerbate or mitigate the shading sensitivity. These issues are discussed further in subsequent sections of this disclosure.

Sensor Implementation Considerations for EC Smart Windows

An EC Smart Window directly modulates the SPD of the admitted daylight through changes in tint (i.e. spectral transmittance). Effectively, the EC Smart Window acts as a tunable band-pass filter, with the peak transmittance, the wavelength of peak transmittance, and the width of the spectral pass-band all varying with the tint setting.

As a result, when used with an EC window, the spectral responses of the sub-sensors will affect the Multi-Spectral shading sensitivity in two ways:

The shading sensitivity will decrease with decreasing wavelength displacement between the spectral responses of the sub-sensors, but so too will the LAS gain.

For a given wavelength displacement between the spectral responses of the sub-sensors (and, hence, a given LAS gain), the shading sensitivity will depend on where (in wavelength) the spectral responses are located with respect to the changing spectral pass-band of the window. Specifically, if the spectral pass-band of the window comfortably encompasses the spectral responses of both sub-sensors at both the minimum and maximum tint settings, then the shading sensitivity will be relatively low. On the other hand, if the window's spectral pass-band begins to move outside one of the sub-sensor's spectral responses as the tint is changed, then the shading sensitivity will be high.

Therefore, it should be possible to minimize the shading sensitivity by choosing the sub-sensor spectral responses so that they remain substantially within the spectral pass-band of the window over the full range of tint settings.

In a typical EC window, adjusting the tint from minimum to maximum reduces the wavelength of peak transmittance from about 600 nm to about 450 nm, and also narrows the −3 dB spectral width of the spectral pass-band from about 600 nm to about 200 nm. In order to keep both sub-sensor responses within this changing spectral passband, the sub-sensor spectral responses must meet two requirements:

At least one of the sub-sensors must be responsive to visible wavelengths. The need for responsivity to visible wavelengths effectively precludes the use of Multi-Spectral sensing in the configuration of FIG. 19A, or in the configuration of FIG. 19B when sensor 70 is not shielded from artificial illumination. However, it is easy and advantageous to fully shield sensor 70 from artificial illumination in the configuration of FIG. 19B when shading device 21 is an EC window. This is because, unlike a moveable window covering, a smart window does not change the proportion of admitted skylight to ground-reflected daylight. Thus, the shading sensitivity of an outward-facing Multi-Spectral sensor does not increase with proximity to an EC smart window, which enables such a sensor to be attached directly to the surface of an the window. This fully blocks artificial illumination and enables the sensor to be unobtrusively integrated with the window assembly while also enabling closed-loop DDC.

At least one of the sub-sensors must be a spectrally-selective photosensor (e.g. a photodiode with an interference filter or an LED operated as a photosensor). Otherwise, it will be impossible to keep the spectral responses of both sub-sensors within the changing pass-band of the window while also achieving sufficient LAS gain for effective glare-sensing.

Sensor Implementation Considerations for Suspended-Particle Device and LC Smart Windows Because Smart Windows based on Suspended-Particle Device and LC technologies do not module the SPD of the daylight they admit, they impose no special implementation considerations on the implementation of the subject Multi-Spectral sensor.

Sensor Implementation

There are three major variables in the implementation of the subject Multi-Spectral sensor:
the type(s) of photosensor used for the sub-sensors;
the spectral response of each sub-sensor; and
the fields-of-view of each sub-sensor.

Type of Sub-Sensors

One of the advantages of the subject Multi-Spectral sensor is its cost-effectiveness. Therefore, the following discussion addresses only relatively inexpensive photosensors as potential sub-sensors. Of course, more expensive photosensors could also be used in accordance with the implementation guidelines provided herein.

The spectral response of relatively inexpensive photosensors is limited to the range between about 300 nm and 1200 nm. For the purposes of this disclosure, this range can be considered to span three bands: Near-Ultra-Violet (ranging from about 300 nm to 400 nm), visible (ranging from about 400 nm to about 700 nm), and Near-Infra-Red (ranging from about 700 nm to 1200 nm).

The most widely available photosensors in these three bands are photodiodes and LEDs, and the following discussion is limited to those two types of photosensor. Of course, other photosensors (e.g. phototransistors or photo-resistors) could also be used in accordance with the implementation guidelines provided herein.

Photodiodes have relatively broad spectral responses, but can be encapsulated in a compound that blocks NUV, visible, or NIR wavelengths to provide some spectral selectivity. In this disclosure, the terms NUV photodiode, NIR photodiode, and visible photodiode are used to describe photodiodes whose spectral responses are limited in such a way to the NUV, NIR, and visible bands, respectively.

LEDs operated as detectors can provide greater spectral selectivity, but their spectral responses are slightly displaced (toward shorter wavelengths) from their emission spectra and are typically not specified by the manufacturer (and must therefore be determined through spectral response testing). LEDs typically also have less responsivity than photodiodes.

Therefore, photodiodes will generally be preferred over LEDs when spectral selectivity is not important. However, while Rayleigh scattering is a broadband phenomenon, some of the aforementioned implementation considerations can drive the need for spectrally selective sub-sensors:

- A modest degree of spectral selectivity is needed for a sub-sensor that is not shielded from artificial illumination (i.e. to prevent change in artificial illumination from affecting the sub-sensor output).
- A somewhat greater degree of spectral selectivity is needed to minimize shading sensitivity when sensing daylight admitted by an EC smart window, and may be helpful in minimizing the shading sensitivity when sensing daylight admitted by a moveable window covering.

As a result, both photodiodes and LEDs can be useful in cost-effective implementations of the subject Multi-Spectral sensor.

Spectral Response of Sub-Sensors

As previously noted, the spectral responses of the sub-sensors should be chosen to maximize the magnitude of the ratio of the LAS gain to the shading sensitivity. The spectral responses necessary to achieve that object will depend on the intended location and orientation of the sub-sensors (variations of which are shown in FIGS. 19A-19D), as well as on the type of shading device with which sensor will be used, and should be verified through testing. The number of possible combinations of these application-related variables is large, and so therefore are the number of combinations of sub-sensor spectral response that will maximize the ratio of LAS gain to shading sensitivity.

However, for practical reasons, it is advantageous to standardize on a relatively small set of combinations of spectral response that yield an acceptable—but not necessarily maximum—ratio of LAS gain to shading sensitivity across a broad range of application variables. The following paragraphs discuss three such combinations, in order of descending LAS gain and increasing application flexibility:

- When shading sensitivity and shielding from artificial illumination are not expected to be issues, then an NIR photodiode used as the sunlight sub-sensor and a visible photodiode used as the reference sub-sensor will provide more than enough LAS gain for effective glare sensing at low cost. Such a combination can be used in the configurations of FIGS. 19C and 19D. It can also be used in the configuration of FIG. 19B when sensor 70 is shielded from artificial illumination. Greater LAS gain should be achievable with greater wavelength displacement between the sub-sensor responses (e.g. by using an NUV photodiode as the reference sub-sensor), but the cost is much greater.
- An NIR photodiode as the sunlight sub-sensor and an NIR LED as the reference sub-sensor can be used in the same configurations as the NIR/visible combination described above, albeit with less LAS gain. If shading device 21 is not an EC smart window, this combination can also be used in the configuration of FIG. 19A (or any interior-mounted configuration when FOV direction 71 is not toward the window) and in the configuration of FIG. 19B when sensor 70 is not shielded from artificial illumination (e.g. if it is mounted on a wall opposite window 25). The spectral response of the NIR LED used as the reference sub-sensor is a trade-off between maximizing the LAS gain (which favors shorter wavelengths) and minimizing sensitivity to artificial illumination (which favors longer wavelengths). Among off-the-shelf LEDs, about 780-800 nm appears to be lower limit on the wavelength of the spectral response peak without risking excessive sensitivity to artificial illumination. The sensitivity to artificial illumination can be decreased by encapsulating the LED die in a visible-light blocking compound, as is done with NIR photodiodes, but this further reduces the LAS gain. An alternative combination that should provide greater LAS gain, but also greater shading sensitivity and at greater cost, is an NIR photodiode as the sunlight sub-sensor with an NUV photodiode or LED as the reference sub-sensor.
- Although not yet tested, it is believed that an NIR LED with a spectral response peak at about 880 nm as the sunlight sub-sensor and an NIR LED with a spectral response peak at about 800 nm as the reference sub-sensor could be used with an EC window. Such a combination could also be used in the same configurations as the two previously described combinations, albeit with reduced LAS gain. An alternative combination that may be workable with an EC window in the configuration of FIG. 19B is a green LED as the sunlight sub-sensor and an NUV or violet LED as the reference sub-sensor. The latter should be chosen to have a response peak around 400 nm. Still another alternative that may be workable in the configuration of FIG. 19B is an NIR LED having a spectral response peak around 700 nm as the sunlight sub-sensor and a green LED as the reference sub-sensor.

Each photodiode in the above combinations could be replaced with an LED having a spectral response that peaks at roughly the same wavelength as the photodiode.

FOV of Sub-Sensors

While there are no firm FOV requirements for the sub-sensors of the subject Multi-Spectral sensor, its performance can be improved by optimizing the sub-sensor FOVs.

As previously noted, two effects can degrade the performance of a Multi-Spectral sensor: shading sensitivity and reduction in LAS gain. Referring again to FIG. 4, both of these effects are at least partially due to differences between the SPDs of exterior daylight components 29-31 and between the SPDs of interior daylight components 32-34. Optimizing the FOVs can therefore mitigate these deleterious effects.

In the case of an outward-facing Multi-Spectral sensor (e.g. sensor 70 in the orientation shown in FIGS. 19B-19D), the shading sensitivity (in the configuration of FIG. 19B) and the reduction in LAS gain (in the configurations of FIGS. 19B-19D) can be mitigated by constraining the elevation FOVs to block ground-reflected daylight (i.e. component 31 of FIG. 4) and optionally to block skylight (i.e. component 29 of FIG. 4).

Constraining the elevation FOVs can also reduce shading sensitivity and reduction in LAS gain in the inward-facing Multi-Spectral sensing configuration shown in FIG. 19A). Referring again to FIG. 4, the performance of an inward-facing Multi-Spectral sensor seems to improve if the elevation FOV's of the sub-sensors are constrained to block either ceiling component 32 or near-zone component 34, or both.

Constraining the elevation FOV in this way is possible because, unlike daylight sensor 22 of FIG. 4, an inward-facing Multi-Spectral sensor need not necessarily have an elevation FOV broad enough to sense both components 33-34 of admitted daylight.

Combining Angle-Diversity and Multi-Spectral Sensing

Multi-spectral sensing can be combined with Angle-Diversity sensing by giving each sub-sensor of a Multi-Spectral sensor a different FOV. This can mitigate some of the issues in Multi-Spectral sensing discussed above:

Angle-Diversity sensing can reduce the magnitude and/or change the sign of the shading sensitivity that occurs in the Multi-Spectral configuration of FIG. 19A when shading device 21 is a horizontal blind.

Angle-Diversity sensing can also reduce the magnitude of the negative shading sensitivity that occurs in the Multi-Spectral configuration of FIG. 19B when shading device 21 is a horizontal blind. However, if the sub-sensors are located close to the slats of a blind, then differences in their FOVs can cause discontinuities in the sensor output as the slats are tilted due to shadowing from the slat edges.

Angle-Diversity sensing can mitigate the reduction in LAS gain that occurs under certain conditions in the configurations of FIGS. 19C and 19D.

Figure 20:
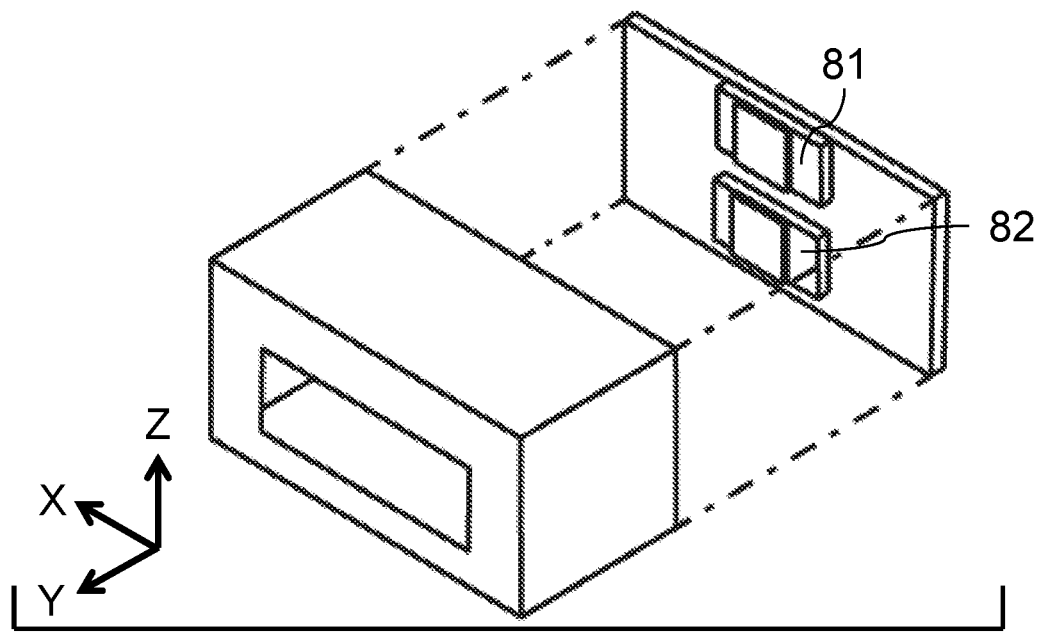
FIG. 20 shows an exploded perspective view of a daylight sensor capable of both Angle-Diversity and Multi-Spectral sensing.

FIG. 20: Exploded Perspective View of Sensor Combining Angle-Diversity and Multi-Spectral Sensing FIG. 20 shows a sensor that can be used to implement both Angle-Diversity and Multi-Spectral sensing. The sensor has the same general arrangement as the Angle-Diversity sensor shown in FIG. 12, except for two changes:

Floor sub-sensor 51 of FIG. 12 is replaced by a sub-sensor 81, and ceiling sub-sensor 52 of FIG. 12 is replaced by a sub-sensor 82. Depending on the application (as discussed below), sub-sensors 81 and 82 are used as sunlight and reference sub-sensors, respectively, or as reference and sunlight sub-sensors, respectively. Thus, as with floor sub-sensor 51 of FIG. 12, sub-sensor 81 of FIG. 20 has a constrained elevation FOV that points downward, and as with ceiling sub-sensor 52 of FIG. 12, sub-sensor 82 of FIG. 20 has a constrained elevation FOV that points upward.

Depending on the intended application, the sensor either points in the positive-Y direction (as indicated by the coordinate frame in FIG. 20), or is instead rotated 180 degrees about the Z-axis to point in the negative-Y direction.

The sub-sensors of such a combined sensor can be used to derive an LAS signal as previously described, i.e. as follows:

$LAS=(s/r)$, where

LAS is the overall output signal which is correlated with the risk of glare due to direct or reflected low-angle sunlight, s is the output of the sunlight sub-sensor, and r is the output of the reference sub-sensor.

The LAS signal can be used either directly or to derive a glare signal, as previously described.

Use of Combined Angle-Diversity and Multi-Spectral Sensing in Inward-Facing Configuration Combined Angle-Diversity and Multi-Spectral sensing can mitigate the effects of the shading sensitivity that can occur in the inward-facing configuration of FIG. 19A. For example, when shading device 21 is a horizontal blind and the spectral responses of the sub-sensors are chosen to yield a high LAS gain, the LAS signal will typically exhibit negative shading sensitivity (so that the LAS signal increases as the slats are closed in the positive-tilt direction).

The sensor shown in FIG. 20 can mitigate this when configured and used in the following way:

The sensor is oriented so that unconstrained FOVs of sub-sensors 81 and 82 point inward in the positive-Y direction, as shown in FIG. 20.

Sub-sensor 81 is used as the sunlight sub-sensor, i.e. it is specified to have a spectral response such that its output in response to sunlight is relatively insensitive to atmospheric attenuation of that sunlight.

Sub-sensor 82 is used as the reference sub-sensor, i.e. it is specified to have a spectral response such that its output in response to sunlight is relatively sensitive to atmospheric attenuation of that sunlight.

Thus, referring again to FIG. 4 as well as FIG. 20, sub-sensor 81 has an elevation FOV that makes it more sensitive to near-zone component 34 (and hence, via reflection, to sky component 29) than to ceiling component 32 (and hence, via reflection, to ground component 31) and sub-sensor 82 has an elevation FOV which makes it more sensitive to ceiling component 32 (and hence, via reflection, to ground component 31) than to near-zone component 34 (and hence, via reflection, to sky component 29).

Since an increase in the slat tilt angle of blind 21A will reduce near-zone component 34 while increasing ceiling component 32, it will also reduce the flux at sub-sensor 81 while increasing the flux at sub-sensor 82. This, in turn, will tend to decrease the LAS signal as the blind is closed, offsetting a negative shading sensitivity.

The actual constrained elevation FOVs of sub-sensors 81 and 82 should be chosen to minimize the magnitude of the shading sensitivity under typical conditions. This will typically result in sub-sensors 81 and 82 having overlapped elevation FOVs in order to avoid over-correcting the negative shading sensitivity (which would result in an excessively positive shading sensitivity).

Use of Combined Angle-Diversity and Multi-Spectral Sensing in Outward-Facing Configuration When used in the following way, the combined Angle-Diversity and Multi-Spectral sensor shown in FIG. 20 can also mitigate the negative shading sensitivity and reduction in LAS gain that can occur under certain conditions in the configurations of FIGS. 19B-19D:

The sensor is rotated 180-degrees about the Z-axis with respect to its orientation in FIG. 20 (i.e. so that the FOVs of sub-sensors 81 and 82 point in the negative-Y direction).

Sub-sensor 81 is used as the reference sub-sensor, i.e. it is specified to have a spectral response such that its output in response to sunlight is relatively sensitive to atmospheric attenuation of that sunlight.

Sub-sensor 82 is used as the sunlight sub-sensor, i.e. it is specified to have a spectral response such that its output in response to sunlight is relatively insensitive to atmospheric attenuation of that sunlight.

Referring again to FIG. 4, this causes sub-sensor 81 (which has a constrained elevation FOV that points downward) to be more sensitive to ground component 31 than to sky component 29, and sub-sensor 82 (which has a constrained elevation FOV that points upward) to be more sensitive to sky component 29 than to ground component 31. This causes the LAS signal to decrease with an increase in the ratio of ground component 31 to sky component 29, offsetting a negative shading sensitivity However, there is a potential issue with Angle-Diversity sensing in the configuration of FIG. 19B when shading device 21 is a moveable window covering and sensor 70 is located close to shading device 21. Under such conditions, operation of the window covering can sharply change the ratio of irradiances at the sub-sensors, causing discontinuities in the sensor output. For example, if shading device 21 is a horizontal blind, then the shadow created by the edge of a slat can move vertically across the sensor as the blind is adjusted, reaching the sub-sensors at slightly different times. This effect has not yet been fully analyzed, but could prove deleterious enough to preclude the use of Angle-Diversity sensing in this configuration.

Combining Sensors of FIG. 12 and FIG. 20

The sensor shown in FIG. 20 uses Angle-Diversity to mitigate undesirable effects associated with Multi-Spectral sensing. On the other hand, the sensor shown in FIG. 12 uses Angle-Diversity sensing to mitigate the tilt-curve mismatch effect shown in FIG. 7. When both effects are potential issues (e.g. in the configuration of FIG. 19A when shading device 21 is a horizontal blind), it is possible to combine the sensors to mitigate both effects simultaneously.

This can be done by using an instance of the sensor shown in FIG. 12 to obtain a daylight signal and an instance of the sensor shown in FIG. 20 to obtain an LAS signal, and then using the daylight and LAS signals to obtain a glare signal as previously described in the section entitled "Using the LAS Signal with a Daylight Signal to Derive a Glare Signal". Using separate sensors in this way enables the constrained FOVs to be optimized for each sensor.

Alternatively, the sensors of FIGS. 12 and 20 can be combined so that all four sub-sensors share the same housing. This can be done by mounting floor sub-sensor 51 and sub-sensor 81 side-by-side (i.e. at the same Z-coordinate but displaced along the X-axis), mounting ceiling sub-sensor 52 and sub-sensor 82 side-by-side, and widening the housing and aperture accordingly to meet the constrained FOV guidelines discussed previously. However, in such a configuration, sub-sensors 51 and 81 have the same elevation FOV and sub-sensors 52 and 82 have the same elevation FOV, which will typically result in excessive positive shading sensitivity.

The magnitude of the shading sensitivity can be reduced by stacking the four sub-sensors vertically (i.e. along the Z-axis) in the same housing, so that the vertical spacing between sub-sensors 81 and 82 is less than the spacing between sub-sensors 51 and 52. This will reduce the difference between the constrained FOVs of sub-sensors 81 and 82, thereby reducing the positive shading sensitivity.

Alternatively, a single sub-sensor can be used as both floor sub-sensor 51 and sub-sensor 81, and another single sub-sensor as both ceiling sub-sensor 52 and sub-sensor 82. This yields a simpler configuration but will also generally suffer from excessive positive shading sensitivity.

Combining Inward-Facing and Outward-Facing Configurations

As noted above, the configuration of FIG. 19B enables the sub-sensors to be shielded from artificial illumination. This permits the use of a reference sub-sensor that is responsive to visible wavelengths, which in turn enables a high LAS gain to be achieved with relatively inexpensive photosensors. However, also as previously noted, this configuration will result in substantial negative shading sensitivity when shading device 21 is a horizontal blind. Further, mitigation of this negative shading sensitivity via Angle-Diversity may not be possible due to the risk of discontinuities in the sensor output caused by moving shadows from the edges of the blind's slats.

However, this problem can be solved by using two Multi-Spectral sensors, one facing inward (as in FIG. 19A) that includes Angle-Diversity sensing to yield a positive shading sensitivity, and the other facing outward as in FIG. 19B. The LAS signals from each sensor can then be processed in such a way as to produce a net LAS signal that has both a lower magnitude of shading sensitivity and a higher LAS gain than would be obtainable from a single sensor. Such processing can be done as follows:

$LAS_{net} = LAS_{in}\char`^ A * LAS_{out}\char`^ B$, where $LAS_{net}$ is the net LAS signal;
$LAS_{in}$ is the LAS signal from an inward-facing Multi-Spectral sensor configured to provide a positive shading sensitivity (e.g. as previously described in reference to FIG. 20);
$LAS_{out}$ is the LAS signal from the outward-facing Multi-Spectral sensor; and
A and B are constants.

Optionally, the $LAS_{out}$ signal from the outward-facing sensor can be first adjusted as a function of the slat-tilt angle (as previously mentioned and subsequently described in detail in reference to a preferred embodiment) to further reduce the magnitude of the shading sensitivity.

Such an implementation doubles the required number of sub-sensors, but substantially increases the overall FOM.

Increased Number of Sub-Sensors

Multi-spectral sensing can also be implemented with more than two sub-sensors. For example, in an absorption-based Multi-Spectral sensor, the reference sub-sensor output could be derived as a weighted sum of many sub-sub-sensors, each sensing a different absorption band. This could be implemented with discrete photosensors (as described above), or as a spectrometer comprising a dispersive element (e.g. a prism or diffraction grating), a slit, a linear or two-dimensional photosensor array, and a microcontroller executing an appropriate code. Such a configuration is used, for example, in the Spectruino open-source microcontroller-based spectrometer.

Such a configuration could enable exploitation of both absorption and scattering phenomena.

Preferred Embodiment

As with most practical devices, the implementation of the improved daylight sensor disclosed herein represents a trade-off between performance and cost. Practitioners in the art can use the information provided herein to achieve the best trade-off for a given application.

The preferred embodiment described below represents one such trade-off. It provides excellent glare-blocking performance at low cost and is especially well-suited to non-residential daylight-harvesting applications, in which cost-effectiveness is crucial to market acceptance.

The preferred embodiment is an innovative daylight sensor for DDC applications that combines three of the innovations described above (optimized FOV, Angle-Diversity, and Multi-Spectral sensing) in order to provide superior performance relative to prior-art daylight sensors.

Figure 21:
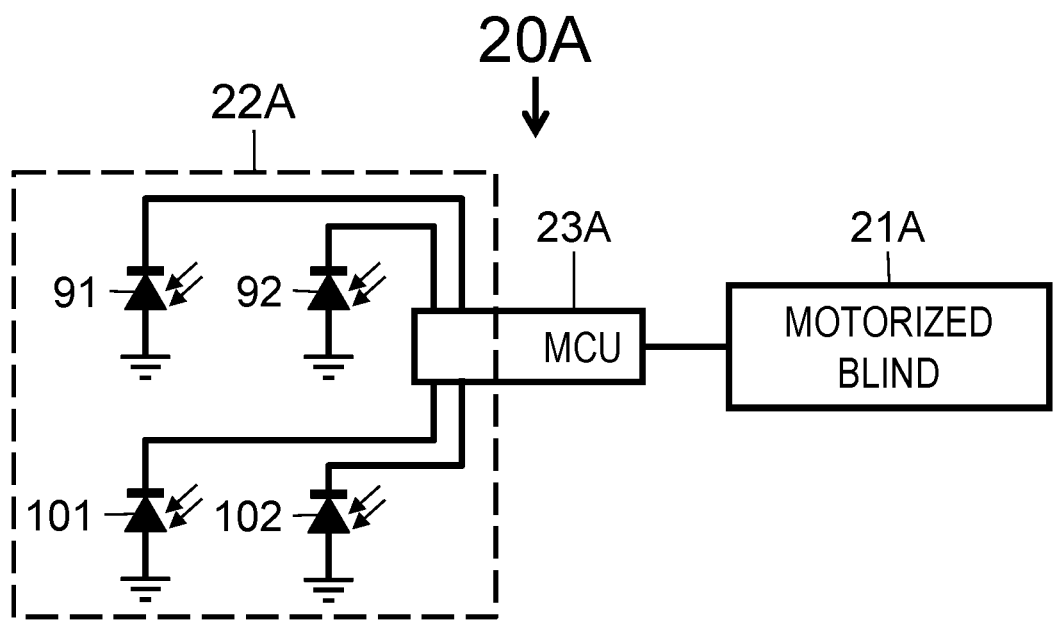
FIG. 21 shows a simplified schematic/block diagram of a daylight sensor 22A according to the subject invention (preferred embodiment).

FIG. 21: Simplified Schematic/Block Diagram

FIG. 21 shows a simplified electronic schematic/block diagram of a DDC system 20A, which includes a preferred embodiment, sensor 22A, of a daylight sensor according to the subject invention. System 20A also includes a Microcontroller Unit (MCU) 23A and motorized blind 21A. MCU 23A provides some of the functionality of sensor 22A, but also performs other DDC functions such as controlling blind 21A; thus MCU 23A is shared between sensor 22A and the rest of system 20A.

Photodiodes 91, 92, 101, and 102

In addition to shared MCU 23A, sensor 22A also includes a floor photodiode 91, a ceiling photodiode 92, a sunlight photodiode 101, and a reference photodiode 102. Photodiodes 91 and 92 are used to implement Angle-Diversity sensing as previously described, while photodiodes 101 and 102 are used to implement Multi-Spectral sensing as previously described. Photodiodes 91, 92, and 101 are silicon IR photodiodes having a −3 dB spectral response extending from about 790 nm to about 1030 nm (Osram part number SFH 2400 FA). Reference photodiode 102 is a silicon visible-light-sensing photodiode having a −3 dB spectral response extending from about 430 nm to 610 nm (Vishay part number TEMD6200FX01). Photodiodes 91, 92, 101, and 102 have unconstrained −3 dB FOV widths of about 120-140 degrees in both azimuth and elevation.

MCU 23A

MCU 23A is a microcontroller of the Atmel megaAVR family (or a similar device) with an onboard timer and multiple discrete I/O pins, each of which can be defined as either an input or an output under program control. The cathode of each of photodiodes 91, 92, 101, and 102 is connected to a separate discrete I/O pin of MCU 23A, while the anodes are grounded. MCU 23A implements conventional program steps to infer the photocurrent in each diode using the well-known capacitance-discharge-time method:

MCU 23A first charges the intrinsic capacitance of the photodiode or LED whose photocurrent is to be sampled by reverse-biasing it, i.e. by defining the discrete I/O pin as an output and setting it high.

MCU 23A then redefines the I/O pin as an input and measures the time required for capacitance to discharge such that the pin state changes from high back to low. The relative photocurrent is then inferred as the reciprocal of this discharge time.

This capacitance-discharge-time method of inferring photocurrents in a photodiode (or an LED used as a photodiode) is described in detail by Paul Dietz, William Yerazunis, and Darren Leigh in "Very Low-Cost Sensing and Communication Using Bidirectional LEDs", Technical Report TR2003-35, published by Mitsubishi Electric Research Laboratories (2003).

The capacitance-discharge-time method offers significant advantages over other means of sensing photocurrents:

It eliminates the need for analog circuitry such as trans-impedance amplifiers, load resistors, and voltage buffers. The savings are particularly significant for systems that use multiple photosensors, such as sensor 22A.

It consumes very little power and has no quiescent current consumption, facilitating battery-powered operation.

It is potentially capable of supporting a wide dynamic range.

However, the time required to sample a photocurrent using the capacitance-discharge-time method can be much longer than the conversion time of an MCU's Analog-to-Digital Converter (ADC). The implications of this sampling time are discussed in the paragraph entitled "Photocurrent Sampling Time Considerations".

Motorized Blind 21A

Motorized blind 21A is a horizontal venetian blind which includes a motor and associated circuitry to increase or decrease the slat-tilt setting as a function of control signals from MCU 23A, and to enable MCU 23A to determine if the slat-tilt setting is at either limit of a slat-tilt operating range (to be discussed subsequently). Many such motorized blinds are available commercially, and many approaches for meeting these requirements are known in the art. For example, the motor can be a DC gear-motor, an AC gear-motor, or a stepping motor, and the relative slat-tilt setting can be tracked by an internal variable or a hardware counter in MCU 23A, based on stepper-motor drive signals or the output of an incremental or absolute encoder coupled to the motor shaft. Alternatively, the actual slat tilt can be measured using a two-axis accelerometer fixed to the blind's internal tilt-shaft or to one of the blind's slats, or the tilt limits can be sensed by means of limit switches actuated by a cam on the blind's internal tilt shaft.

In the preferred embodiment, motorized blind 21A consists of a conventional horizontal blind with a DC gear-motor mounted inside the blind's headrail. The output shaft of the gear-motor is mechanically coupled to the blind's internal tilt-shaft and electrically driven by an H-bridge motor-control chip whose control inputs are connected to discrete I/O pins of MCU 23A. An incremental Hall-effect encoder is coupled to the motor output shaft and connected to the input of one of the onboard hardware counters of MCU 23A.

Conventional Elements not Shown in FIG. 21

System 20A also includes conventional elements such as a power source (e.g. a primary battery, a secondary battery in combination with a photo-voltaic cell, a "wall-wart" power supply or a junction-box-mounted power supply, etc.), bypass capacitors, a ceramic resonator, an H-bridge motor-control chip, an RF transceiver module or a keypad to implement a user interface, etc. However, because the use of such elements in a device such as system 20A is well-established in the art, and because such elements are incidental to the subject invention, they are omitted from FIG. 21 for the sake of clarity.

Figure 22:
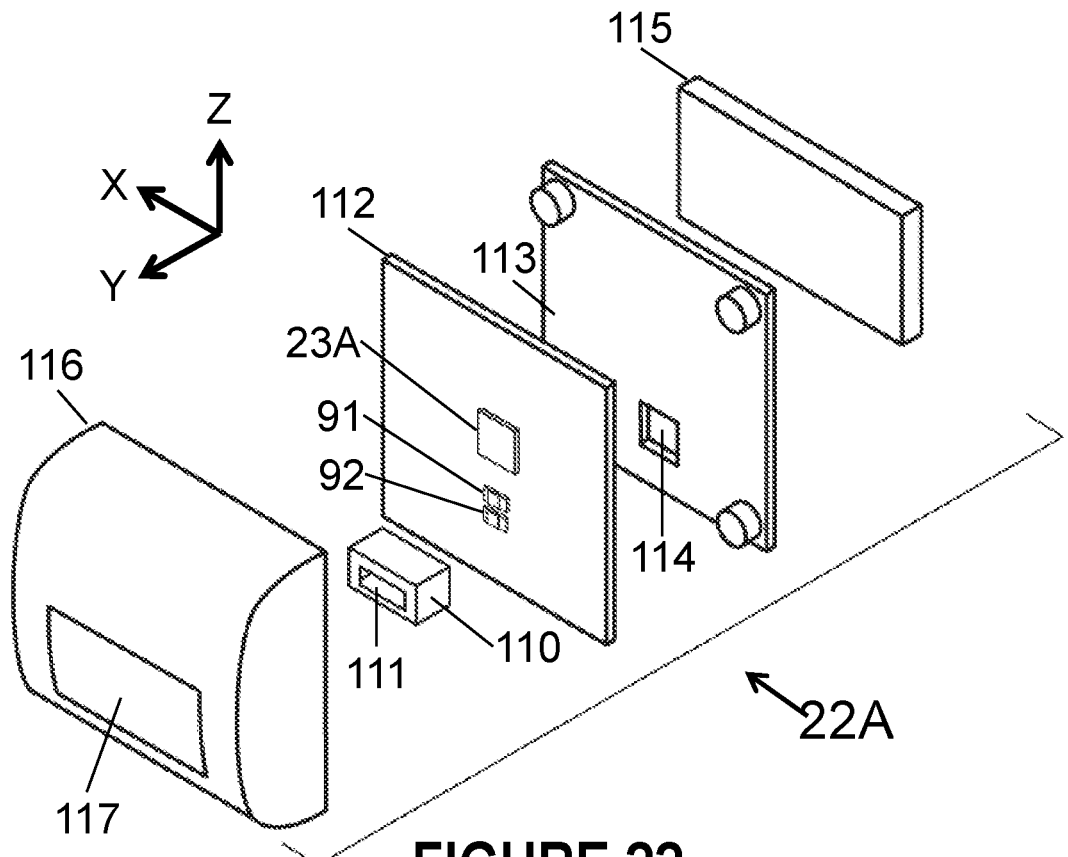
FIG. 22 shows an exploded perspective view of daylight sensor 22A according to the subject invention (preferred embodiment).

FIG. 22: Exploded Perspective View of Sensor 22A

FIG. 22 shows an exploded perspective view of sensor 22A, along with a coordinate reference frame to indicate the installed orientation relative to the room coordinate system of FIG. 2B. Floor photodiode 91, ceiling photodiode 92, and microcontroller 23A are surface-mounted on a Printed-Circuit Board (PCB) 112 which implements the connections depicted in the simplified schematic of FIG. 21. PCB 112 also hosts conventional elements included in MCU-based devices, such as a voltage regulator, bypass capacitors, and a ceramic resonator. It also hosts conventional elements of system 20A not directly associated with the daylight-sensing function of sensor 22A, such an H-bridge motor driver, an optional RF-transceiver and network-interface module, and connectors for wiring to a power source and a motorized window covering. However, because the use of such elements in a device such as system 20A is well-established in the art, and because such elements are incidental to the subject invention, they are omitted from FIG. 22 for the sake of clarity.

Photodiodes 91 and 92 are covered by a housing 110 having an aperture 111. Housing 110 should be substantially opaque at the wavelengths sensed by photodiodes 91 and 92, and its interior surfaces should have low reflectivity at those wavelengths. Prototypes of sensor 22A have successfully used housings that were 3D-printed from black Nylon 11 powder using Selective Laser Sintering (SLS), as well as housings made of stamped steel and coated with matte-black paint. Still better performance can be achieved by applying an anti-reflective coating to the interior surfaces of the housing, such as Duracon™ Black by Materials Technologies Corporation or Avian Black-S by Avian Technologies LLC, but this has not proven necessary in developmental testing to date.

Housing 110 is attached to PCB 112 using a conventional method; prototypes have successfully used epoxy adhesive.

Photodiodes 91 and 92, housing 110, and aperture 111 are configured in the same way as the Angle-Diversity sensor previously shown in FIG. 12. Photodiode 91 is positioned above photodiode 92, so that aperture 111 constrains the elevation FOV of photodiode 91 in the upward direction (so that its constrained elevation FOV points downward) and the elevation FOV of photodiode 92 in the downward direction (so that its constrained elevation FOV points upward). Aperture 111 is sized and positioned relative to photodiodes 91 and 92 to give photodiode 91 a constrained −20 dB elevation FOV that extends from about zero degrees (i.e. horizontal) to about −70 degrees (i.e. 70 degrees below horizontal), and to give photodiode 92 a constrained −20 dB elevation FOV that extends from about zero degrees to about +70 degrees, per the angle convention of FIG. 2C. Aperture 111 is sized and positioned relative to photodiodes 91 and 92 to give the photodiodes a constrained −20 dB azimuth FOV that extends from about −45 degrees to +45 degrees per the angle convention of FIG. 2C.

PCB 112 is mounted to a bracket 113, having an aperture 114, in a conventional manner (e.g. via stand-offs and screws). In prototypes of sensor 22A, bracket 113 is 3D-printed from Nylon 12 powder using an SLS process, and includes printed standoffs to which PCB 112 is attached using screws (not shown).

A rectangular neodymium magnet 115 is attached to bracket 113 in a conventional manner (e.g. with epoxy glue in the case of prototypes of sensor 22A).

PCB 112 and bracket 113 are covered by a conventional plastic cover 116 having a conventional window 117 which is substantially transparent to the wavelengths to be sensed by photodiodes 91 and 92. In prototypes of sensor 22A, cover 116 is of thermoformed polystyrene and window 117 is of thermoformed PET-G. Window 117 is sized and positioned so that cover 116 does not further constrain the FOVs of photodiodes 91 and 92 (beyond the FOV constraints already imposed by housing 110).

Cover 116 is secured to bracket 113 in a conventional manner; in prototypes of sensor 22A, cover 116 snaps over bracket 113 and is held in place by friction.

Figure 23:
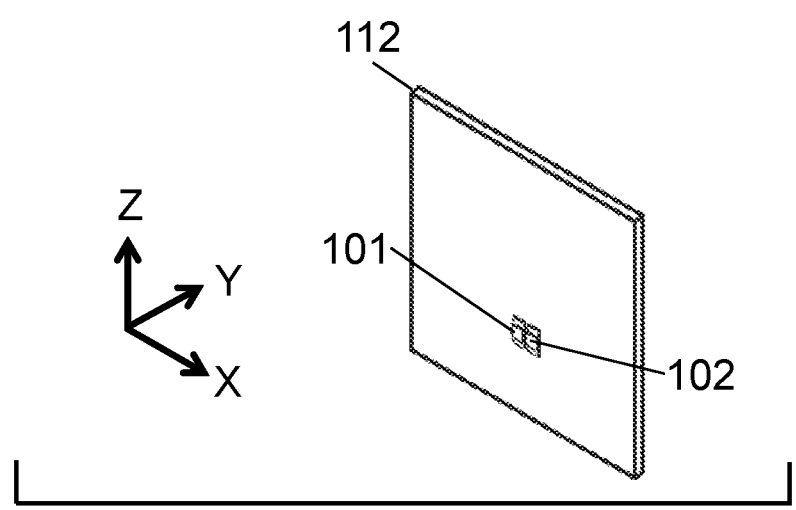
FIG. 23 shows a perspective view of the rear of the printed-circuit board of daylight sensor 22A (preferred embodiment)

FIG. 23: Perspective View of Rear of PCB 112

FIG. 23 shows a perspective top-rear view of PCB 112 (revealing the surface of PCB 112 which faces bracket 113 in FIG. 22), along with a coordinate reference frame to indicate the installed orientation relative to the room coordinate system of FIG. 2B.

Sunlight photodiode 101 and reference photodiode 102 are mounted side-by-side on PCB 112. Photodiodes 101 and 102 are located in the X-Z plane relative to aperture 114 (shown in FIG. 22) so that, when PCB 112 is mounted on bracket 113, aperture 114 constrains the elevation FOVs of photodiodes 101 and 102 in the downward direction, i.e. so that they have the same constrained elevation FOV which points upward. The size of aperture 114 and the relative locations of aperture 114 and photodiodes 101 and 102 are such that, per the angle convention of FIG. 2C, the constrained elevation FOV of photodiodes 101 and 102 extends from about 180 degrees (horizontal) to about 135 degrees (i.e. 45 degrees above horizontal). This constrained elevation FOV mitigates the reduction in LAS gain that can be caused by ground-reflected daylight, while the fact that both photodiodes have the same constrained elevation FOV minimizes the shading sensitivity.

Because photodiodes 101 and 102 are mounted side-by-side (i.e. at the same Z-coordinate), their azimuth FOVs as constrained by aperture 114 are slightly different. Aperture 114 is sized and located relative to photodiodes 101 and 102 so that each of photodiodes 101 and 102 has a constrained azimuth FOV whose right edge is no greater than about −135 degrees and whose left edge is no less than about 135 degrees, per the angle convention of FIG. 2C.

Figure 24:
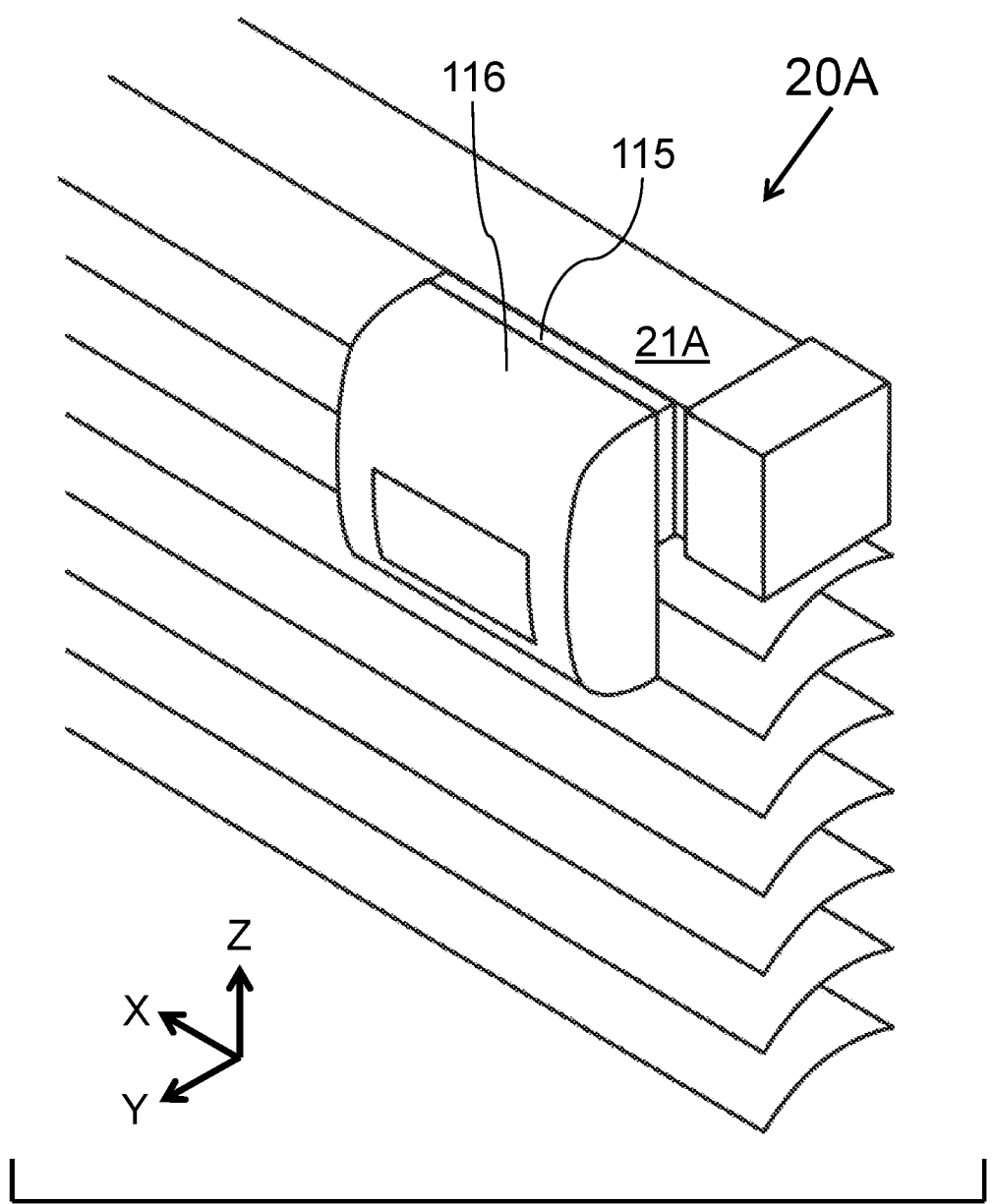
FIG. 24 shows a perspective view of a DDC system 20A that includes daylight sensor 22A mounted on a motorized horizontal blind 21A (preferred embodiment).

FIG. 24: Perspective Top-Front View of System 20A

FIG. 24 shows a perspective top-front view of system 20A which consists of the elements shown in FIGS. 22 and 23 attached to the headrail of motorized blind 21A via magnet 116. System 20A also includes conventional wiring to a power source and to blind 21A; such wiring is incidental to the subject invention and is omitted from FIG. 24 for the sake of clarity.

Advantages of Configuration of Sensor 22A

Referring again to FIGS. 21, 22, and 23, it can be seen that floor photodiode 91 and ceiling photodiode 92 (both of which are substantially insensitive to the spectra produced by typical high-efficiency lamps) face inward in the positive-Y direction, i.e. away from blind 21A. On the other hand, sunlight photodiode 101 (also an NIR photodiode) and reference photodiode 102 (a visible-wavelength photodiode insensitive to NIR) face outward in the negative-Y direction, i.e. toward blind 21A, to enable scattering-based Multi-Spectral sensing with the same location and orientation as Multi-Spectral sensor 70 of FIG. 19B.

This configuration provides the following advantages:

Because they are substantially insensitive to visible wavelengths, inward-facing photodiodes 91 and 92 are substantially unaffected by changes in the on/off state or dimming level of artificial lighting on the inward-side of blind 21A. Thus, they enable true closed-loop control of the daylight admitted by blind 21A. As previously disclosed in U.S. Pat. No. 6,084,231, use of an inward-facing photosensor that is insensitive to artificial illumination can provide more effective sensing of the admitted daylight as well as a more cost-effective implementation.

The outward-facing orientation of photodiodes 101 and 102 partially shields them from artificial lighting, enabling visible wavelengths to be used for Multi-Spectral sensing. This, in turn, enables the use of a scattering-based reference sub-sensor (in this case, visible-wavelength-sensing photodiode 102) which provides substantial LAS gain at low cost.

The constrained elevation FOVs of photodiodes 101 and 102 block ground-reflected daylight, mitigating the reduction in LAS gain that can otherwise occur with an outward-facing Multi-Spectral sensor.

Photodiodes 91, 92, 101, and 102 are mounted on the same PCB, eliminating the need for a separate physical assembly for Multi-Spectral sensing and thereby reducing hardware and installation costs.

Thus, the preferred embodiment of sensor 22A provides an advantageous balance between performance and ease of implementation for typical applications.

Exploiting the Photodiode Outputs

Inward-facing photodiodes 91 and 92 are used to obtain a daylight signal via Angle-Diversity sensing, while outward-facing photodiodes 101 and 102 are used to obtain an LAS signal via Multi-Spectral sensing. The resulting daylight and LAS signals are then used to obtain a glare signal that is used for continuous closed-loop DDC.

A complicating factor in exploiting the sensor outputs is that, as previously noted in reference to FIG. 19B, the LAS signal obtained from an outward-facing Multi-Spectral sensor mounted close to a venetian blind can be affected by glow from the blind's slats. This effect causes the LAS signal to increase as the slats are tilted away from horizontal, resulting in a strongly negative shading sensitivity for positive slat tilt angles (so that the LAS signal increases with increasing slat tilt angle), and a strongly positive shading sensitivity for negative tilt angles (so that the LAS signal increases with decreasing slat tilt angle). However, this effect is sufficiently consistent and predictable so that it can be mitigated by adjusting the LAS signal as a function of the slat-tilt setting, as described below.

Figure 25:
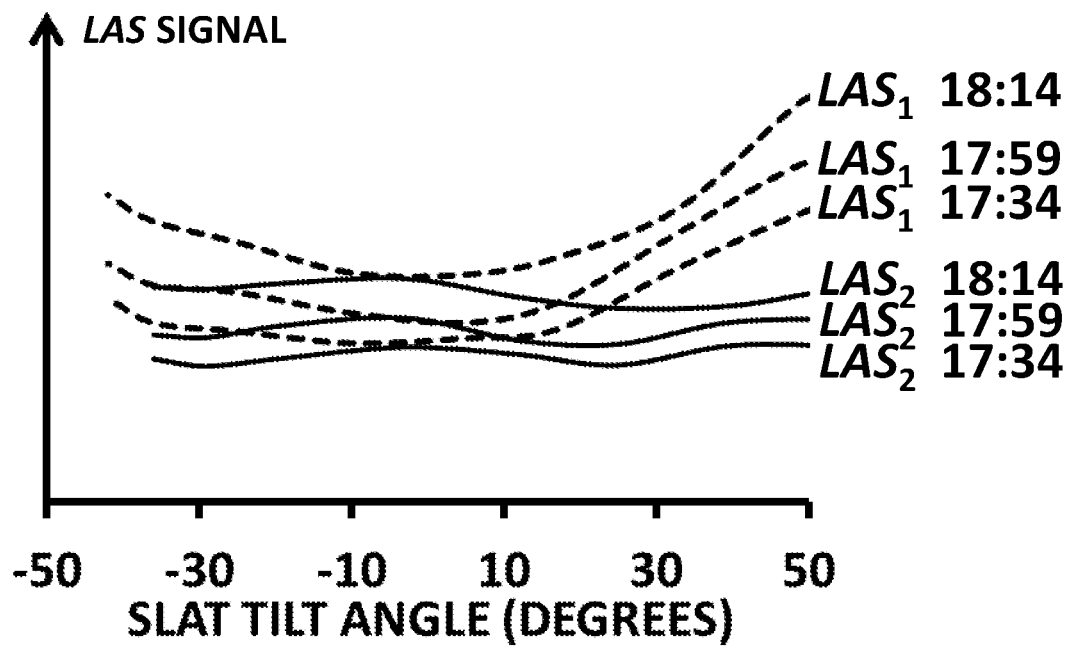
FIG. 25 shows plots of an LAS signal produced by sensor 22A versus slat-tilt angle with clock time as a parameter (preferred embodiment).

FIG. 25: LAS Signals Versus Slat-Tilt Angle

FIG. 25 shows plots of LAS signals obtained from photodiodes 101 and 102 versus the slat-tilt angle of blind 21A, with clock time as a parameter. The data were obtained with a prototype of system 20A mounted on a west-facing window in a test facility in Washington, D.C., USA.

Two types of LAS signal are plotted:

The broken curves labeled "$LAS_1$" represent an LAS signal obtained as previously described (i.e. as the ratio of the photocurrent in a sunlight sub-sensor, in this case photodiode 101, to the photocurrent in a reference sub-sensor, in this case photodiode 102). Note that the amplitude of the $LAS_1$ curves increases as the tilt angle increases beyond zero degrees, which represents a negative shading sensitivity.

The solid curves labeled "$LAS_2$" represent the $LAS_1$ signal adjusted by a factor that depends on the absolute value of the slat tilt angle: $LAS_2=LAS_1*(T*[t]+1)$, where $LAS_2$ is the adjusted LAS signal,

[t] is the absolute value of the slat-tilt angle, and

T is a constant (equal to −0.17 for the plots of FIG. 25).

As is evident in the curves, adjusting the LAS signal in this way substantially mitigates the shading sensitivity under the conditions in which the data was taken. Further, developmental testing suggests that this method of adjusting the LAS signal (with the same value of T) can mitigate the shading sensitivity under a wide range of conditions in which glare can arise.

Further, while the adjustment above is in terms of the absolute slat-tilt angle, testing shows that it is equally effective if done on the basis of the angular displacement of the slat-tilting motor. Thus, a slat-tilt angle sensor is not necessary to implement the adjustment, nor is calibration of the motor position against slat-tilt angle.

Figure 26:
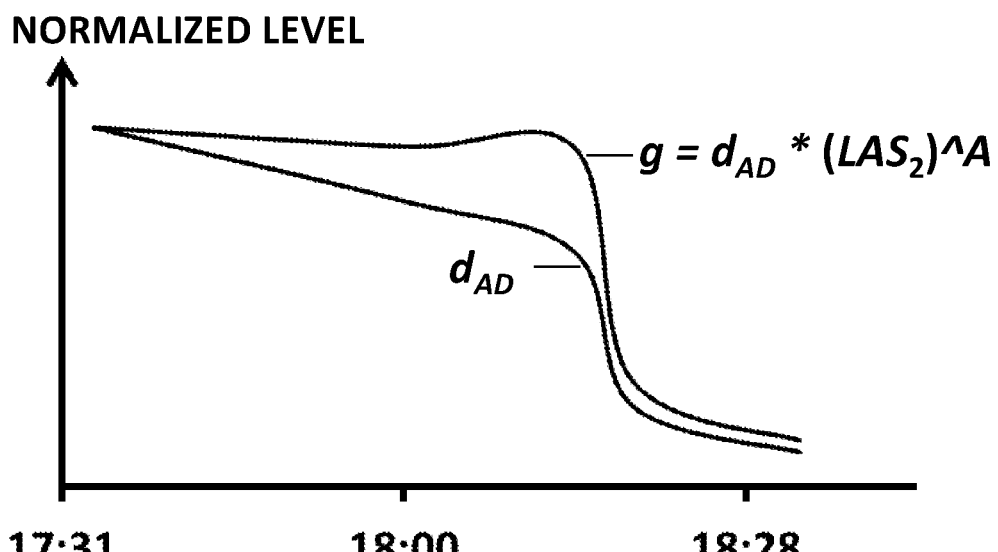
FIG. 26 shows plots of a glare signal produced by sensor 22A versus slat-tilt angle with clock time as a parameter (preferred embodiment).

FIG. 26: Daylight and Glare Signals Versus Time-of-Day

FIG. 26 shows plots of a daylight signal $d_{AD}$ and a glare signal g obtained from photodiodes 91, 92, 101, and 102, versus time of day. The data were collected on the same day as the data of FIG. 25.

The daylight signal was obtained in a manner described previously herein for Angle-Diversity sensing:

$d_{AD}=f^2/c$, where f is the photocurrent in floor photodiode 91 and c is the photocurrent in ceiling photodiode 92.

The glare signal was obtained in a manner described previously herein for Multi-Spectral sensing:

$g=d_{AD}*(LAS_2)^A$, where $d_{AD}$ is the daylight signal and $LAS_2$ is the adjusted LAS signal (both obtained as described above), and A is a parameter (equal to 1.0 for the data plotted in FIG. 26).

The $d_{AD}$ and g curves are normalized to have the same value at time 17:33, which is when sunlight began to penetrate deeply into the test room. The $d_{AD}$ curve begins to decline, while the g curve maintains its value until 18:14, when the solar disc had descended behind a building on the horizon (eliminating any risk of glare).

Determining the Value of Parameter A

The value of parameter A represents a trade between the LAS gain and the shading sensitivity. If A is too small, then the glare signal may not be adequately sensitive to low-angle sunlight. On the other hand, if A is too large, then the glare signal may not be adequately sensitive to glare from conditions other than low-angle sunlight, and the magnitude of the shading sensitivity may be excessive. Developmental testing to date suggests that the same value of A established in a reference installation for a given implementation of system 20A will yield good results across a wide range of installations.

The value of A used in developmental testing of prototypes of system 20A was established in the following way:

In the presence of intense high-angle sunlight, blind 21A was manually adjusted so that the daylight glare was marginally tolerable, and the resulting values of $d_{AD}$ and $LAS_2$ were recorded.

The test was repeated in the presence of low-angle sunlight.

The value of A was then determined as the one which yielded the same value of g under both test conditions.

This procedure yielded a value of 0.75 (versus the value of 1.0 used to obtain the g curve of FIG. 26). Other implementations may require substantially different values, which can be established by practitioners using the information provided herein.

Ideally, the value of A would be optimized over time based on feedback from multiple users. Alternatively, a user interface could be provided to allow users to adjust the value as desired.

Operation of System 20A

Referring to FIG. 21, system 20A performs automatic closed-loop DDC of the daylight admitted by blind 21A on the basis of the output of sensor 22A. This automatic control is implemented by means of programmed operating steps carried out by MCU 23A, including steps to sense the relative photocurrents in photodiodes 91, 92, 101, and 102, calculate a glare signal as a function of those photocurrents, and actuate motorized blind 21A as a function of the glare signal.

Slat-Tilt operating Range for Automatic Daylight Control

Referring again to FIGS. 3A-3C and FIGS. 5-7, the luminance of a window shaded by a horizontal blind from a typical viewing perspective does not vary monotonically with the slat tilt angle, but instead peaks at near the zero-tilt setting (with the actual tilt angle for peak luminance depending on the sun/sky conditions as well as on the vantage point from which the luminance is measured).

This non-monotonicity can cause problems for closed-loop control, so it is advantageous to limit the operating tilt range to either side of the tilt angle that yields peak luminance. As previously noted in connection with FIGS. 3A-3C, positive tilt angles are more effective at blocking sunlight while still admitting useful diffuse daylight. Therefore, it is advantageous to limit the operating tilt range to only positive tilt angles.

Thus, the lower limit of the slat-tilt range should be near zero degrees (i.e. with the slats horizontal), while the upper limit should be at the maximum positive-tilt setting. The lower tilt limit can also be considered the "fully open" setting, while the upper tilt limit can be considered the "fully closed" setting. The exact value of the lower tilt limit is not critical and will typically be set by the user. For the purposes of the following discussion, a value of zero degrees is assumed for the lower tilt limit.

Figure 27:
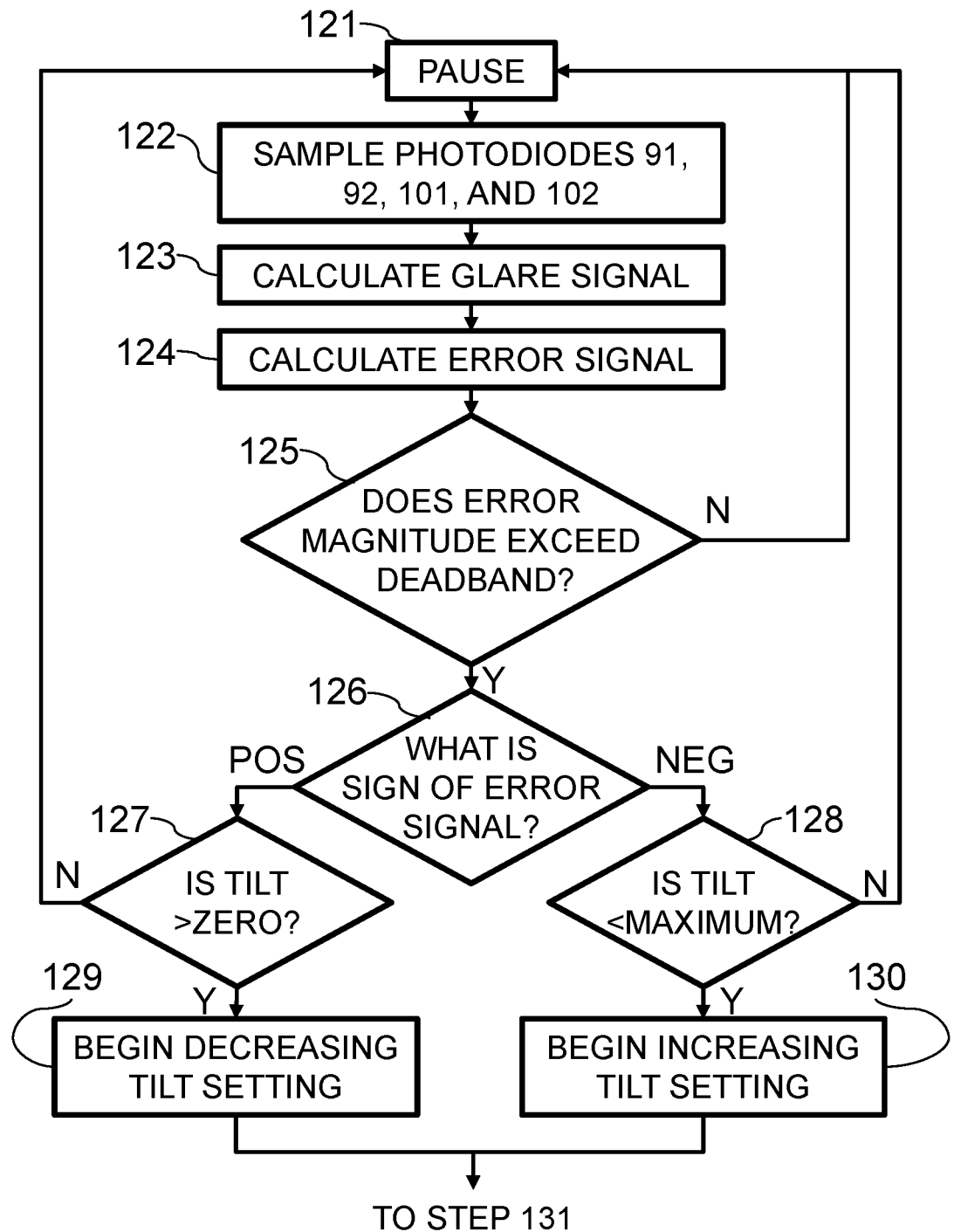
FIG. 27 is a flowchart of the operating steps of DDC system 20A and augmented system 190 to be performed when blind 21A is not being adjusted (preferred embodiment).

FIG. 27: Operating Steps when Blind 21A is not being Adjusted

Steps 121 through 130 of FIG. 27 represent the operating steps performed by system 20A when the tilt setting of blind 21A is not being adjusted. In general, these steps are aimed at determining if the tilt setting of blind 21A should be adjusted, and if so, if the tilt setting should be increased or decreased.

Pause Step 121 and Sampling Step 122

In a pause step 121, MCU 23A waits for a sampling interval, e.g. 1 second.

Then, in a sampling step 122, MCU 23A determines the relative photocurrent flowing in each of photodiodes 91, 92, 101, and 102 using the conventional capacitance-discharge-time technique previously described. Next, MCU 23A uses those relative photocurrents to calculate a glare signal.

Calculation Step 123: Calculating the Glare Signal

In a step 123, MCU 23A uses the relative photocurrents to calculate the value of a glare signal as previously described, i.e.

$$g = d_{AD} * (LAS_2)^A, \text{ where}$$

g is the glare signal, $d_{AD}$ is a daylight signal obtained as $d_{AD} = f^2/c$, where f is the relative photocurrent in floor photodiode 91 and c is the relative photocurrent in ceiling photodiode 92, $LAS_2$ is a an adjusted LAS signal obtained as $LAS_2 = s/r*(T[t]+1)$, where s is the relative photocurrent in sunlight photodiode 101, r is the relative photocurrent in reference photodiode 102,

[t] is the absolute value of the slat-tilt angle;

T is a constant (equal to −0.17 in developmental testing of prototypes of system 20A), and A is an empirically-derived constant (as previously noted, a value of A=0.75 worked well for prototypes of system 20A, although a value of 1.0 was used to obtain the data of FIG. 26).

Calculation Step 124 and Decision Step 125

Next, in a step 124, MCU 23A calculates an error signal by subtracting the glare signal from a user-established setpoint. Then, in a step 125, MCU 23A compares the magnitude of the error signal to a deadband; if the magnitude of the error signal is less than or equal to the deadband, then pause step 121 is repeated. This loop (consisting of steps 121 through 125) is iterated as long as the magnitude of the error signal does not exceed the deadband, enabling the system to periodically sample the glare signal to determine if and when blind 21A should be actuated.

Decision Steps 126-128 and Action Steps 129 and 130

However, if the magnitude of the error signal exceeds the deadband, then a decision step 126 is performed which causes the program to branch depending on the sign of the error signal.

If the error signal is positive (i.e. if the setpoint is greater than the glare signal), then blind 21A should be opened (i.e. the slat tilt angle should be reduced), but only if the slat tilt angle is greater than the zero-tilt (fully open) setting. Therefore, in a decision step 127, MCU 23A branches to an action step 129 to decrease the slat-tilt setting of blind 21A if the slat-tilt is greater than zero; otherwise, operation branches back to pause step 121.

On the other hand, if the error signal is negative (i.e. if the setpoint is less than the glare signal), then blind 21A should be closed, but only if the slat tilt angle is less than the maximum-tilt (fully closed) setting. Therefore, in a decision step 128, MCU 23A branches to an action step 130 to increase the slat-tilt setting of blind 21A if the slat-tilt is less than the maximum-tilt setting; otherwise, operation branches back to pause step 121.

Figure 28:
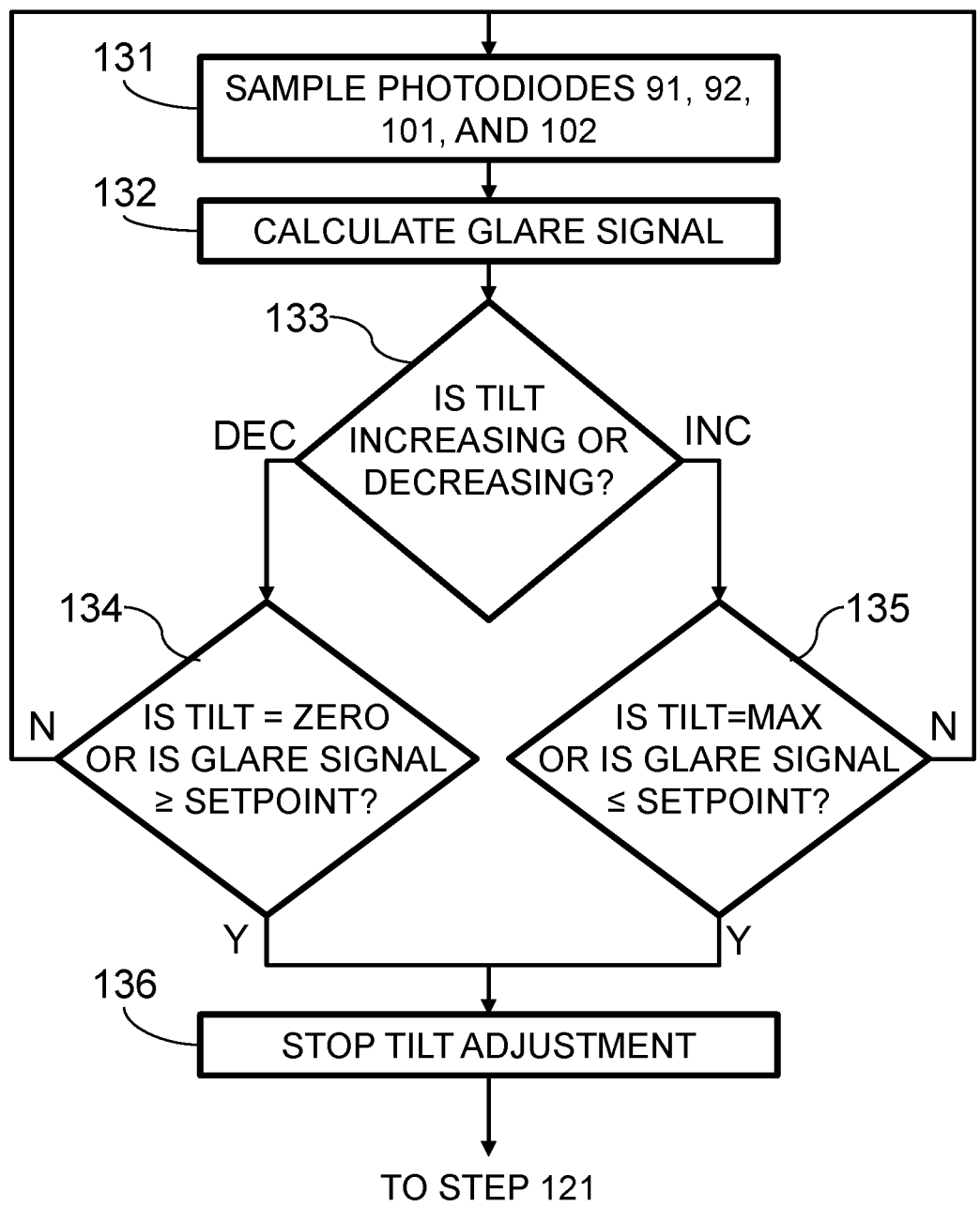
FIG. 28 is a flowchart of the operating steps of DDC system 20A and augmented system 190 to be executed while blind 21A is being adjusted (preferred embodiment).

After either action steps 129 or 130, operation proceeds to step 131 of FIG. 28.

FIG. 28: Operating Steps when Blind 21A is being Adjusted

Steps 131 through 136 of FIG. 28 represent the operating steps performed by system 20A while the tilt setting of blind 21A is being adjusted. In general, these steps are aimed at determining if the tilt adjustment should stop.

Sampling Step 131 and Calculation Step 132

In a sampling step 131, MCU 23A determines the relative photocurrents flowing in photodiodes 91, 92, 101, and 102 in the same way as in sampling step 122.

Then, in a calculation step 132, the value of the glare signal is calculated in the same way as in calculation step 123 of FIG. 27.

Decision Steps 133-135 and Action Step 136

In a decision step 133, program flow branches depending on whether the tilt setting is increasing or decreasing.

If the tilt setting is decreasing (so that the daylight level should be increasing), then a decision step 134 is performed to check if the zero-tilt (i.e. fully open) setting has been reached or if the glare signal is equal to or greater than the setpoint. If either of these conditions is met, then action step 136 is performed to stop the tilt adjustment, and program flow branches to pause step 121 of FIG. 27.

If, on the other hand, the tilt setting is increasing (so that the daylight level should be decreasing), then a decision step 135 is performed to check if the maximum-tilt (i.e. fully closed) setting has been reached or if the glare signal is equal to or less than the setpoint. If either of these conditions is met, then action step 136 is performed to stop the tilt adjustment, and program flow branches to pause step 121 of FIG. 27.

Photocurrent Sampling Time Considerations

As previously stated in connection with FIG. 21, sensor 22A uses the capacitance-discharge-time method of inferring the photocurrents in photodiodes 91, 92, 101, and 102. This eliminates the need for the analog circuitry (such as trans-impedance amplifiers or voltage buffers) required by other photocurrent-sensing methods while still providing excellent sensitivity and dynamic range. The savings in hardware are particularly significant because sensor 22A has four photodiodes.

However, a disadvantage of the capacitance-discharge-time method is that the time required for the photocurrent to discharge the capacitance (and, hence, the photocurrent sampling time) can be much longer than an MCU's analog-to-digital converter sampling time. The sampling time for the capacitance-discharge-time method varies with the intrinsic photodiode capacitance and inversely with the photocurrent:

Sampling times are longer for LEDs used as photodiodes than for standard photodiodes.

Sampling times are longer in relatively low light levels.

The sampling time limits the rate at which MCU 23A can update the glare signal, and hence the speed with which the tilt setting of blind 21A can be adjusted while still maintaining effective closed-loop control.

System 20A minimizes the aggregate sampling time in two ways:

It does not require the spectral selectivity of LEDs, and photodiodes 91, 92, 101, and 102 have relatively short sampling times.

The irradiance on photodiodes 101 and 102 is relatively high due to their outward-facing orientation, which further reduces the sampling time.

In developmental testing to date, sensor 22A has provided effective closed-loop control with a motorized blind that can tilt from the fully-open (i.e. zero-tilt) setting to the fully-closed setting in about six seconds. However, if a faster adjustment speed or the ability to accommodate very low glare setpoints is desired, then additional measures can be taken to mitigate the sampling time.

Additional Means of Mitigating Sampling Time

Sensor 22A can be modified to achieve a higher sampling rate by using a conventional Trans-Impedance Amplifier (TIA) and Analog-to-Digital Converter (ADC), instead of the capacitance-discharge-time method used in the preferred embodiment. This is because even low-cost microcontrollers have typical ADC conversion times much shorter than the typical photodiode capacitance-discharge times in low light levels, and sufficiently short to fully mitigate sampling-time issues. The TIA approach increases the parts count and requires the host MCU to have at least two onboard ADC channels, but the impact on overall system cost and complexity would be modest.

Another way to make the capacitance-discharge technique of the preferred embodiment work with low daylight setpoints is to use a shading device with a variable or selectable adjustment speed. A sufficient sampling rate can then be ensured by making the adjustment speed proportional to either the sensed photocurrent or to the glare setpoint.

Yet another means of mitigating the sampling time is to sample photodiodes 101 and 102 only when the slats are not being tilted, i.e. only in the steps of FIG. 27 and not in the steps of FIG. 28. This approach depends on the fact that the shading sensitivity of the adjusted LAS signal $LAS_2$ is negligible (as shown in FIG. 25). However, not enough testing has yet been done to ensure that the shading sensitivity will remain low enough under all conditions to rely upon this approach.

Potential Modifications

Many of the FOV, Angle-Diversity, and Multi-Spectral design alternatives described previously herein are applicable to sensor 22A. In addition, practitioners in the art will recognize that many conventional modifications can be applied to sensor 22A. Potential modifications include, but are not limited to, the following:

Use of different operating steps consistent with the essence of the daylight sensor disclosed herein.

Adding conventional functionality to sensor 22A and system 20A, e.g. by adding a Passive Infra-Red (PIR) movement sensor and associated operating steps to control blind 21A as a function of room occupancy.

Use of different baffle shapes and materials to meet the FOV requirements described herein.

Use of imaging or non-imaging optics to meet the FOV requirements described herein.

Use of different mathematical functions to obtain the glare signal according to the guidelines discussed herein.

Use of analog circuitry (e.g. summing amplifiers, analog multipliers, logarithmic amplifiers, etc.), rather than a microcontroller and software steps, to obtain the glare signal.

Use of trans-impedance amplifiers or resistive loads, instead of the capacitance-discharge-time method, to infer the photocurrents.

Use of other types of photosensors (e.g. use of phototransistors, photo-resistors, or LEDs instead of photodiodes).

Use of photosensors with different spectral responses, consistent with the information on Multi-Spectral sensing disclosed herein.

Some specific modifications to the preferred embodiment that may be advantageous in some applications are discussed below.

Use of Sensor 22A with Shading Devices Other than Horizontal Venetian Blinds

One of the advantages of the optimized FOV and Angle-Diversity aspects of sensor 22A is that they are uniquely able to mitigate the challenges associated with using horizontal venetian blinds for closed-loop daylight control. However, the innovations embodied in sensor 22A are also advantageous when used with other window-shading devices, such as vertical blinds, roller shades, curtains, and Smart Windows.

Because horizontal venetian blinds are the most challenging type of shading device to use in closed-loop daylight-control applications, practitioners in the art could use the information disclosed herein to readily adapt system 20A for use with other types of shading device. In fact, blind 21A of system 20A could be replaced with many other types of electronically-actuated shading device without need for hardware changes to sensor 22A. Depending on the type of shading device, three changes to system 20A would potentially be needed:

The conventional interface circuitry used between MCU 23A and motorized blind 21A (i.e. the H-bridge motor-control chip recited in the discussion but not shown in the drawings) will support a variety of motorized window coverings using DC gear-motors. However, the circuitry would have to be changed according to conventional practice for use with a Smart Window, or with a motorized window-covering that incorporates an AC gear-motor or a stepping motor.

Instead of the slat tilt angle, the operating steps of FIGS. 25 and 26 would need to reference whatever variable is appropriate for the shading device in question. For example, if the shading device is a motorized roller shade, the degree of shade extension would be referenced instead of the slat-tilt setting of blind 21A, with the fully-extended shade position corresponding to the maximum-tilt (fully closed) setting of blind 21A, and the fully-retracted shade position corresponding to the zero-tilt (fully open) setting of blind 21A. Similarly, for a continuously adjustable LC Smart Window or a Smart Window based on Suspended-Particle Device technology, the relative window opacity would be referenced instead of the slat tilt, while for a switchable two-state (transparent/translucent) LC Smart Window, the transparent state would be referenced instead of the fully open setting of blind 21A, and the translucent state would be referenced instead of the fully closed setting.

Additional Modifications for Use with Quick-Response Smart Windows

For effective closed-loop DDC, the time required to complete the steps of FIG. 28 should be much shorter than the response time of the shading device in use. In order to meet this criterion when a quick-response shading device, such as a Smart Window based on LC or Suspended-Particle Device technology, is used instead of blind 21A, the following modifications could be made to system 20A:

The response time of the Smart Window could be slowed down by low-pass filtering the control signal applied to it.

Additionally or alternatively, the photocurrent sampling time in steps 122 and 131 of FIGS. 25 and 26, respectively, could be reduced as previously described in the section entitled "Photocurrent Sampling Time Considerations".

Additional Modifications and Constraints for Use with Ec and Bi-State LC Smart Windows As previously noted herein, Angle-Diversity and Multi-Spectral sensing can be used advantageously with Smart Windows, but EC and bi-state LC Smart Window technologies impose unique constraints in the context of closed-loop DDC:

Smart Windows based on EC technology have two issues in the context of potential use in system 20A instead of blind 21A. First, response time of current EC technology appears too long for closed-loop DDC without some form of predictive control. Second, EC windows modulate admitted daylight by varying in tint, which will typically result in excessive Multi-Spectral shading sensitivity with the sub-sensor components previously specified for sensor 22A. Although not yet tested, it is believed that the shading sensitivity with an EC window could be mitigated by optimizing the spectral response of the sub-sensors as previously discussed in the section entitled "Spectral Response of Sub-Sensors", i.e. by replacing photodiodes 101 and 102 with spectrally-selective devices, e.g. LEDs. This will substantially reduce the LAS gain, but should still result in better glare-sensing performance in the presence of low-angle sunlight than conventional daylight sensors. This modification will also increase the sampling time, but this will not be an issue due to the relatively long time-constant of EC windows. If the shading sensitivity is still excessive, sensor 22A could be modified to remove Multi-Spectral sensing, e.g. by removing photodiodes 101 and 102 and/or eliminating the operating steps associated with Multi-Spectral sensing. This would eliminate the shading sensitivity while still preserving the benefits of Angle-Diversity sensing.

Emerging LC Smart Window technology is capable of providing continuously adjustable control of window opacity. However, traditional LC Smart Window technology is bi-state in nature: it does not offer continuous control and cannot modulate the total flux of admitted daylight, but instead only toggles between transparent and translucent states, e.g. to provide switchable privacy control. Such Smart Windows cannot be used for conventional closed-loop DDC, but they may be useful in helping to block glare from sunlight. It is believed that this could be achieved via the following modifications:

Because LC windows change state nearly instantaneously, steps 131 through 136 of FIG. 28 are unnecessary and would be deleted, and in the flowchart of FIG. 27, steps 129 and 130 would be followed immediately by step 121.

Consistent with conventional practice in the art of discontinuous control systems, hysteresis would be added to decision step 125 to prevent oscillation.

Steps 129 and 130 would be modified to cause the LC window to be set to the transparent and translucent states, respectively.

Physical Integration of Sensor and Motor Functionality in System 20A

Referring to FIGS. 22 and 24, the sensor and motor functionality of system 20A is separated into two physical assemblies, i.e. sensor 22A on one hand and the motor within motorized blind 21A on the other hand. This configuration is advantageous for automating an off-the-shelf motorized blind and provides excellent aesthetics by concealing the motor within the headrail of blind 21A.

However, for applications requiring maximum cost-effectiveness, it is advantageous to integrate sensor 22A with a motor assembly that can be retrofitted externally (i.e. outside the headrail) to ordinary non-motorized blinds. Such a motor assembly is disclosed, for example, in U.S. Pat. No. 5,760,558. Practitioners in the art will appreciate that sensor 22A could be readily integrated into such an assembly, and would provide a highly cost-effective means of adding DDC capability to ordinary blinds.

Alternative Location and Orientation of Sensor 22A

Referring again to FIG. 24, instead of being attached to blind 21A, sensor 22A can also be located and oriented as follows:

It can be mounted on a side wall adjacent to the wall hosting blind 21A, so that its FOV points generally along the X-axis.

In can be mounted on a wall opposite blind 21A, so that its FOV points toward blind 21A (i.e. in the −Y direction). However, in this case, slat component 35 (shown in FIG. 4) can reach sensor 22A, potentially causing the tilt-curve mismatch effect previously shown in FIG. 6. The slat component can be blocked by further constraining the FOVs of photodiodes 91 and 92 so that they cannot "see" blind 21A. The specific FOV constraints needed to do this will depend on the room dimensions and the Z-axis (vertical) positioning of sensor 22A. In a typical private office in which sensor 22A is mounted at the top of a wall facing blind 21A, and referring to the angle convention of FIG. 2C, the slat component can be blocked if the −20 dB elevation FOV of photodiode 91 is constrained to extend from about −150 degrees to about −110 degrees, and the −20 dB elevation FOV of photodiode 92 is constrained to extend from about +170 degrees and about +110 degrees. Referring to FIG. 22, this can be done by dividing aperture 111 of baffle 110 into two vertically-stacked apertures separated by a horizontal strip that further constrains the elevation FOVs. Of course, this will not be necessary if sensor 22A is not being used with a venetian blind.

Simpler Configuration/Operation of System 20A

The combination of optimized FOV, Angle-Diversity sensing, and Multi-Spectral sensing implemented in the preferred embodiment provides excellent performance in a relatively simple and inexpensive configuration. However, in some applications, it may not be necessary to combine all three innovations to achieve acceptable performance.

For example, referring again to FIG. 4, in room that is relatively small (so that wall 27 is relatively close to window 25), Multi-Spectral sensing may not be necessary ill order to obtain adequate sensitivity to glare from low-angle sunlight. The same is true for windows which do not receive sunlight (e.g. windows facing due south or due north, or those that are shielded from low-angle sunlight by buildings or foliage). In this case, photodiodes 101 and 102 could be deleted, with the operating steps of FIGS. 27 and 28 modified to eliminate references to photodiodes 101 and 102 and to calculate (and refer to) daylight signal $d_{AD}$ instead of glare signal g.

As another example, FOV optimization and Angle-Diversity sensing may not be necessary (although they would still be advantageous) for use with shading devices other than venetian blinds. Referring to FIG. 22, if FOV optimization and Angle-Diversity sensing are not needed, then baffle 110 and photodiode 92 could be eliminated, and the photocurrent in photodiode 91, rather than a $d_{AD}$ signal obtained from photodiodes 91 and 92, could be used in the glare-signal calculations of steps 123 and 132.

Advantages

Sensor 22A provides an output signal which is more consistent with subjective perceptions of glare than are the outputs of conventional daylight sensors, and in particular is more sensitive to glare-inducing conditions caused by low-angle sunlight. As a result, sensor 22A can be used to implement a DDC system (such as system 20A) that is significantly more effective at controlling glare—while maximizing useful natural illumination—than conventional DDC systems. At the same time, sensor 22A retains the key advantages of the sensor disclosed in U.S. Pat. No. 6,084,231:

- Its output signal is substantially unaffected by changes in the on/off state or dimming level of artificial lighting systems. This enables it to be used in daylight-harvesting applications without need for any coordination with (or interfaces to) the lighting system, eliminating interoperability issues and simplifying distribution.
- It can be co-located or integrated with the other DDC system components, reducing hardware and installation costs.
- While it includes four photodiodes rather than a single photodiode, the photodiodes are so inexpensive that the increase in overall cost is negligible.
- It does not require a labor-intensive commissioning process.

Alternative Embodiments

The following paragraphs describe alternative embodiments of the subject daylight sensor that could prove advantageous in certain applications.

FIGS. 29-32: Multi-Spectral Sensor for Discontinuous Open-Loop DDC (Alternative Embodiment 1)

As stated previously, a Multi-Spectral sensor as disclosed herein can be used as the sole sensor in an open-loop discontinuous DDC system. Unlike a continuous DDC system (also referred to as a proportional DDC system), a discontinuous DDC system toggles the window shading between two discrete states (e.g. open and closed). In some applications, such a system could be more cost-effective than one providing closed-loop DDC.

Figure 29:
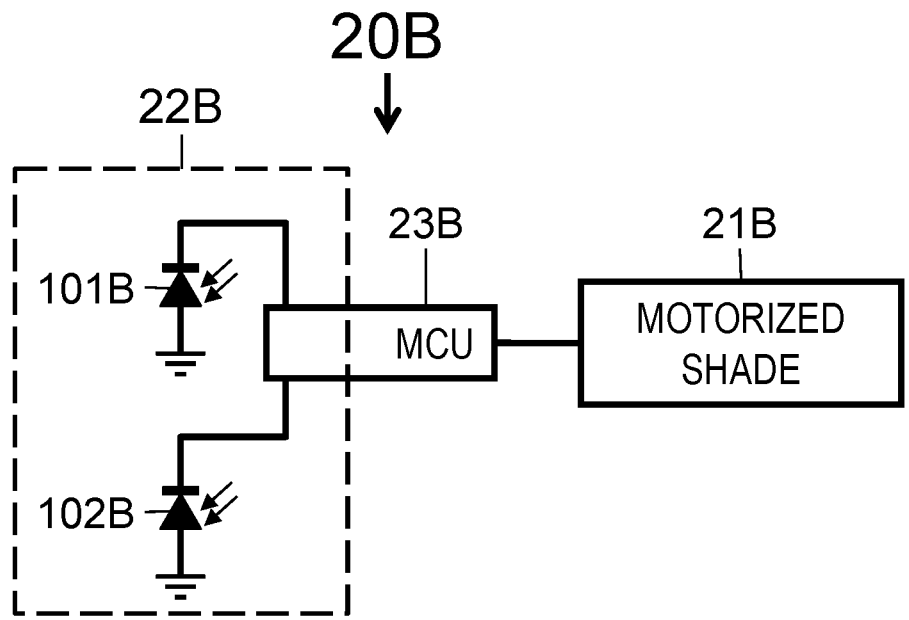
FIG. 29 is a simplified electronic schematic/block diagram of a discontinuous open-loop DDC system 20B using a Multi-Spectral sensor 22B according to the subject invention (alternative embodiment 1).

FIG. 29: Simplified Electronic Schematic/Block Diagram

FIG. 29 shows a simplified electronic schematic/block diagram of such a discontinuous open-loop DDC system, system 20B, which includes a Multi-Spectral sensor 22B. System 20B also includes a Microcontroller Unit (MCU) 23B and motorized shade 21B. MCU 23B provides some of the functionality of sensor 22B, but also performs other DDC functions such as controlling shade 21B; thus MCU 23B is shared between sensor 22B and the rest of system 20B.

Photodiodes 101B and 102B

In addition to shared MCU 23B, sensor 22B also includes a sunlight photodiode 101B and a reference photodiode 102B. Sunlight photodiode 101B is a silicon NIR photodiode having a −3 dB spectral response extending from about 790 nm to about 1030 nm (Osram part number SFH 2400 FA). Reference photodiode 102B is a silicon ambient-light-sensing photodiode having a −3 dB spectral response extending from about 430 nm to about 610 nm (Vishay part number TEMD6200FX01). Photodiodes 101 and 102 have unconstrained −3 dB FOVs of about 120 degrees.

MCU 23B

MCU 23B is a microcontroller of the Atmel megaAVR family (or a similar device) with an onboard timer and multiple discrete I/O pins, each of which can be defined as either an input or an output under program control. The cathode of each of photodiodes 101 and 102 is connected to a separate discrete I/O pin of MCU 23B, while the anodes are grounded. MCU 23B implements conventional program steps to infer the photocurrent in each diode using the well-known capacitance-discharge-time method, as previously described in connection with system 20A.

Motorized Shade 21B

Motorized shade 21B is a conventional motorized shade which includes a roller shade and a motor and associated circuitry to position the shade to an open setting or a closed setting as a function of control signals from MCU 23B. Many such motorized shades are available commercially, and many approaches for meeting these requirements are known in the art. For example, the motor can be a DC gear-motor or an AC gear-motor, and the setting of the shade (i.e. open, closed, or intermediate) can be tracked by an internal variable or a hardware counter in MCU 23B (based on the output of an incremental or absolute encoder coupled to the motor shaft) or by means of limit switches.

In some conventional motorized shades, the open and closed settings are easily adjustable by the end-user, while in other shades (e.g. those incorporating limit switches) they typically adjusted during installation. For purposes of this disclosure, the closed setting is the setting which blocks as much daylight as possible, while the open setting is any other user-specified setting (i.e. one which admits more daylight than the closed setting).

Conventional Elements not Shown in FIG. 29

System 20B also includes conventional elements such as a power source (e.g. a primary battery, a secondary battery in combination with a photo-voltaic cell, a "wall-wart" power supply, etc.), bypass capacitors, a ceramic resonator, an H-bridge motor-control chip, an RF transceiver module or a keypad to implement a user interface, etc. However, because the use of such elements in a device such as system 20B is well-established in the art, and because such elements are incidental to the subject invention, they are omitted from FIG. 29 for the sake of clarity.

Figure 30:
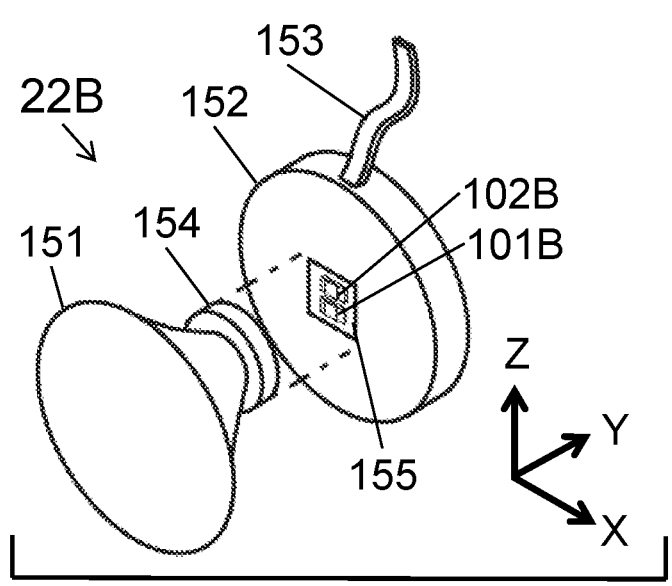
FIG. 30 is a perspective view of Multi-Spectral sensor 22B (alternative embodiment 1).

FIG. 30: Perspective View of Sensor 22B

FIG. 30 shows a perspective (top-rear) view of sensor 22B, along with a coordinate reference frame to indicate the installed orientation relative to the room coordinate system of FIG. 2B. Photodiodes 101B and 102B and MCU 23B (not shown) are surface-mounted to a PCB (not shown) which is enclosed within a housing 152 to which a suction cup 151 is attached. Suction cup 151 has a base 154 made of PET plastic (not shown) which is substantially transparent to visible and NIR wavelengths. The transparent base of suction cup 151 lines-up with a rectangular aperture 155 in housing 152 located over photodiodes 101B and 102B.

Photodiodes 101B and 102B are recessed within housing 152, so that aperture 155 constrains the elevation FOV of reference photodiode 102B in the positive-Z direction (i.e. so that its constrained FOV points outward and downward) and constrains the elevation FOV of sunlight photodiode 101B in the negative-Z direction (so that its constrained FOV points outward and upward).

Specifically, aperture 155 is sized and positioned relative to photodiodes 101B and 102B to give sunlight photodiode 101B a constrained −20 dB elevation FOV that extends from about 180 degrees (i.e. horizontal) to about 135 degrees (i.e. 45 degrees above horizontal), and to give photodiode 102B a constrained −20 dB elevation FOV that extends from about 180 degrees to about −135 degrees (i.e. 45 degrees below horizontal), per the angle convention of FIG. 2C. Aperture 155 is sized and positioned relative to photodiodes 101B and 102B to give both photodiodes a constrained −20 dB azimuth FOV that extends from about −135 degrees to +135 degrees per the angle convention of FIG. 2C.

Referring again to FIG. 4 as well as FIG. 30, this results in reference photodiode 102B having a constrained elevation FOV that makes it more sensitive to ground component 31 than to sky component 29, and sunlight photodiode 101B having a constrained elevation FOV that makes it more sensitive to sky component 29 than to ground component 31. Thus, the combination of photodiodes 101B and 102B enable Multi-Spectral sensing with Angle-Diversity, as previously described herein.

A cable 153 connects the PCB (not shown) to the other components of system 20B referenced in FIG. 29.

Figure 31:
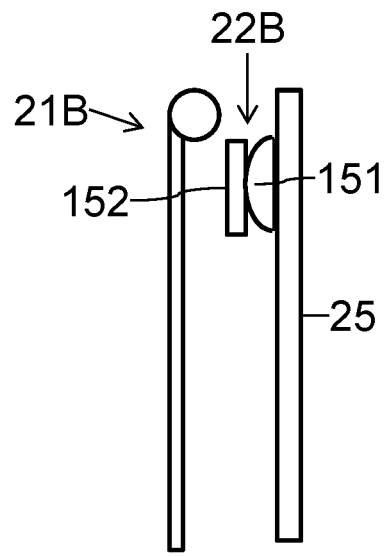
FIG. 31 is a diagram showing the installed location and orientation of Multi-Spectral sensor 22B (alternative embodiment 1).

FIG. 31: Installation of Sensor 22B

As shown in FIG. 31, sensor 22B is located between shade 21B and window 25, with suction cup 151 affixed to window 25 so that daylight can pass through window 25 and suction cup 151 to reach photodiodes 101B and 102B (not shown in FIG. 31), while the photodiodes are shielded from artificial light on the inward-facing side of window 25.

Figure 32:
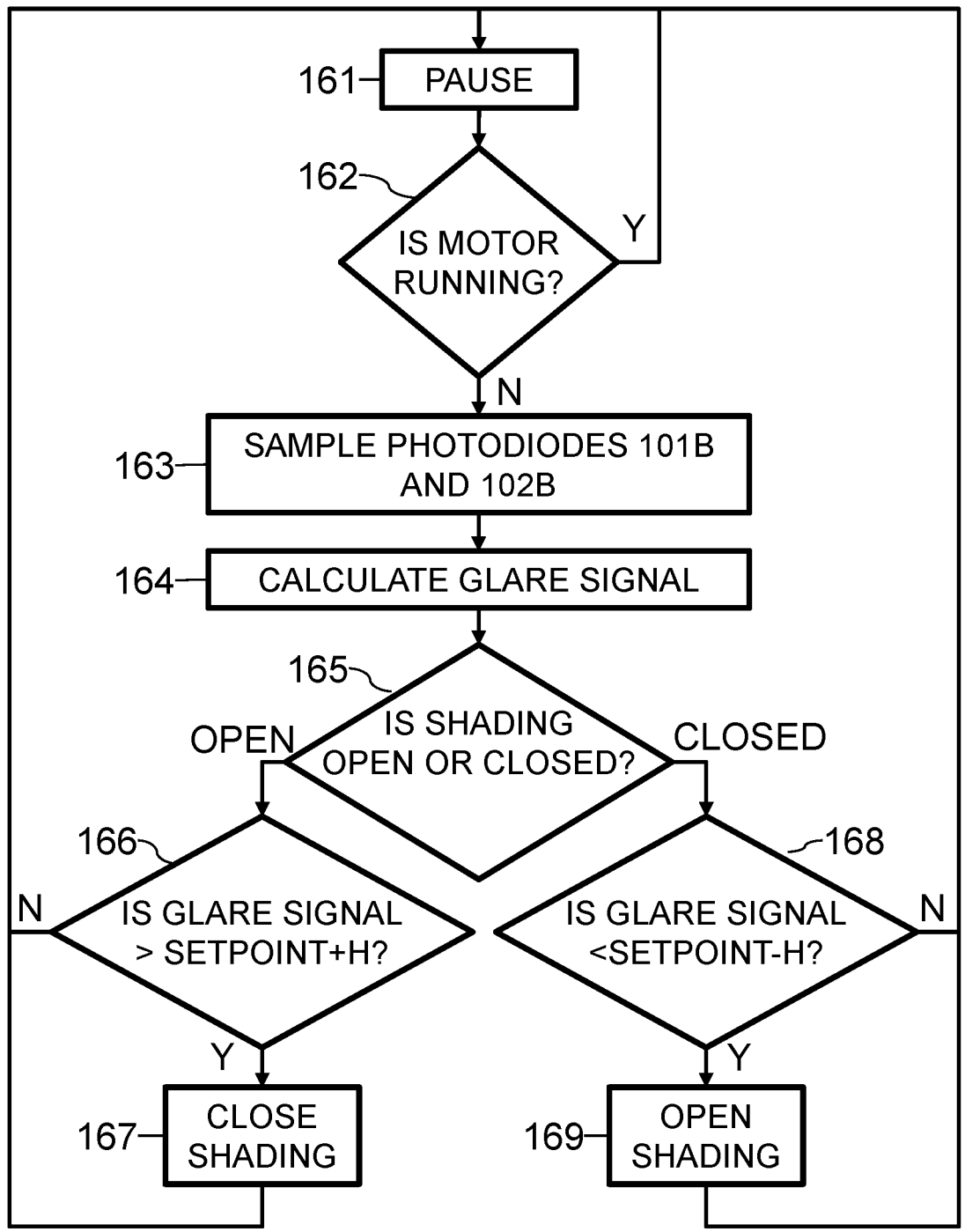
FIG. 32 is a flowchart of the operating steps of open-loop DDC system 20B (alternative embodiment 1).

FIG. 32: Operating Steps for System 20B

FIG. 32 shows a flowchart of the operating steps for system 20B.

Steps 161-163

In a pause step 161, MCU 23B waits for a sampling interval, e.g. 1 second. Then, in a decision step 162, program operation branches depending on the operating state of the motor: if the motor is running (i.e. the shade is being adjusted), then pause step 161 is repeated.

Otherwise, if the motor is not running, then in a step 163, MCU 23B samples the photocurrents in each of photodiodes 101B and 102B using the capacitance-discharge-time method described previously herein.

Calculation Step 164: Calculating the Glare Signal

In a step 164, MCU 23B uses the relative photocurrents obtained in step 163 to calculate the value of a glare signal in the manner previously described in the paragraph entitled "Using the Reference and Sunlight Sub-Sensors to Derive a Glare Signal":

$$g = s^B/r, \text{ where}$$

g is the glare signal,
s is the relative photocurrent in sunlight photodiode 101B,
r is the relative photocurrent in reference photodiode 102B, and
B is an empirically-derived parameter.

In developmental testing to date, good results have been obtained with B=2. However, B could be further optimized as previously described herein.

Steps 165-169

Next, program operation branches in a step 165 depending on the status of the shade:

If the shade is open, then a decision step 166 is performed in which the value of the glare signal g obtained in step 164 is compared to a sum of a setpoint and a hysteresis value H. If g is greater than the sum, then in a step 167, MCU 23B commands shade 21B to close, after which program operation loops back to step 161.

Otherwise, if the shade is closed, then a decision step 168 is performed in which the value of the glare signal g obtained in step 164 is compared to the difference between the setpoint and the hysteresis value H. If g is less than the difference, then in a step 169, MCU 23B commands shade 21B to open, after which program operation loops back to step 161.

In a typical embodiment of system 20B, the value of the setpoint is user-adjustable, while the value of hysteresis H may or may not be user-adjustable (testing to date suggests that the hysteresis need not be optimized for each installation of system 20).

Potential Modifications

Use of Multi-Spectral Sensing without Angle-Diversity

Sensor 22B can be modified to use Multi-Spectral sensing without Angle-Diversity by mounting photodiodes 101B and 102B side-by-side, as previously shown for photodiodes 101 and 102 in FIG. 23. If this is done, then referring again to FIG. 30, it will typically be advantageous to relocate photodiodes 101 and 102 downward in the Z-axis relative to aperture 155 so that their elevation FOVs are constrained to block ground-reflected daylight, in order to mitigate the previously-discussed reduction in LAS signal gain that can occur under certain conditions. A constrained elevation FOV that extends from 180 degrees (horizontal) to 135 degrees (45 degrees above horizontal), per the angle convention of FIG. 2C, is suitable for this purpose.

Alternative Type and Spectral Response of Sub-Sensors

In view of the general discussion of Multi-Spectral sensing provided herein, practitioners will recognize that other types of photo-sensors (or photo-sensors with different spectral responses than those previously specified) could be used instead of photodiodes 101B and 102B. For example:

Photodiode 101B could be replaced with a green LED and photodiode 102B could be replaced with an NUV LED.

Photodiode 102B could be replaced with an NIR LED having a spectral response peak around 800 nm.

Use with Alternative Shading Devices

While system 20B uses a motorized shade, practitioners in the art will recognize that many other type of electronically-actuated shading device could be used instead of shade 21B. These include motorized blinds and curtains, as well as Smart Window panels (which can be retrofitted, like traditional window coverings, to ordinary windows).

Only two changes to system 20B would potentially be needed to accommodate a different type of shading device:

If necessary, the conventional interface circuitry used between MCU 20B and motorized shade 21B would have to be changed to whatever is appropriate for the shading device in question.

If necessary, instead of referring to the extension of a roller shade, the open and closed settings would have to be redefined to refer to whatever variable is appropriate for the shading device in question, e.g. slat tilt setting for a venetian blind or opacity for a Smart Window panel.

Use with Smart Window Panels

In addition to Smart Window glazing units, Smart Window panels are known in the art which can be retrofitted, like traditional window coverings, to ordinary windows. Referring again to FIG. 31, such a panel could be used instead of shade 21B with the following modifications to system 20B:

Deletion of step 162 of FIG. 32.

Modifications to steps 165, 167, and 169 to refer to the minimum opacity state of the window instead of the open setting of shade 21B, and to the maximum opacity state (or, in the case of a traditional LC window, the translucent state) instead of the closed setting of shade 21B.

Control Based on LAS Signal Instead of Glare Signal

Instead of the glare signal calculated in step 164 of FIG. 32 and compared to the setpoint in steps 166 and 168, system 20B could instead calculate and compare an LAS signal obtained as previously described herein (e.g. as the ratio of the photocurrent in photodiode 101A to that in photodiode 101B). In this case, system 20B would block glare due only to low-angle sunlight, and not to high-angle sunlight or bright diffuse daylight.

Use for Continuous Open-Loop DDC

Continuous open-loop DDC approaches are known in the art in which a shading device is adjusted continuously over a range of settings. Such approaches require a model or transfer function that relates the subjectively perceived daylight level inside a shaded window to other known or measurable quantities, e.g. the sensed daylight level outside the shaded window. However, such models are notoriously inaccurate, particularly in their ability to predict glare on the basis of the output of a conventional exterior daylight sensor. This inaccuracy can be mitigated by using the output of a Multi-Spectral sensor such as sensor 22B, instead of a conventional exterior daylight sensor, as the basis for continuous open-loop control.

System 20B can be adapted to provide continuous open-loop control using the output of sensor 22B via the following modifications:

Shade 21B would be replaced with a Smart Window. This is because other types of shading device (and particularly venetian blinds) affect subjective perceptions of the daylight they admit (and particularly perceptions of glare) in ways that are much more difficult to model. With a Smart Window, the admitted daylight level can be modeled with reasonable accuracy as a simple function of the glare signal obtained from sensor 22B and the window's opacity. Conversely, the required opacity to maintain a desired daylight level can be determined as a simple function of the glare signal.

Accordingly, the operating steps of FIG. 32 would be replaced by the following sequence, performed periodically (e.g. every second):

Sampling of the photocurrents in photodiodes 101B and 102B.

Calculation of a glare signal using the sampled photocurrents as previously described.

Calculation of the required window opacity to yield a user-specified glare level given the glare signal, e.g. as: opacity=g/setpoint, where opacity is the required window opacity, equal to the reciprocal of the window's visible transmittance, g is the glare signal, and setpoint is a user-specified glare setpoint.

Adjusting of the window to an opacity setting that is as close as possible to the required opacity calculated in the previous step.

Use for Closed-Loop DDC

Per FIG. 31, sensor 22B is in an open-loop configuration because it does not sense daylight that has been admitted by shade 21B. However, if sensor 22B were instead located on the inward-facing side of a shading device (e.g. as in the configuration previously shown in FIG. 19B), then system 20B could be adapted to provide closed-loop DDC. However, in order to avoid issues due to shading sensitivity, such a configuration should be used with a Smart Window rather than a moveable window covering. Such an embodiment is described elsewhere herein.

Multi-Spectral Sensor Integrated into Photo-Voltaic (PV) Panel

As previously stated with reference to FIGS. 19A-19D, the location and orientation of Multi-Spectral sensor 70 as shown FIG. 19C provides better performance than the configuration of FIG. 19B (as used in sensor 22A), but has the disadvantage of requiring that the Multi-Spectral sensor and inward-facing daylight sensor be in separate physical assemblies. However, this disadvantage is moot if there is no inward-facing daylight sensor (e.g. in an open-loop system such as system 20B), or if a separate physical assembly is already provided for some other purpose. One example of such a separate assembly is the Photo-Voltaic (PV) panel used to power some automated shading devices.

For example, the mini-blind actuator disclosed in U.S. Pat. No. 5,760,558 is powered by a solar-charged secondary battery, with the PV panel located between the blind and the window. The PV cells and associated wiring are located on a flexible member (flex-circuit) that passes over the headrail and connects to the bulk of the system mounted on the front of the headrail. A Multi-Spectral sensor according to the subject invention could be readily integrated on to the same flex-circuit at negligible additional cost.

However, if a Multi-Spectral sensor is mounted in a separate physical assembly from the MCU, then the capacitance of the wiring between the MCU and the Multi-Spectral sub-sensors may preclude the use of the capacitance-discharge-time method of inferring photocurrents as used in the preferred embodiment (due to the longer time needed for a photocurrent to discharge the larger capacitance). This can be mitigated by using a second inexpensive MCU, co-located with the Multi-Spectral sub-sensors, to sample the photocurrents and calculate the LAS signal. Alternatively, traditional means of photocurrent sensing (e.g. trans-impedance amplifiers) can be used with the sunlight and reference sub-sensors.

Multi-Spectral Sensor as Remote Sensor

Alternatively, a Multi-Spectral sensor integrated into a PV panel can be used as a remote sensor that communicates wirelessly with one or more DDC systems. Such an embodiment is described in detail elsewhere herein.

Optimized Location of Sensor 22B in Plane of Window 25

As noted above, sensor 22B can be used to obtain either a glare signal or an LAS signal. If sensor 22B is used to obtain a glare signal, then it should be located so that it is not shaded from sunlight by objects such as a window frame or building overhang. Thus, while FIG. 31 shows sensor 22B located near the top of window 25, it may be preferable in some applications to locate it near the bottom, rather than the top, of window 25.

Simplified Implementation of Sensor 22B

Sensor 22B can be used in conjunction with a separate conventional outward-facing daylight sensor. In this case, either photodiode 101B or 102B of sensor 22B could be omitted, depending on the spectral response of the conventional daylight sensor, and its output used with that of the conventional daylight sensor to produce either an LAS signal or a glare signal as previously described.

For example, if the conventional outward-facing daylight sensor has a spectral response that mimics that of the human eye, then reference photodiode 102B of sensor 22B could be omitted. In this case, LAS and glare signals could be obtained using photodiode 101B as the sunlight sub-sensor and the output of the conventional daylight sensor as the reference sub-sensor.

As another example, if the conventional outward-facing daylight sensor is a silicon photodiode with a spectral response that spans both visible and NIR wavelengths, then sunlight photodiode 101B of sensor 22B could be omitted and photodiode 102B replaced with an NUV photodiode or LED. LAS and glare signals could be obtained using photodiode 102B as the reference sub-sensor and the output of the conventional daylight sensor as the sunlight sub-sensor.

Advantages

Multi-spectral sensor 22B provides many of the advantages of sensor 22A, but in an outward-facing configuration that is easy to attach to a host window:

It can be used to obtain signals which are more consistent with subjective perceptions of glare than are the outputs of conventional daylight sensors, and in particular are more sensitive to glare-inducing conditions caused by low-angle sunlight. As a result, sensor 22B can be used to implement a variety of DDC system that are significantly more effective at controlling glare—while maximizing useful natural illumination—than are conventional DDC systems.

Despite its effectiveness, it is relatively simple and inexpensive.

It does not require a labor-intensive commissioning process.

Further, Multi-Spectral sensor 22B eliminates the issue of shading sensitivity, and therefore does not require the shading-sensitivity-mitigation steps discussed in reference to sensor 22A.

As a result, sensor 22B can be used to implement a DDC system that is significantly more cost-effective at controlling glare—while maximizing useful natural illumination—than are conventional DDC systems.

Ceiling-Mounted Integrated Daylight/WPI Sensor Using Angle-Diversity and Multi-Spectral Sensing (Alternative Embodiment 2)

As previously stated in reference to FIGS. 4, 7, and 12, ground component 31 can deleteriously affect the operation of a daylight sensor used for closed-loop DDC, but its effects can be mitigated by appropriate processing of the outputs of two photosensors, one of which is influenced more by sky component 29 than by ground component 31, and the other of which is influenced more by ground component 31 than by sky component 29. The embodiment shown in FIG. 12, which senses ceiling component 32 as a proxy for ground component 31, is an advantageous way to achieve this with an inward-facing sensor mounted near the top of a window.

However, the above-stated requirements for Angle-Diversity sensing can be met with other sensor locations and orientations, which may be advantageous in some applications. For example, in an integrated shading-lighting system capable of both DDC and daylight harvesting, it may be advantageous to use a single ceiling-mounted sensor to sense both the daylight (to enable closed-loop DDC) and the WPI (for closed-loop daylight-harvesting). The innovations disclosed herein can be advantageously applied to such a ceiling-mounted sensor.

Such an embodiment requires different FOVs for the sub-sensors than is the case with an inward-facing sensor located near the window, such as the configuration of FIG. 12. However, the Angle-Diversity sensing principles are the same: one sub-sensor is influenced more by sky component 29 than by ground component 31, while the other is influenced more by ground component 31 than by sky component 29.

Figure 33:
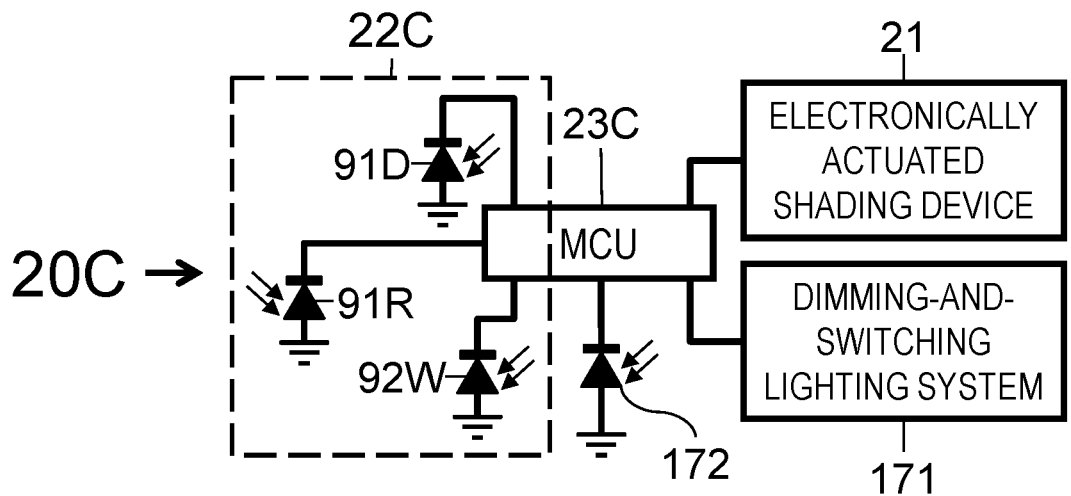
FIG. 33 is a simplified electronic schematic/block diagram of an integrated system 20C capable of both daylight-harvesting and DDC, and which includes an integrated daylight/WPI sensor 22C according to the subject invention (alternative embodiment 2).

FIG. 33: Simplified Electronic Schematic/Block Diagram

FIG. 33 shows a simplified electronic schematic/block diagram of an integrated system 20C capable of both daylight-harvesting and DDC, and which includes an integrated daylight/WPI sensor 22C according to the subject invention. System 20C also includes a Microcontroller Unit (MCU) 23C, electronically-actuated shading device 21 (as previously described in reference to FIG. 1), and a conventional dimming-and-switching lighting system 171.

Photodiodes 91D, 92W, and 172 and LED 91R

In addition to shared MCU 23C, sensor 22C also includes a desk photodiode 91D, a window photodiode 92W, a WPI photodiode 172, and a reference LED 91R. Desk photodiode 91D and window photodiode 92W are used to implement Angle-Diversity sensing as previously described herein, desk photodiode 91D and reference LED 91R are used to implement Multi-Spectral Sensing as previously described herein, and WPI photodiode 172 is used to sense WPI in a conventional manner.

Photodiodes 91D and 92W are silicon NIR photodiodes having a specified −3 dB spectral response extending from about 790 nm to about 1030 nm (Osram Opto-Semiconductors part number SFH 2400 FA). Reference LED 91R is an NIR LED having a spectral response peak at about 800 nm and negligible responsivity to wavelengths shorter than about 750 nm; good results in developmental testing have been obtained with an Everlight Electronics Ltd. part number SIR19-21C/TR8 (which has a specified emission peak at 875 nm).

Thus, the spectral responses of photodiode 91D and LED 91R are consistent with the guidelines previously given herein for Multi-Spectral Sensing, with photodiode 91D serving as the sunlight sub-sensor and LED 91R serving as the reference sub-sensor.

WPI photodiode 172 is a silicon ambient-light-sensing photodiode having a −3 dB spectral response extending from about 430 nm to 610 nm (Vishay part number TEMD6200FX01).

Photodiodes 91D, 92W, and 172 and LED 91R have unconstrained −3 dB FOV widths of about 120-140 degrees.

MCU 23C

MCU 23C provides some of the functionality of sensor 22C, but also performs other functions such as controlling shading device 21 and lighting system 171; thus MCU 23C is shared between sensor 22C and the rest of system 20C.

MCU 23C is a microcontroller of the Atmel megaAVR family (or a similar device) with an onboard timer and multiple discrete I/O pins, each of which can be defined as either an input or an output under program control. The cathode of each of photodiodes 91D, 92W and 172 and LED 91R is connected to a separate discrete I/O pin of MCU 23C, while the anodes are grounded. MCU 23C implements conventional program steps to infer the photocurrent in each diode using the well-known capacitance-discharge-time method, as previously described in connection with system 20A.

Lighting System 171

Lighting system 171 is a conventional lighting system that can be dimmed and switched on and off in response to control signals issued by MCU 23C. It can consist, for example, of an LED-based luminaire and dimming driver circuit. Such lighting systems are well-known in the art and commercially available from several sources.

Conventional Elements Not Shown in FIG. 33

System 20C also includes conventional elements such as a power source (e.g. a connection to AC mains power), a voltage regulator, bypass capacitors, a ceramic resonator, an H-bridge motor-control chip, an RF transceiver module or a keypad to implement a user interface, etc. However, because the use of such elements in a device such as system 20C is well-established in the art, and because such elements are incidental to the subject invention, they are omitted from FIG. 33 for the sake of clarity.

Figure 34:
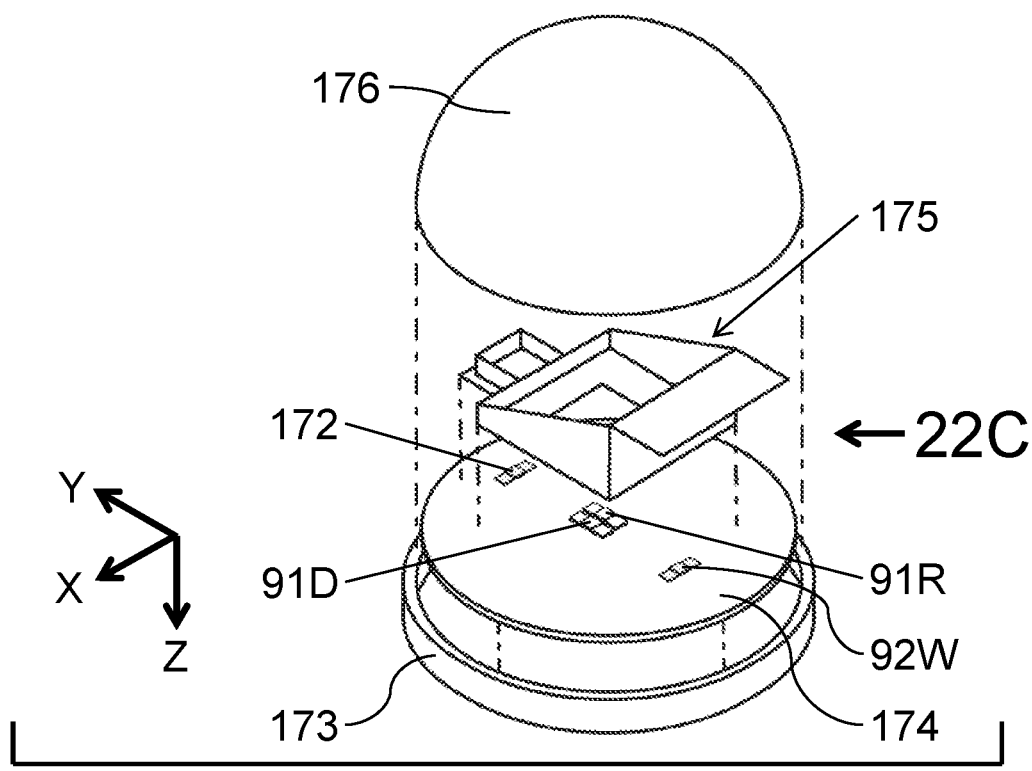
FIG. 34 is an exploded perspective view of integrated daylight/WPI sensor 22C (alternative embodiment 2).

FIG. 34: Exploded Perspective Side-Rear View of Sensor 22C

FIG. 34 shows a perspective side-rear view of sensor 22C (i.e. it depicts sensor 22C in an upside-down orientation), along with a coordinate reference frame to indicate the installed orientation relative to the room coordinate system of FIG. 2B. Photodiodes 91D, 92W, and 172 and LED 91R are surface-mounted to a PCB 174, to which MCU 23C (not shown) and the other aforementioned elements of system 20C are also mounted. PCB 174 is mounted to a housing 173 in a conventional manner, e.g. using stand-offs and screws (not shown).

A baffle 175 to constrain the FOVs of photodiodes 91D, 92W, 172, and LED 91R is mounted to PCB 174 in a conventional manner, e.g. using an adhesive. Baffle 175 is made of a material which is substantially opaque to (and has low reflectivity at) visible and NIR wavelengths; in a prototype of sensor 22C, baffle 175 was 3D-printed from black Nylon 11 powder using Selective Laser Sintering (SLS). A cover 176 of PET plastic, which is substantially transparent to visible and NIR wavelengths, is attached to housing 173 in a conventional manner, e.g. by means of slots in cover 176 (not shown) that engage tabs in housing 173 (not shown).

Figure 35:
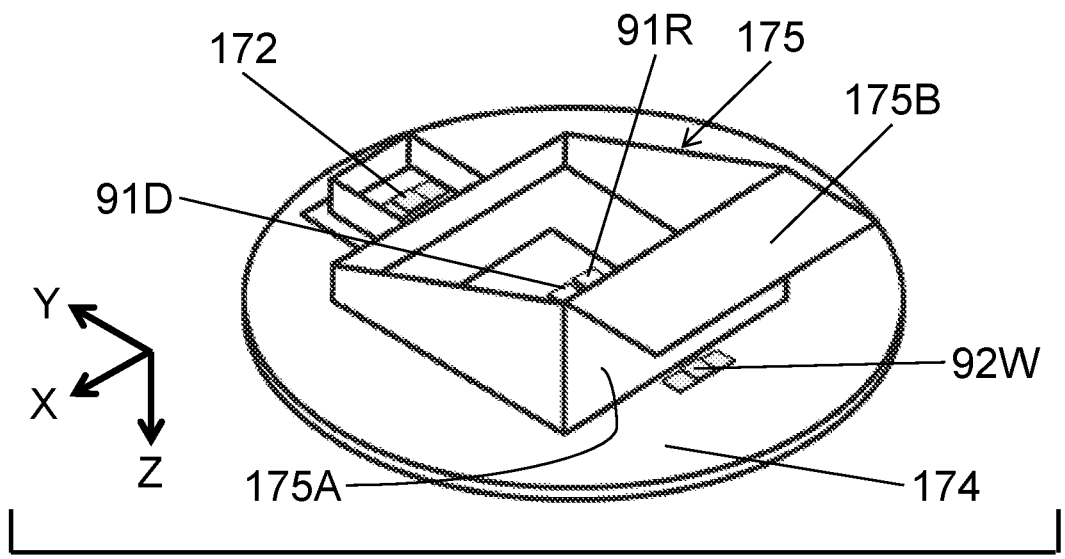
FIG. 35 is a perspective view of baffle 175 of integrated daylight/WPI sensor 22C (alternative embodiment 2).

FIG. 35: Baffle 175 Installed on PCB 174

FIG. 35 is a perspective view of baffle 175 installed on PCB 174 over photodiodes 91D, 92W, 172, and LED 91R, along with a coordinate reference frame to indicate the installed orientation relative to the room coordinate system of FIG. 2B. Baffle 175 is generally of the form of two attached open boxes: a small cuboid box over photodiode 172 and a larger truncated prismatic box over photodiode 91D and LED 91R (which are partially blocked from view in FIG. 35; refer to FIG. 34 to more clearly see photodiode 91D and LED 91R).

The cuboid box constrains the FOV of photodiode 172 symmetrically in both the X-Z and Y-Z (elevation) planes, with the constrained FOV centered in the negative-Z direction.

The truncated prismatic box constrains the FOVs of photodiode 91D and LED 91R in both the X-Z and Y-Z (elevation) planes. However, due to the larger size and shape of the truncated prismatic box relative to the cuboid box, the constrained FOVs of photodiode 91D and LED 91R are broader and point in a different direction than that of photodiode 172. Specifically, baffle 175 has a taller side 175A so that the elevation FOVs is constrained more in the negative-Y direction than in the positive-Y direction, shifting the constrained FOV in the positive-Y direction. Further, a white tape with high diffuse reflectance at visible and near-IR wavelengths is affixed to the inside surface of side 175A (not visible in FIG. 35); this tape reflects irradiance from the positive-Y direction toward photodiode 91D and LED 91R, making them more responsive to irradiance from the positive-Y direction.

The shape of the truncated prismatic box also causes the width of the constrained FOVs of photodiode 91D and LED 91R in the X-Z plane to vary with the elevation angle, i.e. so that the FOV width in the X-Z plane is wider in the positive-Y direction.

Tall side 175A of baffle 175 has an attached tab 175B which overhangs photodiode 92W, constraining its FOV in the elevation (Y-Z) plane. The dimensions of tab 175B are such that the lower edge of the constrained FOV of photodiode 92W (i.e. the edge nearest to the negative-Z half-axis) has the same elevation angle as the lower edge of the constrained FOVs of photodiode 91D and LED 91R.

Thus, baffle 175 constrains the FOVs of all four photosensors in the elevation (Y-Z) plane while also constraining the FOVs of photodiodes 91D and 172 and LED 91R in the X-Z plane, with the constrained FOVs determined by the size and shape of baffle 175 and the mounting locations of the four photosensors. The constrained FOVs are described in more detail subsequently.

Figure 36:
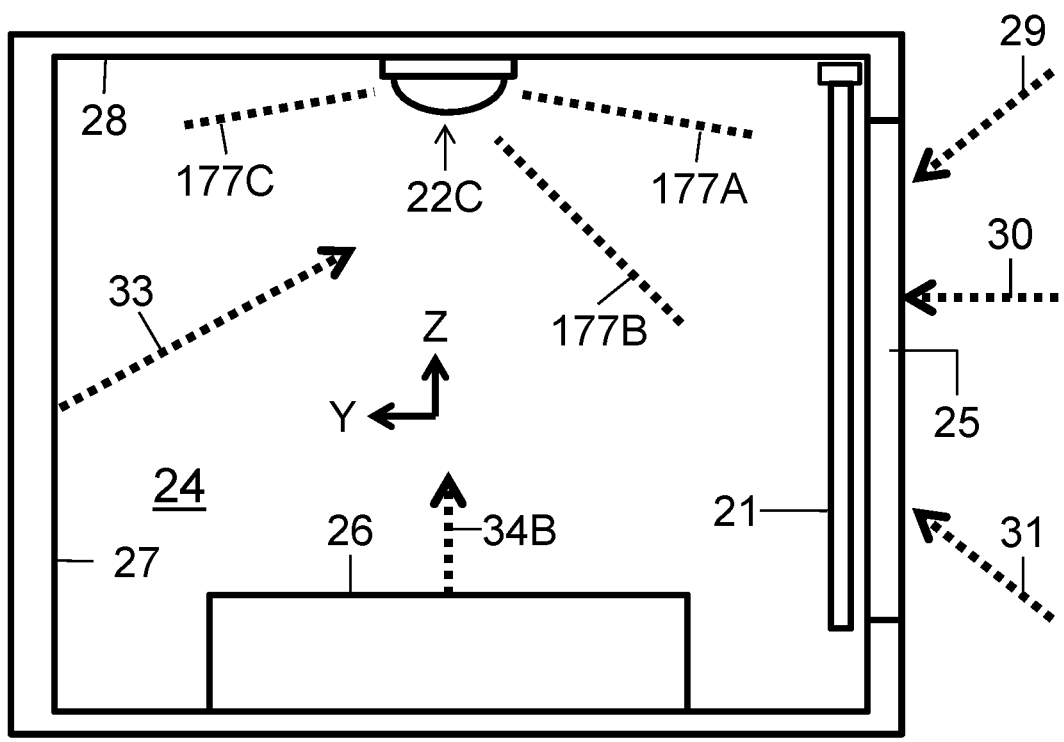
FIG. 36 is a diagram showing the installed location and orientation of integrated daylight/WPI sensor 22C (alternative embodiment 2).

FIG. 36: Installation of Sensor 22C

FIG. 36 depicts an installation of sensor 22C in room 24 of FIG. 4, except that blind 21A of FIG. 4 is replaced by electronically-actuated shading device 21 and that near-zone component 34 of FIG. 4 is replaced by a near-zone component 34B directed upward toward sensor 22C. Note that, in order to clearly depict the installation in a reasonably-sized diagram, FIG. 36 is drawn with different scales for the Y and Z axes, so that sensor 22C will be further along the Y-axis away from window 25 than indicated in the Figure. A typical location for sensor 22C along the Y-axis is 1.5 times the height of the top of window 25 inward (i.e. in the positive-Y direction) from window 25.

Sensor 22C is mounted on ceiling 28 so that the constrained FOV of WPI photodiode 172 (not shown in FIG. 36) points downward toward desk 26, the constrained FOV of window photodiode 92W points toward window 25, and the constrained FOVs of desk photodiode 91D and reference LED 91R point downward toward desk 25 and inward toward wall 27. Further, the constrained FOVs have the following characteristics:

The constrained FOV of WPI photodiode 172 is intended to cover the floor area illuminated by a luminaire of lighting system 171 (shown in FIG. 33 but not shown in FIG. 36), and extends over a 90-degree range in both the elevation (Y-Z) and (X-Z) planes, centered in the negative-Z direction. Thus, in the elevation (Y-Z) plane, the constrained FOV of WPI photodiode 172 extends from −135 degrees to −45 degrees per the angle convention of FIG. 2C.

The FOV of window photodiode 92W is constrained in the elevation (Y-Z) plane but not in the X-Z plane. In elevation, the FOV bounded by an upper FOV edge 177A and a lower FOV edge 177B so that the irradiance reaching photodiode 92W is mostly due to ground component 31 through window 25. The required elevation angles of edges 177A and 177B to achieve this will depend on installation-specific factors such as the Y-axis distance between sensor 22C and window 25. For typical installations, upper FOV edge 177A should have an elevation angle of about −170 degrees (i.e. 10 degrees below the negative-Y half-axis) and lower FOV edge 177B should have an elevation angle of about −135 degrees (i.e. 45 degrees below the negative-Y half-axis), but these values are not critical.

The FOVs of desk photodiode 91D and reference LED 91R are constrained in both the elevation (Y-Z) and X-Z planes:

In elevation, the FOV is constrained so that the irradiance reaching photodiode 91D and reference LED 91R is mostly due to far-zone component 33 and near-zone component 34B. In typical installations, this can be achieved via a constrained FOV with an upper edge 177C of about −10 degrees, and with the same lower edge 177B as for the constrained FOV of window photodiode 92W (i.e. with an elevation angle of about −135 degrees). As noted in reference to FIG. 35, diffuse reflection from a reflective tape attached to the inner surface of tall side 175A of baffle 175 increases the responsivity of desk photodiode 91D and reference LED 91R to irradiance from angles in the positive-Y direction. Thus, while the unconstrained FOVs of desk photodiode 91D and reference LED 91R point in the negative-Z direction, photodiode 91D and LED 91R still have significant responsivity in the direction of the point of origin of far-zone component 33.

In the X-Z plane, the width of the constrained FOVs of photodiode 91D and reference LED 91R varies with the elevation angle, increasing from about 60 degrees at lower edge 177B of the constrained FOV to about 160 degrees at upper edge 177C of the constrained FOV. The FOV width in the X-Z plane determines the FOV coverage in the width dimension (X-axis) of room 24. The FOV widths in the X-Z plane are such that, in a typical application, the coverage at lower edge 177B does not include the side walls of room 24, while the coverage at upper edge 177C does include the side walls of room 24.

Still referring to both FIGS. 35 and 36, with the FOVs stated above, the outputs of desk photodiode 91D and reference LED 91R are influenced more by sky component 29 (via reflection from desk 26 to near-zone component 34B) than by ground component 31. On the other hand, the output of window photodiode 92W is influenced more by ground component 31 than by near-zone component 34B (and hence sky component 29).

Hence, the constrained FOVs of desk photodiode 91D and window photodiode 92W meet the requirements for Angle-Diversity Sensing as previously described herein: desk photodiode 91D has an FOV that makes it more sensitive to sky component 29 than to ground component 31, while window photodiode 92W has an FOV that makes it more sensitive to ground component 31 than to sky component 29.

Finally, the elevation FOV of desk photodiode 91D, which is bounded by limits 177B and 177C, allows desk photodiode 91D to sense far-zone component 33 (and hence, by reflection, horizontal component 30), but substantially blocks ground component 31 (and would also block a slat component from shading device 21 if it were a venetian blind). Thus, the constrained FOV of desk photodiode 91D meets the optimized FOV requirements for daylight sensing previously described herein.

Special Considerations for use with Venetian Blinds

A potential disadvantage of sensor 22C relative to a daylight sensor facing away from a shading device (e.g. as in system 20A) is that, if shading device 21 is a motorized venetian blind, then slat component 35 (shown in FIG. 4) will necessarily reach window photodiode 92W. The irradiance due to slat component 35 at photodiode 92W will be lower than would be the case if sensor 22C were mounted closer to window 25. However, in the presence of sunlight, the slat component can still be strong enough to cause some of the tilt-curve mismatch effect shown in FIG. 6. The impact of this effect has not yet been assessed, and in any case occurs only with venetian blinds.

Operation of System 20C

Referring to FIG. 33, the operation of system 20C includes the following actions performed periodically by MCU 23C:

(a) inferring the relative photocurrents in photodiodes 91D, 92W, and 172 and LED 91R using the conventional capacitance-discharge-time method previously described herein;

(b) calculating a glare signal from the inferred photocurrents in photodiodes 91D and 92W and LED 91R;

(c) calculating a WPI signal from the inferred photocurrent in photodiode 172;

(d) actuating shading device 21 to attempt to maintain an approximately constant value of the glare signal; and (e) actuating lighting system 171 to attempt to maintain an approximately constant value of the WPI signal.

Thus, shading device 21 is actuated to attempt to maintain an approximately constant level of the glare signal, while lighting system 171 is actuated to "harvest" the daylight by dimming whenever possible while maintaining the desired level of total illumination.

Actions (c) and (e) listed above involve conventional steps which are well-known in the art. The capacitance-discharge-time technique of action (a) and shading adjustment steps of action (d) were previously described in the context of system 20A. Action (b) includes the following steps:

Calculating a daylight signal $d_{AD}$ as described previously herein using Angle-Diversity sensing, as follows:

$d_{AD} = (f^A)/c$, where $d_{AD}$ is the daylight signal obtained using Angle-Diversity sensing;

f is the relative photocurrent in desk photodiode 91D;

c is the relative photocurrent in window photodiode 92W; and

A is an empirically-derived parameter (a value of 2 has yielded good results in testing to date).

Obtaining signal $d_{AD}$ this way is consistent with Angle-Diversity sensing as previously described herein because desk photodiode 91D has an FOV that tends to make it more sensitive to near-zone component 34B (and hence, by reflection, to sky component 29) than to ground component 31, while window photodiode 92W has an FOV that that tends to make it more sensitive to ground component 31 than to near-zone component 34B (and hence, by reflection, to sky component 29).

Calculating an LAS signal as previously described herein, as follows:

$LAS = (s/r)$, where

LAS is a Low-Angle-Sunlight signal which is correlated with the risk of glare due to direct or reflected low-angle sunlight, s is the relative photocurrent in desk photodiode 91D and r is the relative photocurrent in reference LED 91R.

Obtaining the LAS signal in this way is consistent with Multi-Spectral sensing as previously described because the spectral responses of desk photodiode 91D and reference LED 91R are such that, when both are sensing sunlight, the former's output (i.e. photocurrent) is less affected by atmospheric attenuation of that sunlight than the latter's output.

Calculating a glare signal as previously described herein, as follows:

$g = d*(LAS^A)$, where g is the glare signal, $d_{AD}$ is the daylight signal derived from the photocurrents in desk photodiode 91D and window photodiode 92W, LAS is the low-angle sunlight signal derived from the photocurrents in desk photodiode 91D and reference LED 91R, and A is an empirically-derived parameter that determines the relative influence of the LAS signal (a value of 1.25 has worked well in developmental testing).

PotentiaL Modifications

With the information previously provided herein, practitioners in the art will be able readily modify sensor 22C to suit the requirements of a specific application. The potential modifications include those previously described herein for Angle-Diversity and Multi-Spectral sensing in general (e.g. alternative ways of processing the glare signal, alternative FOVs, alternative spectral responses, etc.) as well as those described for the Angle-Diversity and Multi-Spectral sensing aspects of sensor 22A (e.g. adding additional sensor functionality, use of other types of photosensors instead of photodiodes, etc.).

Additional modifications to sensor 22C are also possible while still retaining the subject innovations. Two such modifications are described below.

Physical Separation of Desk and Window Photodiodes

While desk photodiode 91D and window photodiode 92W of sensor 22C are co-located within the same physical assembly, they could be in separate physical assemblies. For example, desk photodiode 91D could be in a ceiling fixture and window photodiode 92W could be mounted near a window. In such a configuration, window photodiode 92W could be mounted in the same location, and with the same FOV as ceiling photodiode 92 of FIG. 22.

Simpler Configuration

As is the case with the previously-described sensor 22A, Angle-Diversity and Multi-Spectral sensing may not be simultaneously necessary for sensor 22C in some applications. For example, referring again to FIG. 36, in a room that is relatively small (so that wall 27 is relatively close to window 25), Multi-Spectral sensing may not be necessary in order to obtain adequate sensitivity to glare from low-angle sunlight. The same is true for windows which do not receive sunlight (e.g. windows facing due south or due north, or those that are shielded from low-angle sunlight by buildings or foliage). If Multi-Spectral sensing is not needed, sensor 22C could be readily modified to remove it by removing LED 91R and omitting the operating steps related to sampling its photocurrent and calculating the LAS and glare signals.

Advantages

Sensor 22C provides all of the previously-stated advantages of sensor 22A, except that it is not co-located with the shading device and therefore necessitates a wired or wireless link to the shading device. It also provides a unique advantage: in daylight-harvesting installations which include a ceiling-mounted WPI sensor, sensor 22C eliminates the need for a second sensor assembly by integrating all of the sensor functionality required for both daylight harvesting and DDC into a single physical package.

As a result, sensor 22C can be used to implement a DDC system that is significantly more cost-effective at controlling glare—while maximizing useful natural illumination—than are conventional DDC systems.

Conventional System Augmented with Innovative Sensors

As previously noted herein, there is a great degree of flexibility in how Angle-Diversity and Multi-Spectral sensing as disclosed herein can be implemented, particularly in the FOVs and spectral responses of the sub-sensors and how they are located and oriented. This flexibility makes it possible to cost-effectively augment conventional daylight-harvesting or integrated shading-lighting systems with the innovative sensing features disclosed herein.

Figure 37:
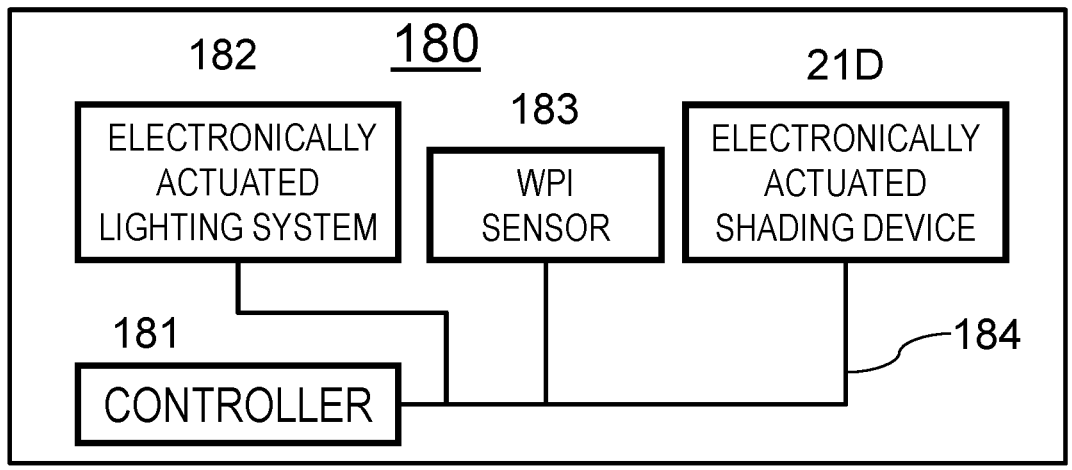
FIG. 37 is a block diagram of a conventional integrated system 180 capable of daylight-harvesting and (optionally) DDC.

FIG. 37: Conventional System

FIG. 37 shows a conventional integrated system 180 capable of daylight-harvesting and, optionally, DDC. It consists of a conventional controller 181, a conventional electronically-actuated lighting system 182, a conventional WPI sensor 183, and an optional electronically-actuated shading device 21D, with the elements interconnected by a network 184.

Controller 181

Controller 181 may be a building-control system that is shared among many instances of system 180, or it may be dedicated to a single instance of system 180. It may be a single physical device or it may be distributed across multiple physical devices (e.g. a central controller plus multiple remote controller nodes). Per the current trend in the art, controller 181 will typically include a relatively powerful embedded computer running control software that is programmed in a High-Order Language (HOL).

Lighting System 182

Lighting system 182 is a conventional system that efficiently provides artificial illumination whose brightness and on/off state can be controlled by a network message from controller 181, and consists generally of a dimming-and-switching controller/ballast and a luminaire that houses high-efficiency lamps, e.g. of the fluorescent or LED types. Lighting system 182 is also equipped with an in-luminaire sensor to monitor the actual lighting level (e.g. in terms of illuminance on the surface of a desk), or is instead calibrated so that the actual lighting level is a known function of the commanded brightness.

WPI Sensor 183

WPI sensor 183 is a conventional ceiling-mounted Work-Plane Illuminance sensor that senses the total illuminance (due to daylight as well as artificial illumination) on a surface, e.g. the top of a desk, and provides the illuminance information to controller 181 via a network message.

Optional Shading Device 21D

Optional electronically-actuated shading device 21D is equivalent to the previously described shading device 21, but includes a network interface to exchange messages with controller 181, so that controller 181 can control it and optionally determine its status via network messages.

Of the actual installed base of systems such as system 180, most do not have a shading device such as shading device 21D, and are therefore capable of only daylight harvesting (i.e. automatic closed-loop control of total illumination) and not DDC.

Network 184

Network 184 is a network implementing one or more physical layers and communications protocols such as BACnet, Zigbee, or WiFi, may be wired or wireless, and may use bus, star, ring, mesh or other topologies. It may consist of multiple sub-networks interconnected by gateways (e.g. BACnet to Ethernet). For the purposes of this disclosure, a wireless Zigbee mesh network is assumed.

The elements of system 180 are typically physically dispersed, e.g. controller 181 may be in a remote location, lighting system 182 may be mounted above a dropped ceiling, WPI sensor 183 may be surface-mounted to the ceiling, and optional shading device 21D is necessarily located at a window.

A variety of control protocols for systems such as system 180 are known in the art; one such protocol is similar to that previously described for system 20C: controller 181 adjusts shading device 21D (if present) to maintain a desired level of daylight (as inferred from the output of WPI sensor 183 and the known lighting level), and adjusts lighting system 182 to maintain a desired total level of illumination (as sensed by WPI sensor 183).

Figure 38:
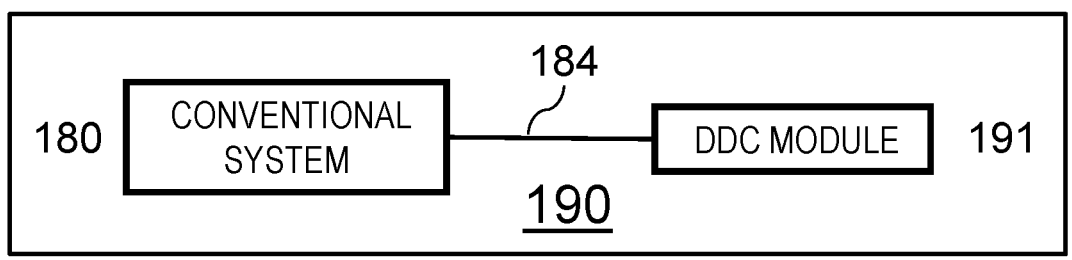
FIG. 38 is a block diagram of an augmented system 190 consisting of integrated system 180 augmented with DDC module 191 (alternative embodiment 3).

FIG. 38: Augmented System 190 (Alternative Embodiment 3)

One advantage of a system such as system 180 is that new devices can be readily added via the network, and control functionality can be readily modified by changing the program executed by controller 181. This facilitates augmentation of a system like system 180 with the innovative sensor functionality disclosed herein. FIG. 38 shows such an augmented system, system 190. It consists of system 180 and a DDC module 191. System 180 may or may not include shading device 21D, but the following discussion assumes that shading device 21D is not present.

DDC Module 191

DDC module 191 is identical to system 20A shown in FIGS. 21 through 26, with the following exceptions:

It includes a conventional network interface to connect to network 184. This could consist, for example, of an off-the-shelf Zigbee module connected to MCU 23A and mounted on PCB 112.

The program steps executed by MCU 23A are modified to enable controller 181 to control the sensing and shading functions autonomously performed by system 20A by means of network messages. Specifically, conventional program steps are included to enable controller 181 to poll MCU 23A to determine the photocurrents in photodiodes 91, 92, 101, and 102, and to adjust the setting of motorized blind 21A, via network messages.

Operation of Augmented System 190

System 190 uses photodiodes 91, 92, 101, and 102 of DDC module 191 to implement both Angle-Diversity and Multi-Spectral sensing by operating in the same way as system 20A (i.e. by executing the steps shown in FIGS. 25 and 26), except that the steps are not performed solely by MCU 23A. Instead, they performed either by controller 181 (in the case of steps that do not involve functionality provided by DDC module 191) or by MCU 23A in response to network messages from controller 181 (in the case of steps that do involve functionality provided by module 191). The output of WPI sensor 183 is used only to perform daylight harvesting in the conventional manner, i.e. controller 181 adjusts lighting system 182 to maintain an approximately constant output of WPI sensor 183.

This type of operation of augmented system 190 provides no additional functionality beyond the combination of previously-described system 20A and a stand-alone daylight-harvesting lighting system; the only functional difference is that some of the control functionality is performed by controller 181 instead of MCU 23A. However, this approach does have the advantage that the benefits of Angle-Diversity and Multi-Spectral sensing can be retrofitted to system 180 by simply installing module 191 and changing the program performed by controller 181.

Operation of Augmented System 190 when Shading Device 21D is Present

If conventional system 180 is already capable of DDC functionality (i.e. if it includes electronically-actuated shading device 21D), then motorized blind 21A need not be included in DDC module 191. Augmented system 190 would still operate in the same way as described above, except that shading device 21D would be actuated by controller 181 instead of blind 21A being actuated by MCU 23A.

Potential Modifications

With the information previously provided herein, practitioners in the art will be able readily modify system 190 to suit the requirements of a specific application. The potential modifications include those previously described herein for Angle-Diversity and Multi-Spectral sensing in general (e.g. alternative ways of processing the glare signal, alternative FOVs, alternative spectral responses, etc.) as well as those described for sensor 22A (e.g. adding additional sensor functionality, use of other types of photosensors instead of photodiodes, alternative sensor location and orientation, etc.).

Of course, many modifications to conventional system 180 are also possible according to conventional practice (e.g. use of different wireless topologies or protocols, use of a wired vice wireless network, different operating protocols, etc.) and are incidental to the subject daylight sensor.

Advantages

DDC Module 191 provides all of the advantages of sensor 22A of system 20A (shown in FIGS. 21 through 24), but enables those advantages to be easily added to a conventional integrated system that has daylight-harvesting (and optionally DDC) capabilities. Such an augmented system (such as system 190) is significantly more cost-effective at controlling glare—while maximizing useful natural illumination—than are conventional DDC systems.

Figure 39:
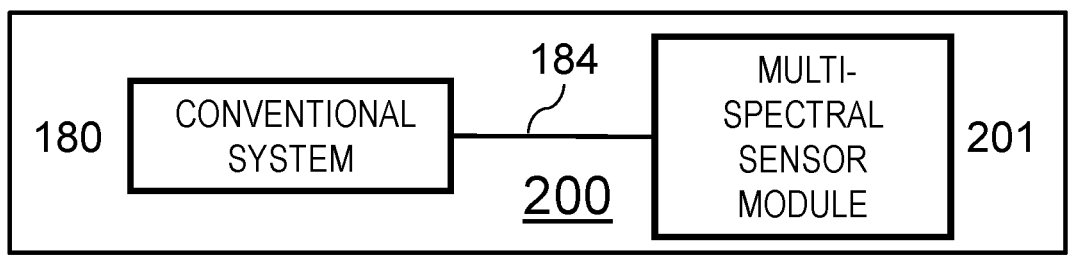
FIG. 39 is a block diagram of an augmented system 200 consisting of integrated system 180 augmented with a Multi-Spectral sensor module 201 (alternative embodiment 4).

FIG. 39: Augmented System 200 (Alternative Embodiment 4)

Another example of an augmented system is system 200 of FIG. 39, which consists of conventional system 180 to which Multi-Spectral sensor module 201 has been added. The following discussion assumes that system 180 includes shading device 21D.

FIG. 40: Perspective View of Multi-Spectral Sensor Module 201

Multi-spectral sensor module 201 is similar to the "Multi-Spectral sensor Integrated into Photo-Voltaic (PV) Panel" embodiment described previously herein. It consists of sensor 22B (also as previously described) with the following modifications:

It includes an off-the-shelf Zigbee module (not shown in any Figures) connected to MCU 23B to allow MCU 23B to transmit and receive messages on network 184.

Referring to FIG. 40, a larger housing 202 is used to accommodate a Photo-Voltaic (PV) panel 203 and the Zigbee module, along with the other previously described elements of sensor 22B located inside housing 152.

It includes a conventional energy-storage device (e.g. a super-capacitor), a conventional charging circuit to charge the energy-storage device using the output of the PV panel, and a conventional power conditioning circuit to power the other previously-described elements of sensor 22B with the energy stored in the energy-storage device. All of these conventional elements are housed in housing 202, and none are shown in the Figures.

It does not include cable 153 of sensor 22B.

The program steps executed by MCU 23B (shown in FIG. 32) are modified to enable controller 181 to determine the photocurrents in sunlight photodiode 101B and reference photodiode 102B by polling MCU 23B via messages on network 184.

As previously described in connection with sensor 22B, suction cup 151 includes a transparent base (not shown in FIG. 40) that allows daylight to reach photodiodes 101B and 102B (not shown in FIG. 40).

Because module 201 does not include (or provide power to) a shading device, its power requirements are modest, so that PV panel 203 can be relatively small, reducing its obtrusiveness and cost. For the same reasons, the energy storage device, charging circuit, and power conditioning circuit can be small and relatively inexpensive.

FIG. 41A: Installation of Module 201 Between Shading Device and Window

FIG. 41A depicts a typical installation of Multi-Spectral sensor module 201. Module 201 is located between shading device 21D and window 25, faces outward to sense daylight admitted by window 25, and is attached to the latter by means of suction cup 151.

FIG. 41B: Installation of Module 201 for Use with Smart Window

FIG. 41B shows an installation of Multi-Spectral sensor module 201 for use with a Smart Window) and oriented to sense daylight passing through shading device 21D (in this case s Smart Window).

Operation of Augmented System 200

As previously described herein, Multi-Spectral sensing can be advantageously used in both open-loop and closed-loop control protocols, and the same flexibility applies to system 200.

Discontinuous Open-Loop Control

Discontinuous open-loop control using system 200 is implemented in the same way as described previously for sensor 22B, except for the following changes in the operating steps shown in FIG. 32:

With the exception of step 163, the steps are performed by controller 181 instead of MCU 23B.

In step 163, MCU 23B samples the photocurrents in photodiodes 101B and 102B in response to network messages from controller 181, and sends the sampled photocurrent information to controller 181 via network messages.

In step 164, the glare signal is obtained solely from the photocurrents in photodiodes 101B and 102B. Alternatively, the glare signal can be calculated using a daylight signal from another sensor on network 184 in conjunction with an LAS signal obtained from photodiodes 101B and 102B (as previously described in the paragraph entitled "Using the LAS Signal with a Daylight Signal to Derive a Glare Signal").

Continuous Closed-Loop Control

Multi-spectral sensor module 201 can also be used to significantly improve the performance of system 180 if the latter is performing closed-loop control.

In this case, before augmentation with module 201, system 180 adjusts shading device 21D on the basis of a daylight signal that represents the level of daylight admitted by shading device 21D. As shown in FIG. 37 system 180 does not have a sensor that directly senses just the daylight component of ambient illumination; instead, such systems typically infer the ambient daylight level from the output of WPI sensor 183 by subtracting the level of artificial illumination produced by lighting system 182. The level of artificial illumination could be measured directly by a sensor mounted in a luminaire of lighting system 182, or else could be inferred from the commanded dimming level of lighting system 182. Alternatively, a sensor that directly senses just the daylight component of the ambient illumination (such as that disclosed in U.S. Pat. No. 6,084,231) could be included in system 180 to directly produce the daylight signal.

After augmentation with module 201, instead of adjusting shading device 21D on the basis of the daylight signal, controller 181 would instead adjust shading device 21D on the basis of a glare signal obtained as described previously herein ("Using the LAS Signal with a Conventional Daylight Signal to Derive a Glare Signal"). For example, the glare signal could be calculated as follows:

$$g = d_{WPI}(s/r)^A, \text{ where}$$

g is the glare signal, $d_{WPI}$ is the inferred daylight level obtained in a conventional manner, e.g. as $d_{WPI} = w - X*l$, where w is the output of WPI sensor 183 (representing the total illumination), l is the lighting level of lighting system 182, X is a parameter specific to lighting system 182 (e.g. as obtained via a post-installation commissioning process), s is the relative photocurrent in sunlight photodiode 101B, r is the relative photocurrent in reference photodiode 102B, and A is an empirically-derived parameter.

In developmental testing to date, good results have been obtained with A=1. However, A could be further optimized, as previously described herein.

Closed-Loop Control of Smart Windows

If shading device 21D is a Smart Window, then Multi-Spectral module 201 can enable system 200 to effectively perform closed-loop DDC without need for a daylight signal obtained from other means. This is because Smart Windows do not modulate the spatial distribution of admitted daylight, so there can be reasonably good correlation between the admitted daylight level and the output of an outward-facing daylight sensor. Conventional outward-facing daylight sensors have limited effectiveness in such an application due to inadequate sensitivity to glare from low-angle sunlight, but Multi-Spectral sensor module 201 does not suffer from this problem.

In such an application, shading device 21D of FIG. 37 is a Smart Window capable of modulating the total flux of admitted daylight in response to an electronic signal. Such Smart Windows include those based on ElectroChromic (EC) technology, Suspended-Particle Device technology, and Liquid Crystal (LC) technology:

EC windows have been commercially available for some time, but have two disadvantages in the context of closed-loop DDC: they can take several minutes to change between the maximum and minimum tint (opacity) states, and they modulate the SPD of the daylight they admit (which can affect the operation of a Multi-Spectral sensor).

SPD windows can change from maximum to minimum opacity virtually instantaneously and do not modulate the SPD of the admitted daylight. However, such windows do not appear to be commercially available at the time of this disclosure.

Unlike traditional bi-state or "privacy glass" LC windows (which merely toggle between transparent and translucent states), emerging LC window technology is capable of continuously variable opacity. Like traditional LC (and SPD) windows, this emerging LC technology can change from maximum to minimum opacity virtually instantaneously and does not modulate the SPD of the admitted daylight.

In principle, Multi-Spectral sensor module 201 can enable system 200 to perform closed-loop DDC with any of these Smart Window technologies. However, the type of Smart Window can affect the implementation in two ways:

The aggregate sampling time of photodiodes 101B and 102B must be much shorter than the response time of the window. In the case of SPD and LC windows, this can necessitate the use of conventional trans-impedance amplifiers and analog-to-digital conversion instead of the capacitance-discharge-time method of sampling the photodiode photocurrents. Alternatively or additionally, the response time of the Smart Window can be increased by low-pass filtering the signal that controls it, e.g. so that several seconds are required for it to change between maximum and minimum opacity.

The use of an EC window imposes constraints on the spectral responses of the sub-sensors of Multi-Spectral module 201. Specifically, photodiodes 101B and 102B must be replaced with LEDs or other spectrally selective devices, as described below.

The adjustable setting of a Smart Window is referred to herein as its opacity, which represents its relative ability to block daylight (wherein 0% opacity represents minimum blockage, i.e. maximum transmittance, and 100% opacity represents maximum blockage, i.e. minimum transmittance).

Figure 42:
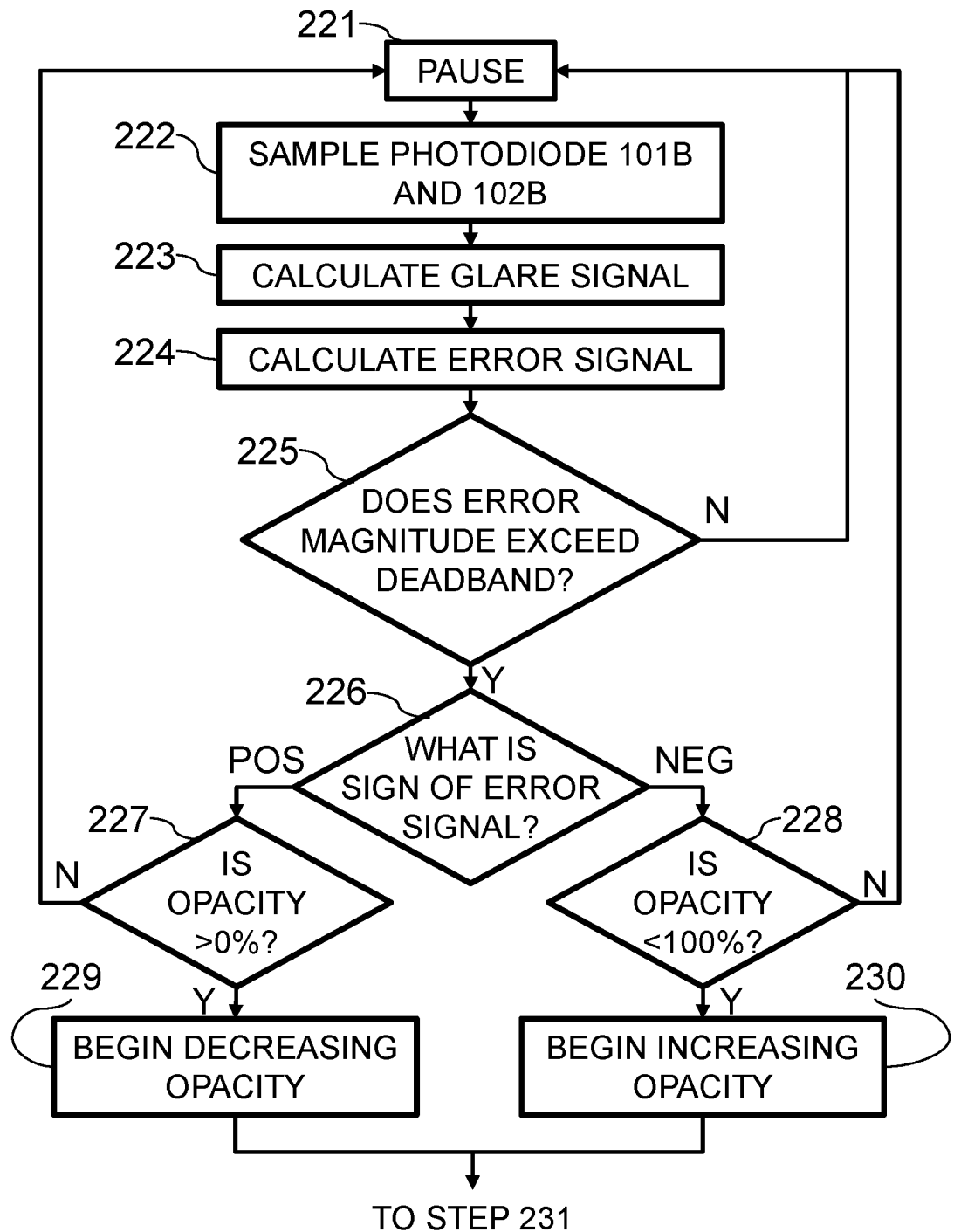
FIG. 42 is a flowchart of the operating steps performed by system 200 for closed-loop control of a Smart Window while the opacity of the window is not being adjusted (alternative embodiment 4).
Figure 43:
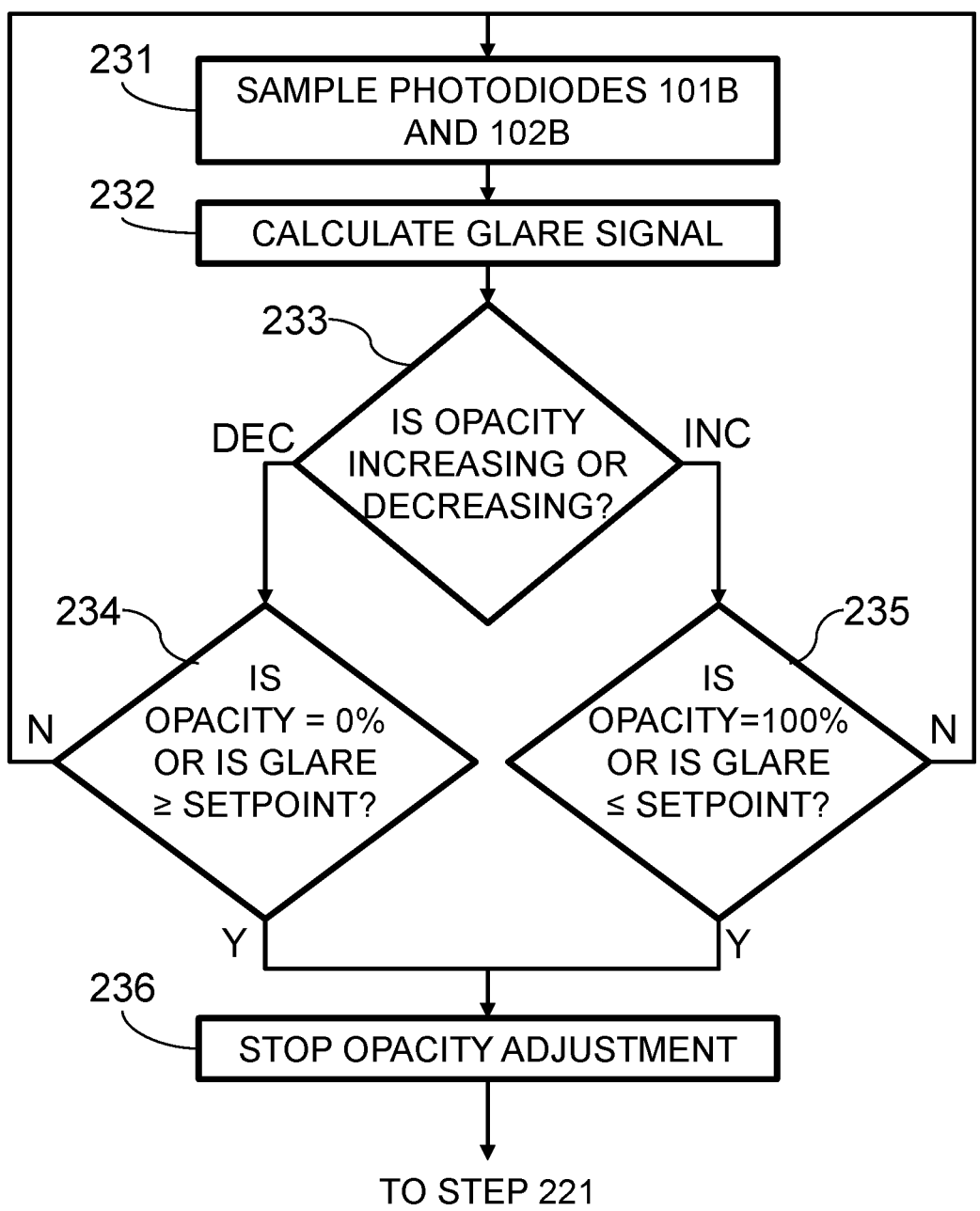
FIG. 43 is a flowchart of the operating steps performed by system 200 for closed-loop control of a Smart Window while the opacity of the window is not being adjusted (alternative embodiment 4).

FIGS. 42 and 43: Operating Steps for Closed-Loop Control of Smart Window FIGS. 42 and 43 show operating steps performed by system 200 for closed-loop control of a Smart Window.

FIG. 42 shows the steps performed while the opacity of the window is not being adjusted, which in general are aimed at determining if the opacity of shading device 21D should be adjusted, and if so, if the opacity should be increased or decreased.

In a pause step 221, controller 181 waits for a sampling interval which will typically depend on the type of Smart Window that is used as shading device 21D. For Smart Windows which have a relatively short response time, the sampling interval may be of the order of one second. For EC Smart Windows (which can take several minutes to fully change state), the sampling interval need not be so short and may be much longer.

Then, in a sampling step 222, controller 181 sends a message via network 184 to cause MCU 23B (shown in FIG. 29) to sample the photocurrents in photodiodes 101B and 102B in the same way as in step 162 of FIG. 32), and to send messages representing the sampled photocurrents to controller 181 via network 184.

Next, in a calculation step 223, controller 181 calculates a glare signal in the same way as in step 164 of FIG. 32.

In a calculation step 224, controller 181 calculates an error signal by subtracting the glare signal from a user-established setpoint.

Then, in a decision step 225, controller 181 compares the magnitude of the error signal to a deadband; if the magnitude of the error signal is less than or equal to the deadband, then pause step 221 is repeated. This loop (consisting of steps 221 through 225) is iterated as long as the magnitude of the error signal does not exceed the deadband, enabling the system to periodically sample the glare signal to determine if and when the opacity of shading device 21D should be actuated.

However, if the magnitude of the error signal exceeds the deadband, then a decision step 226 is performed which causes the program to branch depending on the sign of the error signal. If the error signal is positive (i.e. if the setpoint is greater than the glare signal), then the opacity of shading device 21D should be reduced, but only if the opacity is not already at 0%. Therefore, in a decision step 227, controller 181 branches to an action step 229 to decrease the opacity of shading device 21D if the opacity is greater than zero; otherwise, operation branches back to pause step 221.

On the other hand, if the error signal is negative (i.e. if the setpoint is less than the glare signal), then the opacity of shading device 21D should be increased, but only if the opacity is less than 100%. Therefore, in a decision step 228, controller 181 branches to an action step 230 to increase the opacity of shading device 21D if the opacity is less than 100%; otherwise, operation branches back to pause step 221.

After either action steps 229 or 230 (i.e. while the opacity of shading device 21D is being adjusted), operation branches to the steps shown in FIG. 43, which are generally aimed at determining if the opacity adjustment should stop:

In a sampling step 231, controller 181 determines the relative photocurrents in photodiodes 101B and 102B via MCU 23B in the same way as in sampling step 222 of FIG. 43

Next, in a calculation step 232, controller 181 calculates a glare signal in the same way as in step 223 of FIG. 43.

Then, in a decision step 233, program flow branches depending on whether the opacity of shading device 21D is increasing or decreasing.

If the opacity is decreasing (so that the daylight level should be increasing), then a decision step 234 is performed to check if the minimum opacity (0%) setting has been reached or if the glare signal is equal to or greater than the setpoint. If either of these conditions is met, then action step 236 is performed to stop the opacity adjustment, and program flow branches to pause step 221 of FIG. 43.

If, on the other hand, the opacity is increasing (so that the daylight level should be decreasing), then a decision step 235 is performed to check if the maximum opacity (100%) setting has been reached or if the glare signal is equal to or less than the setpoint. If either of these conditions is met, then action step 236 is performed to stop the opacity adjustment, and program flow branches to pause step 221 of FIG. 42.

The response time of the Smart Window should be much longer (either intrinsically or with low-pass filtering of the control signal applied to the Smart Window) than the time required to complete each iteration of the steps of FIGS. 42 and 43. If necessary, conventional techniques in the art of closed-loop control can be applied to mitigate any oscillation of the window opacity.

Optimization of Sub-Sensor Spectral Responses for EC Smart Windows

For a Smart Window based on EC technology, variable opacity is achieved via an electrochemically induced variation in tint. Effectively, the EC Smart Window acts as a tunable band-pass filter, with the peak transmittance, the wavelength of peak transmittance, and the width of the pass-band all varying with opacity. In a typical EC window, adjusting the opacity from minimum to maximum changes the wavelength of peak transmittance from about 600 nm to about 450 nm, and also narrows the −3 dB spectral width of the transmittance from about 600 nm to about 200 nm.

This causes the NIR transmittance of a typical EC window to vary over a much wider range than the visible transmittance as the opacity is adjusted, so that the output of sunlight photodiode 101B will vary much more than that of reference photodiode 102B. This causes a high shading sensitivity—and can result in a ratio of gain to shading sensitivity that is too low for effective closed-loop control.

The shading sensitivity can be reduced by optimizing the spectral responses of the sub-sensors in two ways:

The wavelength displacement between the spectral responses can be reduced, which will reduce both the shading sensitivity but also the Multi-Spectral gain.

The spectral responses of the sub-sensors can be shifted closer to the wavelength of peak window transmittance.

For example, it is believed that the shading sensitivity can be reduced—and the ratio of gain to shading sensitivity increased—by using an NIR LED (with a spectral response peak at about 700 nm) instead of sunlight photodiode 101B and a green LED (with a spectral response peak at about 500 nm) instead of reference photodiode 102B.

An alternative combination is to use a green LED instead of sunlight photodiode 101B and an NUV LED instead of reference photodiode 102B.

However, the above combinations have not yet been tested.

Optimized Placement of Module 201

As noted above, sensor module 201 can be used to obtain a glare signal directly, or can instead be used to obtain an LAS signal which can then be used with a daylight signal from another source to obtain a glare signal. If sensor module 201 is used to obtain a glare signal directly, then it should be located so that it is not shaded from sunlight by objects such as a window frame or building overhang. Thus, while FIGS. 41A and 41B show Multi-Spectral sensor module 201 located near the top of shading device 21D, it may be preferable in some applications to locate it near the bottom, rather than top, of shading device 21D.

Semi-Permanent Attachment of Module 201

Multi-spectral sensor module is equipped with a suction-cup to facilitate its attachment and removal. However, other, semi-permanent means of attachment may be preferable in some applications. For example, module 201 may be screwed or bonded to a window or window frame.

Use of Module 201 in Multi-Window Installations

In typical installations of system 180, controller 181 is shared across multiple lighting systems and shading devices, spanning multiple rooms. In such an installation, the information produced by a single instance of Multi-Spectral sensor module 201 could be shared across multiple adjacent windows on the same building façade, reducing the number required instances of module 201.

Exterior Mounting of Module 201

The fact that Multi-Spectral sensor module 201 requires no physical connections to a power source or controller 181, and that the information it produces can be shared across multiple windows, mean that—with suitable modifications—it could advantageously be installed on the exterior of a building (e.g. on the roof). Examples of such modifications include weatherization of housing 202 and addition of conventional mounting means (e.g. a clamp for pole-mounting).

While more expensive, exterior mounting may be advantageous for use with EC Smart Windows because it would eliminate the issue of the effects of changing window tint on Multi-Spectral sensing. This, in turn, would enable the spectral responses of the sub-sensors to be optimized for maximum Multi-Spectral gain.

If exterior mounting is used, then system 201 would operate in open-loop fashion, e.g. as previously described in the section entitled "Discontinuous Open-Loop Control".

Simplified Configuration of Module 201

In some cases, system 180 may also include a conventional outward-facing daylight sensor. In this case, Multi-Spectral module 201 need only include one photosensor (either a reference photosensor or a sunlight photosensor), depending on the spectral response of the conventional daylight sensor, and its output used with that of the conventional daylight sensor to produce either an LAS signal or a glare signal as previously described.

For example, if the conventional outward-facing daylight sensor has a spectral response that mimics that of the human eye, then reference photodiode 102B of Multi-Spectral module 201 could be omitted. In this case, LAS and glare signals could be obtained using photodiode 101B as the sunlight sub-sensor and the output of the conventional daylight sensor as the reference sub-sensor.

As another example, if the conventional outward-facing daylight sensor is a silicon photodiode with a spectral response that spans both visible and NIR wavelengths, then sunlight photodiode 101B of Multi-Spectral module 201 could be omitted and photodiode 102B replaced with an MN photodiode or LED. LAS and glare signals could be obtained using photodiode 102B as the reference sub-sensor and the output of the conventional daylight sensor as the sunlight sub-sensor.

Thus, module 201 need not necessarily include both sub-sensors of a Multi-Spectral sensor.

Advantages

Multi-spectral sensor module 201 provides all of the advantages of sensor 22B (shown in FIGS. 30 through 32), but enables those advantages to be easily added to a conventional integrated system that has daylight-harvesting (and optionally DDC) capabilities. Such an augmented system (such as system 200) is significantly more cost-effective at controlling glare—while maximizing useful natural illumination—than are conventional DDC systems.

Figure 44:
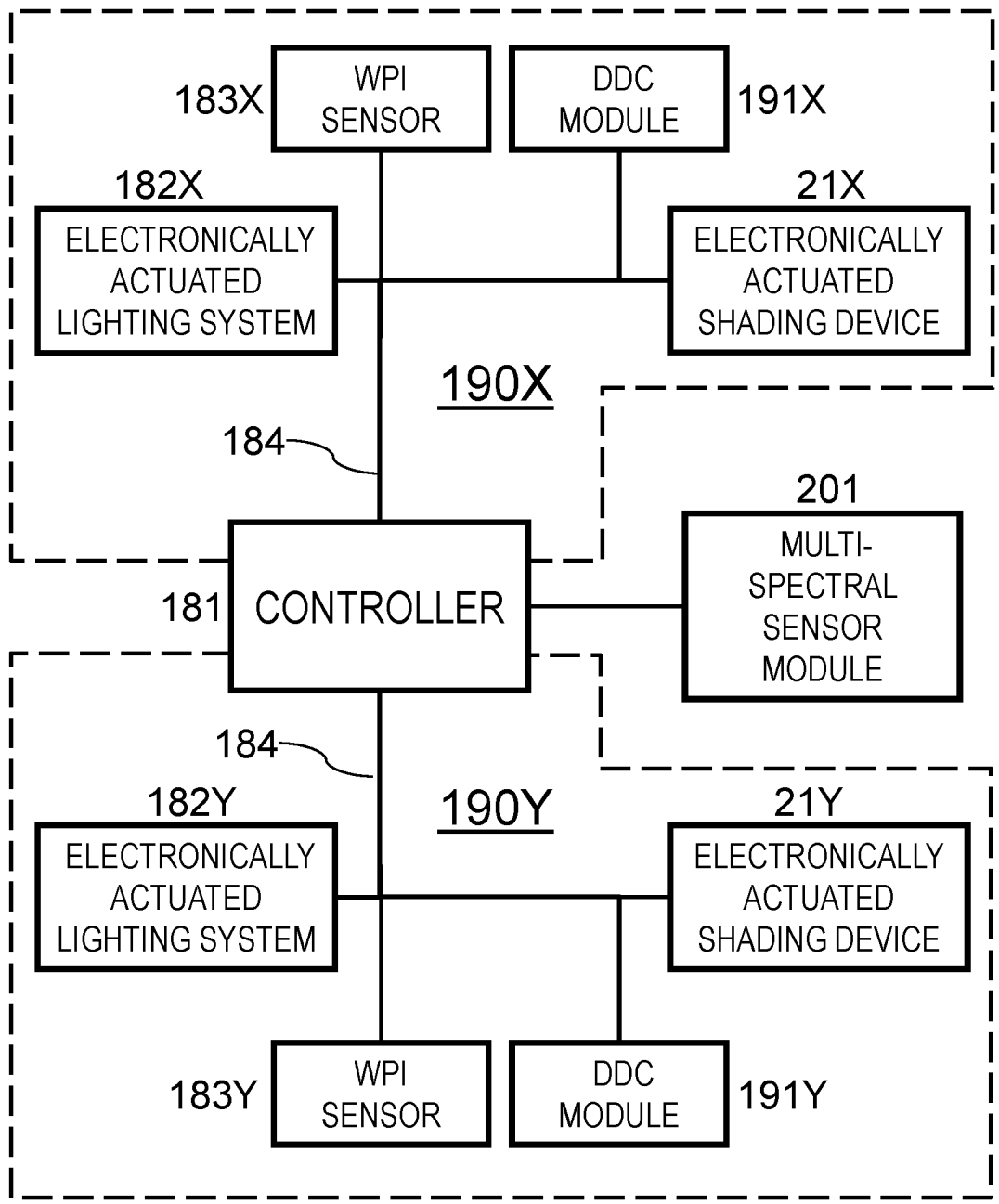
FIG. 44 is a block diagram of augmented systems 190X and 190Y (alternative embodiment 5).

FIG. 44: Using Module 191 in Conjunction with Module 201 (Alternative Embodiment 5)

In view of the preceding discussion, practitioners will appreciate that Multi-Spectral module 201 could be used in conjunction with one or more instances of DDC module 191 to obtain glare signals for closed-loop DDC in one or more day-lit spaces.

FIG. 44 shows a block diagram of such a DDC system. It consists of augmented systems 190X and 190Y, each of which is identical to system 190 shown in FIG. 38, except that they share the same controller 181. Systems 190X and 190Y include the following elements:

electronically-actuated shading devices 21X and 21Y, which are identical to shading device 21D;

electronically-actuated lighting systems 182X and 182Y, which are identical to electronically-actuated lighting system 182;

WPI sensors 183X and 183Y, which are identical to WPI sensor 183; and

DDC modules 191X and 191Y, which are identical to DDC module 191 except that photodiodes 101 and 102 are not required and could be omitted.

The system of FIG. 44 also includes Multi-Spectral sensor module 201, and all of the aforementioned elements are interconnected via network 184.

The system of FIG. 44 operates in the same way as two separate instances of augmented system 190, except that system 190X and system 190Y share Multi-Spectral sensor 201 rather than each including their own Multi-Spectral sensor. Each of system 190X and 190Y performs the same steps of FIG. 27 except for the following changes:

In sampling steps 122 and 131, photodiodes 101 and 102 are not sampled.

In calculation step 123 of FIG. 27 and calculation step 132 of FIG. 28, the glare signal is obtained as follows:

$g = d_{AD} * (LAS)^A$, where g is the glare signal, $d_{AD}$ is a daylight signal obtained using Angle-Diversity sensing (as previously described for system 20A and augmented system 191), LAS is the LAS signal obtained as previously described from Multi-Spectral module 201, and A is an empirically-derived constant. Because there is no risk of shading sensitivity due to the outward-facing configuration of module 201, a larger value of A can be used than for system 20A or augmented system 191 in order to achieve greater sensitivity to low-angle sunlight; a value of 1.25 has yielded good results in developmental testing.

Advantages

The system of FIG. 44 offers the same advantages of augmented system 190, while also enabling a simplified configuration of DDC modules 191X and 191Y (relative to that of DDC module 191) through omission of Multi-Spectral sensing, which is instead performed by Multi-Spectral module 201. Cost-effectiveness is further increased because Multi-Spectral module 201 can be shared between more than one shading device/window. This configuration can also result in improved performance when used with moveable window coverings, because the output of Multi-Spectral module 201 does not exhibit shading sensitivity.

CONCLUSIONS, RAMIFICATIONS, AND SCOPE

As this disclosure makes clear, the innovative daylight sensor disclosed herein provides at least two significant advantages over prior-art daylight sensors in automated window-shading (and particularly DDC) applications: its output is more strongly correlated with the subjectively perceived daylight level, and it is much more sensitive to incipient glare from low-angle sunlight. These advantages enable a DDC system using such a sensor to regulate admitted daylight much more effectively than systems using conventional sensors, leading to greater energy savings in daylight-harvesting applications while increasing occupant satisfaction. At the same time, the innovative sensor disclosed herein retains most of the simplicity of the sensor disclosed in U.S. Pat. No. 5,663,621, enabling a highly cost-effective implementation.

Further, as set forth in this disclosure, the subject daylight sensor can be used in many different ways, and many useful embodiments are possible. Further, practitioners in the art will recognize that the construction and function of the elements composing the preferred and alternative embodiments described herein may be modified, eliminated, or augmented to realize many other useful embodiments, without departing from the scope and spirit of the innovations disclosed herein.

I claim:

1. A method of operating a window-shading device to block glare produced by direct sunlight, said method including the steps of:
    (a) obtaining a sunlight signal from a sunlight sensor and a reference signal from a reference sensor, said sunlight sensor having a first spectral response and said reference sensor having a second spectral response, said first spectral response overlapping an atmospheric transmission window, said second spectral response overlapping an atmospheric transmission window, said first spectral response being displaced toward longer wavelengths with respect to said second spectral response whereby said sunlight signal is less sensitive than said reference signal to Rayleigh scattering of said direct sunlight by the atmosphere;
    (b) obtaining a glare signal which increases with said sunlight signal and decreases with said reference signal; and
    (c) closing said shading device if said glare signal exceeds a threshold.

2. The method of claim 1 wherein said first spectral response overlaps a near-infrared region and said second spectral response overlaps a visible region.

3. The method of claim 1 wherein said glare signal changes more with changes in said sunlight signal than with changes in said reference signal.

4. The method of claim 1 wherein said first spectral response overlaps a visible region and said second spectral response overlaps a near-ultraviolet region.

5. The method of claim 1 wherein said first spectral response overlaps a visible region and said second spectral response overlaps a visible region.

6. A system to operate a window-shading device to block glare produced by direct sunlight, said system including:
    (a) a sunlight sensor to produce a sunlight signal and a reference sensor to produce a reference signal, said sunlight sensor having a first spectral response and said reference sensor having a second spectral response, said first spectral response overlapping an atmospheric transmission window, said second spectral response overlapping an atmospheric transmission window, said first spectral response being displaced toward longer wavelengths with respect to said second spectral response whereby said sunlight signal is less sensitive than said reference signal to Rayleigh scattering of said direct sunlight by the atmosphere;
    (b) processing means to obtain a glare signal which increases with said sunlight signal and decreases with said reference signal; and
    (c) a controller to close said shading device if said glare signal exceeds a threshold.

7. The system of claim 6 wherein said first spectral response overlaps a near-infrared region and said second spectral response overlaps a visible region.

8. The system of claim 6 wherein said glare signal changes more with changes in said sunlight signal than with changes in said reference signal.

9. The system of claim 6 wherein said first spectral response overlaps a visible region and said second spectral response overlaps a near-ultraviolet region.

10. The system of claim 6 wherein said first spectral response overlaps the visible region and said second spectral response overlaps the visible region.

* * * * *